(12) United States Patent
Narukawa

(10) Patent No.: US 9,519,995 B2
(45) Date of Patent: Dec. 13, 2016

(54) METHOD OF MAPPING IMAGE INFORMATION FROM ONE FACE ONTO ANOTHER CONTINUOUS FACE OF DIFFERENT GEOMETRY

(71) Applicant: Hajime Narukawa, Tokyo (JP)

(72) Inventor: Hajime Narukawa, Tokyo (JP)

( * ) Notice: Subject to any disclaimer, the term of this patent is extended or adjusted under 35 U.S.C. 154(b) by 265 days.

(21) Appl. No.: 14/158,880

(22) Filed: Jan. 20, 2014

(65) Prior Publication Data

US 2014/0132598 A1    May 15, 2014

Related U.S. Application Data

(63) Continuation of application No. 12/497,727, filed on Jul. 6, 2009, now Pat. No. 8,665,273, which is a
(Continued)

(30) Foreign Application Priority Data

Jan. 4, 2007   (JP) ................. 2007-023528
Mar. 16, 2007  (JP) ................. 2007-106534
Sep. 19, 2007  (JP) ................. 2007-271821

(51) Int. Cl.
G06T 15/20   (2011.01)
G06T 17/20   (2006.01)

(52) U.S. Cl.
CPC ............ *G06T 15/20* (2013.01); *G06T 17/20* (2013.01)

(58) Field of Classification Search
CPC .................................................. G06T 15/20
(Continued)

(56) References Cited

U.S. PATENT DOCUMENTS 2,393,676 A   2/1946 Fuller
4,627,622 A   12/1986 Spilhaus
(Continued)

FOREIGN PATENT DOCUMENTS

JP   62-502515   1/1987
JP   03-205082   9/1991
(Continued)

OTHER PUBLICATIONS

Fuller, "Dymaxion Map," Inventions, St. Martin's Press, 1983 (3 pages).
(Continued)

*Primary Examiner* — Devona Faulk
*Assistant Examiner* — Hai Tao Sun
(74) *Attorney, Agent, or Firm* — Kilyk & Bowersox, P.L.L.C.

(57) ABSTRACT

An information processing method transfers information from a start face to an end face with a minimum local distortion by maintaining one-to-one correspondence between the original information on the start face and the transferred information on the end face. The method includes an operation of mapping information taken from a three-dimensional surface onto a rectangular plane, or vice versa, by dividing the start face into a plurality of divisional start faces and preparing divisional end faces that just fill the end face, then deforming each divisional start face to just fit a corresponding one of the divisional end faces, so as to maintain lines and points defining each divisional end face as lines and points also on the end face and to ensure that a first area ratio between each divisional start face relative to the entire start face and a second area ratio between each divisional end face relative to the entire end face is substantially equal.

20 Claims, 64 Drawing Sheets

Related U.S. Application Data continuation-in-part of application No. PCT/JP2007/075356, filed on Dec. 25, 2007.

(58) Field of Classification Search
USPC .......................................... 345/419
See application file for complete search history.

(56) References Cited

U.S. PATENT DOCUMENTS

| 6,141,034 | A | 10/2000 | McCutchen | |
|---|---|---|---|---|
| 7,686,616 | B1* | 3/2010 | Cloud | G09B 27/08 434/137 |
| 2006/0257032 | A1* | 11/2006 | Nakagawa | G06T 17/20 382/232 |
| 2009/0123088 | A1* | 5/2009 | Kallay | G06T 3/0062 382/295 |
| 2010/0001997 | A1 | 1/2010 | Kajikawa et al. | |

FOREIGN PATENT DOCUMENTS

| JP | 2003-178298 | 6/2003 |
|---|---|---|
| JP | 2006-309802 | 11/2006 |
| WO | WO 86/05406 | 9/1986 |

OTHER PUBLICATIONS

International Search Report for International Patent Application No. PCT/JP2007/075356 dated Jan. 29, 2008 (2 pages).

M.R. Calabretta; Mapping on the HEALPix Grid; SAO/NASA ADS; Dec. 2004.

C.A. Furuti; Map Projections: Polyhedral Maps; http://www.progonos.com/furuti/MapProj/Dither/ProjPoly/projPoly.html; retreived by the Internet Archive May 6, 2006.

K.M. Gorski et al. HEALPix—a Framework for High Resolution Discretization, and Fast Analysis of Data Distributed on the Sphere; The Astrophysical Journal, vol. 622, Issue 2, pp. 759-771, Apr. 2005.

* cited by examiner

LC13

LC14

LC15

METHOD OF MAPPING IMAGE INFORMATION FROM ONE FACE ONTO ANOTHER CONTINUOUS FACE OF DIFFERENT GEOMETRY

CROSS REFERENCE TO RELATED APPLICATIONS

This application is a continuation of U.S. patent application Ser. No. 12/497,727, filed Jul. 6, 2009, which in turn is a continuation-in-part of International Application No. PCT/JP2007/075356 with an international filing date of Dec. 25, 2007, which is incorporated in its entirety by reference herein.

FIELD OF THE INVENTION

The present invention relates to a method for displaying pieces of information taken from divisional parts of a continuous three-dimensional (3-D) face seamlessly onto a rectangular continuous plane, or displaying pieces of information on separate flat planes seamlessly onto a rectangular continuous plane. Typically, it relates to an information processing method especially addressed to reducing local distortions among pieces of surface information of the earth displayed on a rectangular plane.

BACKGROUND OF THE INVENTION

"IPIX 360 Suite" is a commercial name of a commercially available system presented by Minds-Eye-View Inc. This system, hereafter simply called "IPIX" in this application, deals with input and output of surface information of, in particular, spheres among various 3-D objects. This system can generate spherical information by virtually coupling two circular fisheye images together. Users can get a view of any partial portion of the spherical information by moving a rectangular viewer from one place to another.

Among various existing techniques for flattening out a spherical image on a rectangular plane, cylindrical projections directed to producing a world map can display the entire surface of the earth on a rectangular flat plane by projecting the earth's surface onto a cylinder circumscribing the equator and then unfolding the cylinder. Mercator projection is a conformal projection, and equal-area cylindrical projection is an equal-area projection. Panorama photography is an analogous art that captures images of some divisional parts of the entire view of 360 degrees and assembles these images on a virtual cylinder.

In 1879, Charles Sanders Peirce of the United States Coast and Geodetic Survey proposed a quincuncial projection. This quincuncial projection, hereafter called "Peirce's projection" in this application, can provide a square or 1:2 rectangular conformal world map and also can tessellate a plurality of such world maps on a plane. Geographical information properly matches between adjacent world maps tessellated on the plane.

As a scheme of polyhedral projection, Laurence P. Lee at National Mapping Agency in New Zealand proposed in 1965 a conformal world map of an equilateral triangle made by triangular projection that projects the earth's surface on a tetrahedron and then developing the tetrahedron. This is hereafter called "Lee's Projection" in this application.

As a technique for correcting distortion of a flattened image converted from spherical information, Buckminster Fuller presented a cartography called the Dymaxion map that has less distortion in continents' areas and shapes than any prior cartographies (see R. Buckminster Fuller, *INVENTIONS*: St. Martins' Press, 1983, P. 85). This cartography divides the entire spherical surface into twenty equal-area triangular regions, then projects information on respective spherical icosahedral regions onto respective triangular face of a regular icosahedron, and thereafter develops the icosahedron. Therefore, each divisional spherical region corresponds to each icosahedral face, and the ratio of the area of each divisional triangular region relative to the entire area of the sphere is equal to the ratio of each icosahedral face relative to the total surface area of the icosahedron. That is, when the surface of the earth is projected on the icosahedron, the center angle of 63'25" of each edge of the divisional triangular region of the sphere is equally maintained as the center angle of each edge of the icosahedral face.

Collignon's Projection by Edouard Collignon proposed an equal-area world map in 1865. Here is used a pseudo-cylindrical projection, which maintains an original arrangement of longitudes radiating from the two poles and an original parallel arrangement of latitudes on one rhombus or two rhombuses.

Commercially available software under the commercial name of "Flexify 2" (2008 Flaming Pear Software) utilizes map projections in image processing. It can convert imported flat images such as panorama or fisheye pictures into images on any two-dimensional form according to various kinds of map projections such as Dymaxion map and the Peirce's projection, or into polyhedral images.

Japanese Patent Laid-open Publication No. JP 2003-178298 is related to correction of errors in area ratio, i.e. in solid angle, in photography. This application discloses a technique called "mesh camera" for pasting photographs taken by different types of lenses to fit with each other. The "mesh camera" technique can project such photographs onto a 3-D object called an output frame such as, for example, a regular polyhedron or sphere, while minimizing the solid angle error.

U.S. Pat. No. 6,141,034 discloses a technique which can simultaneously expose a substantially omnidirectional view by arranging externally oriented optic axes on eleven dodecahedral faces. This patent proposes arrangements of optic axes based on a tetrahedron and an octahedron to cope with stereoscopic viewing.

All of the above-mentioned existing techniques are defective in one aspect or another. Namely, the IPIX technology discussed above contains large distortions when the image is zoomed out. The distortions become too large for a user to properly figure out the subjects when the image is zoomed out to provide an approximately hemispherical visual field. Additionally, the IPIX is subjected to an undesirable phenomenon called Gimbal lock, which pertains to unnatural movements of the viewer, since the viewer rotates about a single axis.

Cylindrical projections leave distortions at bottom and top regions of world maps. Therefore, shapes of subjects in both polar regions are difficult to figure out. These projections can rearrange geographical information in the east and west directions, but cannot cope with such rearrangement in other directions without a certain complex image processing. Similarly, the panorama photography, which takes shots while rotating a camera about a single rotation axis, cannot capture objects above and below the camera position. Therefore, the panorama photography is not a technique for providing a complete omnidirectional image as well.

The Dymaxion map that is just a development of an icosahedron inevitably has a zigzag outline, so that the geographical information in the world map is difficult to figure out properly. If ocean currents are added to the world map, the currents appear discontinuous regardless of all efforts to rearrange the twenty regular triangles. Thus, the Dymaxion map cannot pack geographical information closely on a rectangular plane that is an ideal map format.

Among regular polyhedra, the icosahedron employed in the Dymaxion projection can divide an omnidirectional image into 20 equal parts and can distribute distortions to 20 divisional regions equally. In contrast, the tetrahedron employed by the Lee's projection divides an omnidirectional image into as much less as only four parts, and results in producing strong local distortions. Therefore, in the world map by the Lees projection, objects near the tetrahedral vertices increase in solid angle to five times or more of their original sizes. Additionally, the Lee's projection is not a proposal of a two-dimensional rectangular image. Because of the same reason, the Peirce's projection is also subjected to a large distortion.

The Collignon's Projection is an equal-area projection with a simple outline. However, it does not provide a rectangular map.

The Flexify 2, which utilizes existing map projections, involves the same problems as those of the Dymaxion map and the Peirce's projection.

JP 2003-178298 is not directed to flattening out omnidirectional images. Further, this prior art is not a proposal of a photographing technique. Instead, it relates to assembling some different shots taken by different setups into an integral image. In this prior art, one or more of prepared pictures are inevitably expanded locally when packed on a sphere or a regular polyhedron, and this produces a resulting image locally different in resolution.

U.S. Pat. No. 6,141,034 does not teach any technique to flatten out omnidirectional images. In addition, this existing art cannot obtain a complete omnidirectional view due to the lack of an optic axis toward the bottom one of dodecahedral faces.

In summary, the existing arts of one group involve the problem that a distortion is contained when an entire area of an image taken from a 3-D object such as a sphere or a polyhedron is displayed simultaneously on a rectangular flat plane; and those of another group involve the problem that, once a distortion is corrected, the outline of image can no longer closely fit in a rectangular plane of an ordinary display monitor, and produces an unused zone called vignetting on the display.

In a further review of the entire field of omnidirectional photography, existing techniques step through some of various mapping processes such as exposure, image processing and projection for display, respectively, from the stage of taking photographs up to the stage of giving a projected image of the photographs to be observed on a screen. However, any of these existing arts deals with only a part of these processes, and none of them disclose a method of consistently stepping across all mapping processes.

SUMMARY OF THE INVENTION

It is therefore an object of the present invention to provide an information processing method capable of reducing local distortions in the process of developing surface information of the earth onto a plane, or vice versa.

A further object of the present invention is to provide an information processing method that can display continents and islands of the earth on a rectangular plane while maintaining their area ratio.

The present invention is characterized in generating information in a frame of a rectangular plane by repeating division or unification of planes typically by using inscribing or circumscribing spherical polyhedra. More generically, the present invention is characterized in maintaining a constant area ratio between the total area and each divisional or unified plane. Thereby, the present invention can reduce, and/or equally distribute, the distortion of information.

According to a first aspect of the present invention, there is provided CLAIM 1

The present invention can thereby reduce, and/or equally distribute, the distortion.

The feature of the first aspect of the invention will be more easily understood from FIG. 60 that shows a simple model using two circular fisheye photographs as information on the plurality of start faces. These two start faces SS1 and SS2 are adjacent to each other, sharing the common point SP1. The start face SS1 is defined by a line SE1 and the point SP1, and the start face SS2 is defined by a line SE2 and the same point SP1. Each start face is deformed and packed to fill a partial zone of a rectangular plane exclusively assigned to it (RS1 and RS2). In this conversion, the positional relation between the two start faces SS1 and SS2 is retained between the end faces RS1 and RS2 on the rectangular plane as well, and the lines SE1, SE2 and the common point SP1 defining the original faces SS1, SS2 are preserved as lines RE1, RE2 and point RP1 on the rectangular plane as well.

Still referring to FIG. 60, information at a location SS10 on the start plane SS1 corresponds to information at a location RS10 on the end plane RS1. That is, each piece of information on the start faces has a one-to-one relation with a piece of information on the end planes filling the rectangular plane.

In the information processing method according to the first aspect of the invention, the information on the start planes is converted to the information on the end planes to fill the entire rectangular plane with no gaps or overlaps. Here is ensured that the first area ratio between the total area of all start faces and the area of each start face is equal to the second area ratio between the total area of the rectangular plane and the area of each end face on the rectangular plane. This means that the following equation is substantially satisfied.

$$SS1/(SS1+SS2)=RS1/(RS1+RS2), SS2/(SS1+SS2)=RS2/(RS1+RS2)$$

Another more complex model is shown in FIG. 61. This is a development of a polyhedron and its close packing onto a rectangular plane. Three lines PE12, PE13 and PE14 define a single unit start plane PS11 on a total start plane PS100. The unit start plane PS11 connects to a unit start plane PS12 sharing the line PE12, to a plane PS13 sharing the line PE13, and to a plane PS14 sharing the line PE14.

All unit (or divisional) start planes (faces) constituting the entire start plane (face) PS100 are deformed and compiled to two-dimensionally fill a rectangular end plane RS100 with no gaps and overlaps. Lines PE12, PE13 and PE14 defining the start unit face PS11 have been transferred to lines RP12, RP13 and RP14 to define an end unit face RS11 on the rectangular end plane RS100. Similarly, points PP12, PP13 and PP14 on the start unit face PS11 are retained as points RP12, RP13 and RP14 on the end unit face RS11. In this manner, lines defining all start unit faces are transferred to lines defining respective end unit faces, and points on all start unit faces are retained on respective end unit faces. That is, information on each start unit face is in one-to-one relation with information on each end unit face while keeping a positional relationship among respective start unit faces as a relationship among respective end unit faces as well.

The above two models deal with rectangulation (deformation onto a rectangular plane) of two-dimensional information prepared beforehand by an existing flattening technique from an omnidirectional image. Occasionally, therefore, two faces that are continuous in the original information may appear separated in a flattened form. Rectangulation by the present invention can connect such separate faces to restore their originally connected relation. This means that the invention improves the positional relation among unit faces by substantially recovering their original relation beyond an intervening form.

The condition that the first area ratio of each start unit face relative to the entire start face is substantially equal to the second area ratio of each end unit face relative to the entire rectangular plane can be expressed by the following equation.

$$PS11/PS100 = RS11/RS100$$

The first aspect of the present invention satisfies this condition for two-dimensional compilation of information on a rectangular plane.

In this respect, images two-dimensionally compiled images by existing cylindrical projections include inconsistency with original information. Two polar points are extended to lines sometimes as long as the equator. The Dymaxion map that uses polyhedron's development cannot pack the information on the polyhedral faces in a rectangular plane. The Peirce's projection and the Lee's projection, as well as the software "Flexify 2" applying these projections to cartographies, all fail to display the end information with the same area ratio as that of the start information. In contrast, the information processing method according to the first aspect of the present invention can maintain the same area ratio as that of the start information and the same relations of lines, points and planes as those of the start information also in the end information.

When different faces of an object are caught as pictures by several cameras, which are typically component cameras constituting a composite camera, as shown in FIG. 2, planes of projection F26 taken by respective cameras as illustrated by hatching in FIG. 62 are separate from each other. These separate data can be imported from the different cameras and can be integrated to form adjacent faces F27 of a three-dimensional (3-D) object PG27. Therefore, in the context of the present invention, a plurality of adjacent faces each defined by one or more lines and one or more points include not only those of original information but also those obtained as a result of certain processing of original information.

DETAILED DESCRIPTION OF THE INVENTION

Embodiments of the present invention are explained below in detail with reference to the drawings.

First Embodiment

Tetrahedral Iso-Area Division

Figure 1:
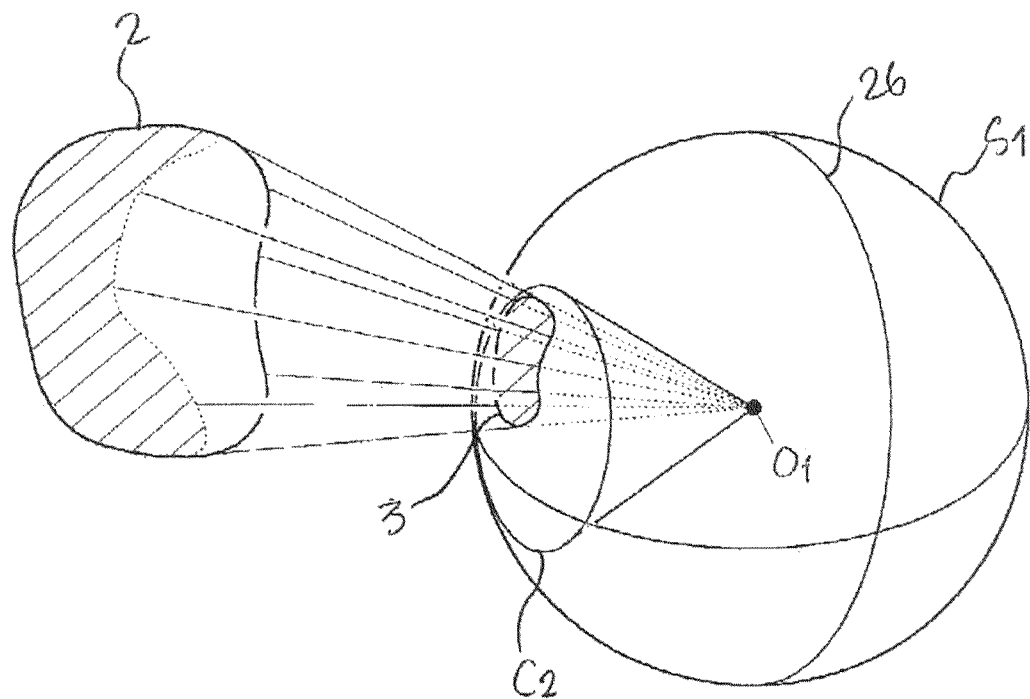
FIG. 1 is a diagram showing the concept of a solid angle.

First explained is area ratio of a given face relative to the entire area of a plurality of continuous faces is explained, taking a sphere as one of three-dimensional (3-D) objects as an example. Area ratio of a given spherical area relative to the entire surface of a sphere is called solid angle. With reference to FIG. 1, solid angle is a value representing the extent of an object 2 as viewed from the center O1 of a unit sphere S1. Steradian (abbreviated "sr") is normally used as a unit of solid angles. An area 3 on the unit sphere S1 (radius: 1) represents the dimension of the object 2. This area 3 is a cross-sectional area of a cone defined by rays of half lines extending from the center O1 toward the outline of the object 2. The cross section is taken by cutting the cone along the spherical surface of the unit sphere S1. Maximum solid angle covering an entire view is $4\pi$ sr and a hemispherical visual field is 2π sr. In case of a world map, areas of continents or islands can be quantified by solid angles.

Numerical value of a given field of view by angle of view can be expressed only as a lesser circle C2 on a unit sphere. Such a lesser circle is called an image circle. The image circle scheme can divide an omnidirectional view equally only when dividing it into two hemispheres. The existing IPIX technique discussed above relies on this scheme by using fisheye lenses. In contrast, solid angles can describe any visual fields of any shapes in numerical values of their areas, and make it easy to patch a plurality of images different in shape and size on a sphere.

Mapping, including the technique using solid angles, which preserves the area ratio of a given area on a solid's surface relative to the entire surface area of the solid is hereafter called iso-area mapping for simplicity. The "mapping" includes operations of optical projection, reflection, refraction, especially exposure for photography, projection by a projector, and any operations of transforming a face, of integrating several continuous faces into one face, or dividing one face to several continuous faces by transformation. Users can get quantitative comprehension of objects, which is difficult for human eyes, by observing and diagnosing rectangular images made by Iso-area mapping. Iso-area mapping can be used for various purposes such as endoscopic diagnosis, cartography, measurement of magnetic forces and calculation of sky factor (daylight factor), among others, to exactly determine sizes and distributions of seats of diseases, sizes of ozone holes, magnetic flux densities and distributions, or projective areas of buildings.

Figure 2:
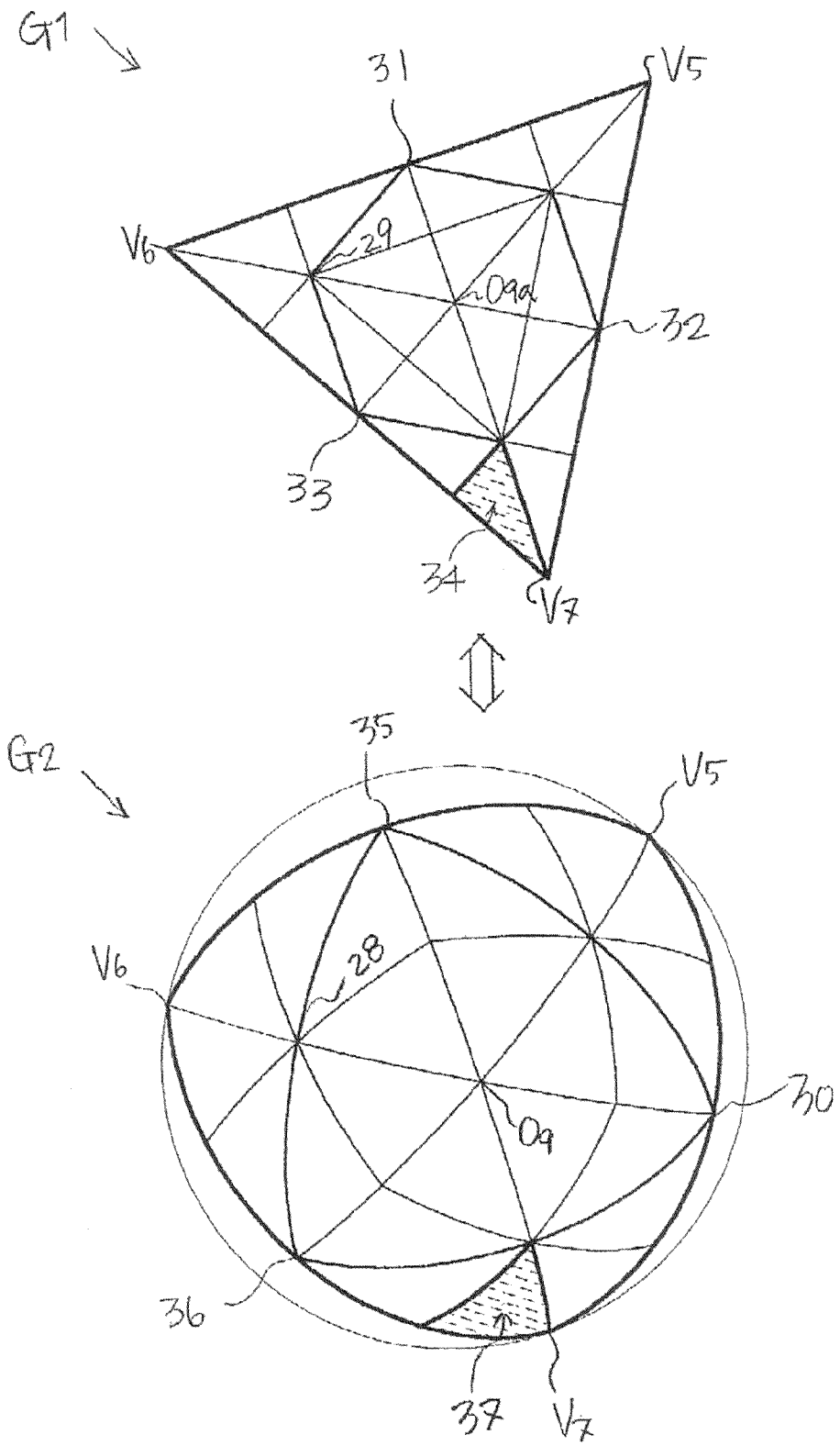
FIG. 2 is a diagram showing iso-area grids on a tetrahedron and a spherical tetrahedron according to the present invention.
Figure 3:
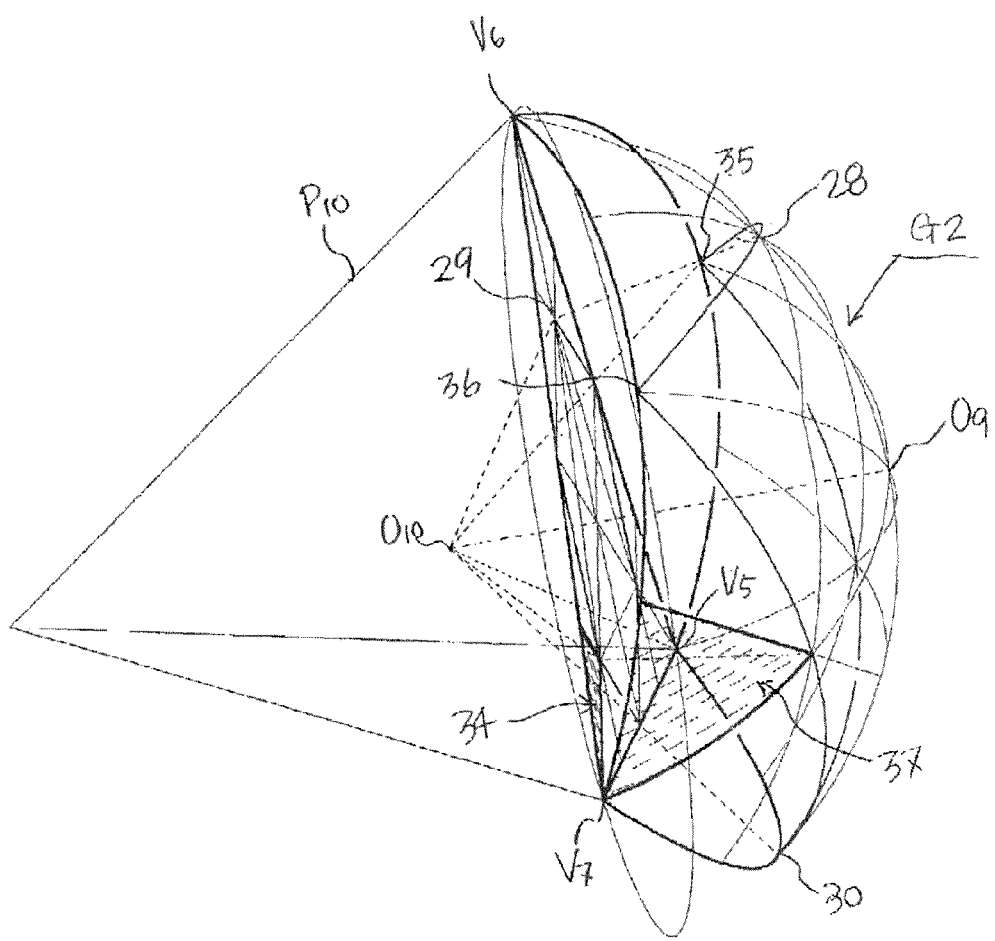
FIG. 3 is an axonometric diagram of the two grids shown in FIG. 2.
Figure 4:
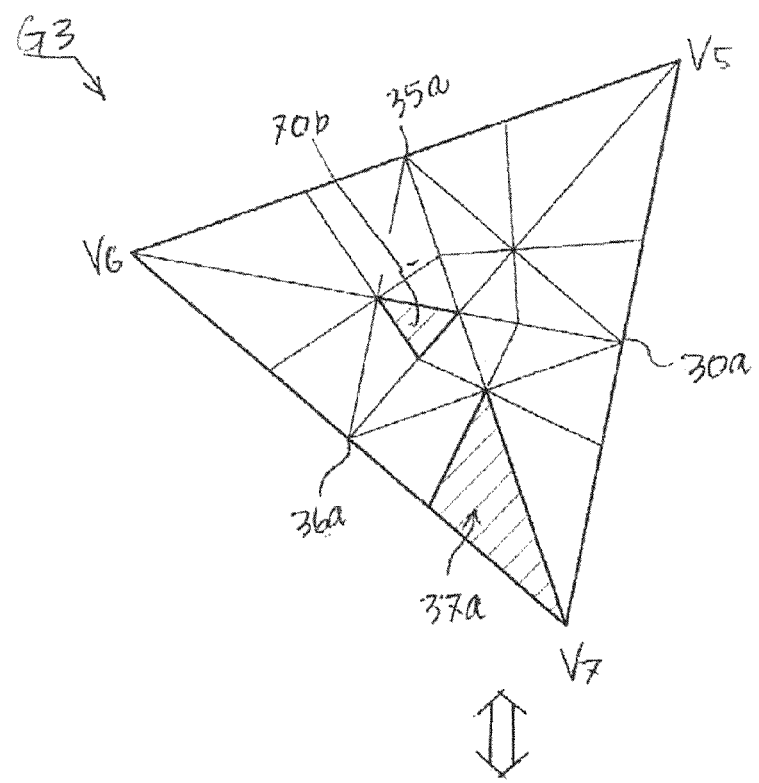
FIG. 4 is a schematic diagram showing a grid generated by optically projecting the spherical grid on a tetrahedron shown in FIG. 2.
Figure 4:
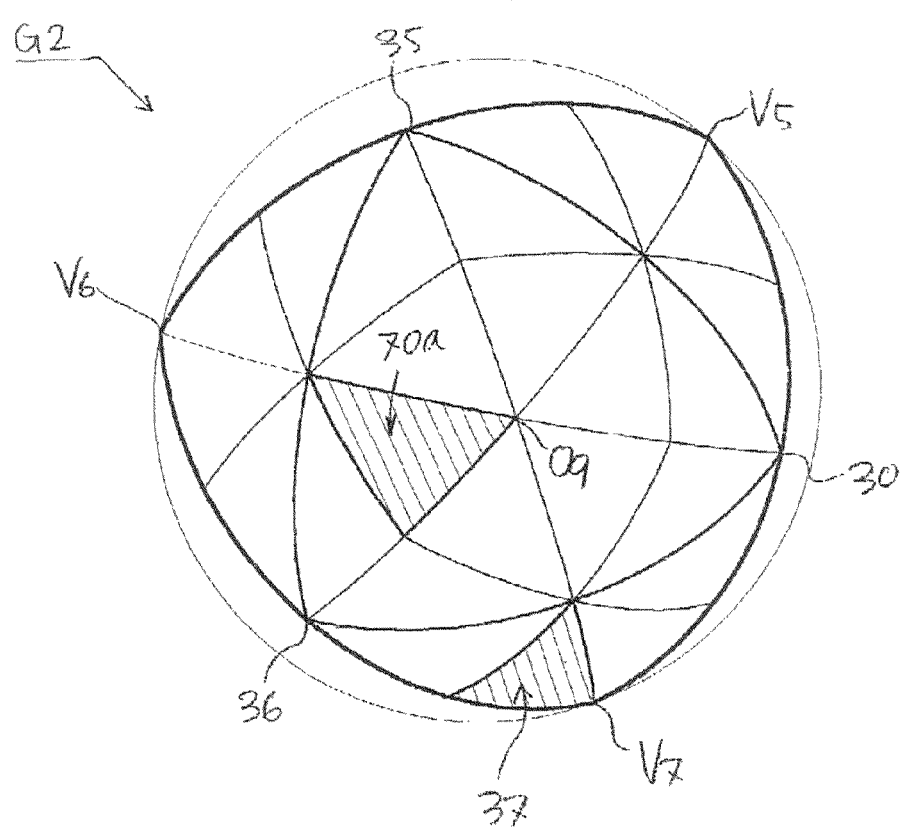
Figure 5:
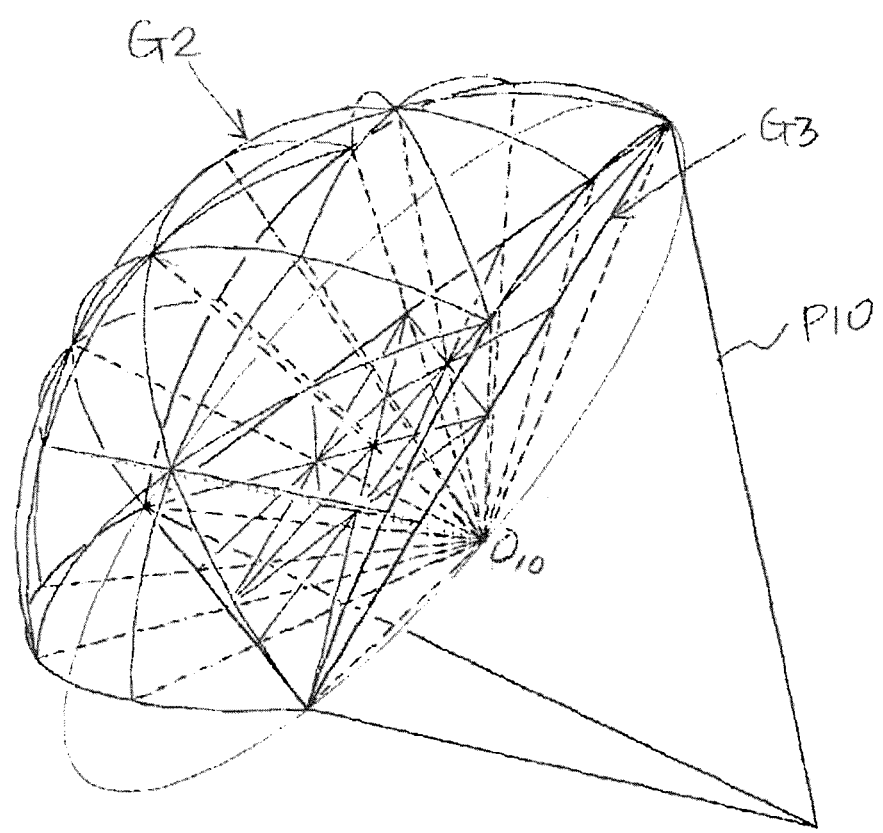
FIG. 5 FIG. 5 is an axonometric diagram of the two grids shown in FIG. 4.

For the purpose of rectangulation of an omnidirectional or partial image, the use of a regular polyhedron makes it possible to equally divide a complete visual field and evenly distributes face angles and interior angles made by segments to the polyhedral faces upon mapping the image on the polyhedron. FIGS. 2 and 3 illustrate iso-area mapping and rectangulation of an omnidirectional image via a tetrahedron. FIGS. 2 and 3 show a grid G1 on a regular tetrahedron P10 and a grid G2 on a spherical regular tetrahedron that is tangential to the tetrahedron P10. FIGS. 4 and 5 show a grid G3 on a regular tetrahedron on which the grid G2 is projected from the optical center O10.

With reference to FIG. 2, a grid G1 subdivides each tetrahedral face into 24 congruent triangles (including mirror images) with perpendiculars to tetrahedral edges and lines parallel to the perpendiculars connecting points dividing the edges into quarters. This division results in uniforming different lengths of segments and different interior angles of the grid G1 to less varieties. The hatched region 34 is one of the 24 triangles. Consequently, the grid G1 subdivides all surfaces of the tetrahedron into 96 regions in total, which are equal in area.

Still referring to FIG. 2, the grid G2 subdivides a spherical tetrahedral face into 24 triangles that are equal in area in the following process. Great arcs that are geodesic lines connect midpoints 30, 35 and 36 of edges of the spherical tetrahedron and its vertices V6, V7 and V5 respectively. The great arcs cross at a point O9. Points O9, 35, V6 and 36 outline one spherical square. This spherical square is equally subdivided into eight spherical triangles by other great circles that cross at a point 28 and connecting vertices and midpoints of edges of this spherical square. Here are contained two types of triangles (including mirror images). The other five spherical squares are also subdivided in the same manner and the sphere is divided into 96 regions in total, which are equal in area.

On the other hand, a grid G3 is obtained by optically projecting the grid G2 on a regular tetrahedron as shown in FIG. 5. Each node in the grid G3 is on a segment connecting a node in the grid G2 and the center of a concentric sphere. As shown in FIG. 4, two hatched spherical triangles 37 and 70a that are equal in solid angle (area ratio relative to the entire sphere) on the grid G2 are projected onto regions 37a and 70b in the grid G3 respectively. As a result of this optical projection, the area ratio of the region 37a relative to the entire tetrahedral surface becomes 5.1 times the area ratio of the region 70b even though the regions 37 and 70a were equal in area ratio before the projection. It is an essential feature of iso-area mapping to maintain the area ratio, i.e. solid angle, upon mapping the region 37 to the region 34 on the grid G1 as illustrated in FIG. 2 in which the area ratio of the spherical triangle 37 on the grid G2 equals the area ratio of triangle 34 on the grid G1. This division implementing iso-area mapping is hereafter called iso-area division, and the dividing grids ensuring iso-area mapping between both surfaces before and after iso-area mapping or between a pair of two corresponding grids are hereafter called iso-area grids.

Iso-area division need not use geodesic lines such as a great circle, and instead may use a lesser circle, other curves and/or a chain of these lines. The division may be partly uneven. The mapping method according to the embodiment of the invention is applicable not only to spheres and tetrahedrons as illustrated but also to any other 3-D objects such as other regular and irregular polyhedrons, hyperboloids and other open surfaces, objects having curved surfaces of surfaces of revolution, and so on. The method may use only a part of any of those 3-D objects, for example, in form of a hemisphere suitable for measuring the sky factor. The iso-area division includes a division using tetrahedral edges alone. However, edges of polyhedrons other than regular tetrahedron are better for use in applications like security cameras and the like since a tetrahedron having only four faces is limitative in effect of distortion correction.

Figure 6:
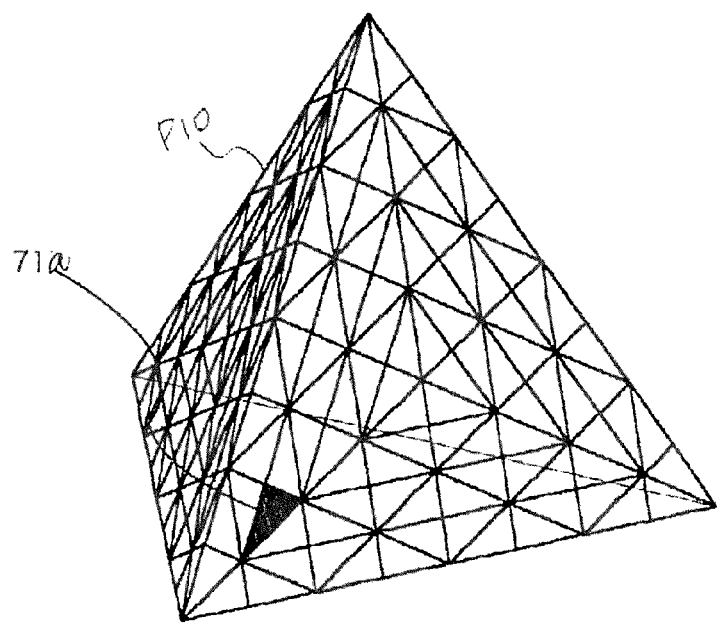
FIG. 6 is a schematic diagram of grids subdividing the two grids shown in FIG. 2 according to the invention.
Figure 6:
Figure 6:
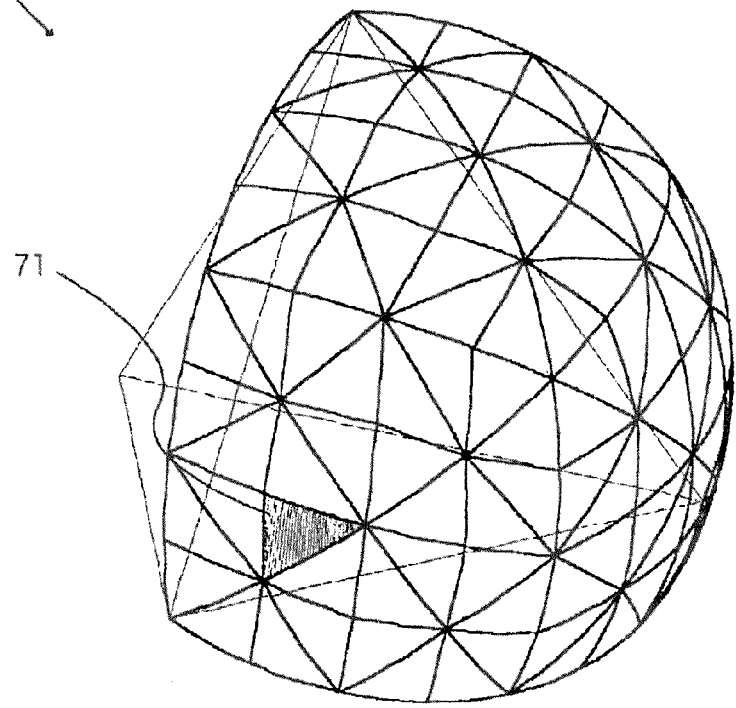

The iso-area mapping can cope with a desired frequency of division to upgrade its accuracy. FIG. 6 shows an eight-frequency iso-area grid G5 of a spherical tetrahedron obtained by subdividing the grid G2 shown in FIG. 2. Based on this grid, spherical information is mapped on an eight-frequency iso-area grid G4 obtained by subdividing the grid G1 shown in FIG. 2. For example, a spherical triangle 71 is mapped on a triangle 71. The explanation made above with reference to the first embodiment is similarly applicable to all other embodiments as well.

Figure 7:
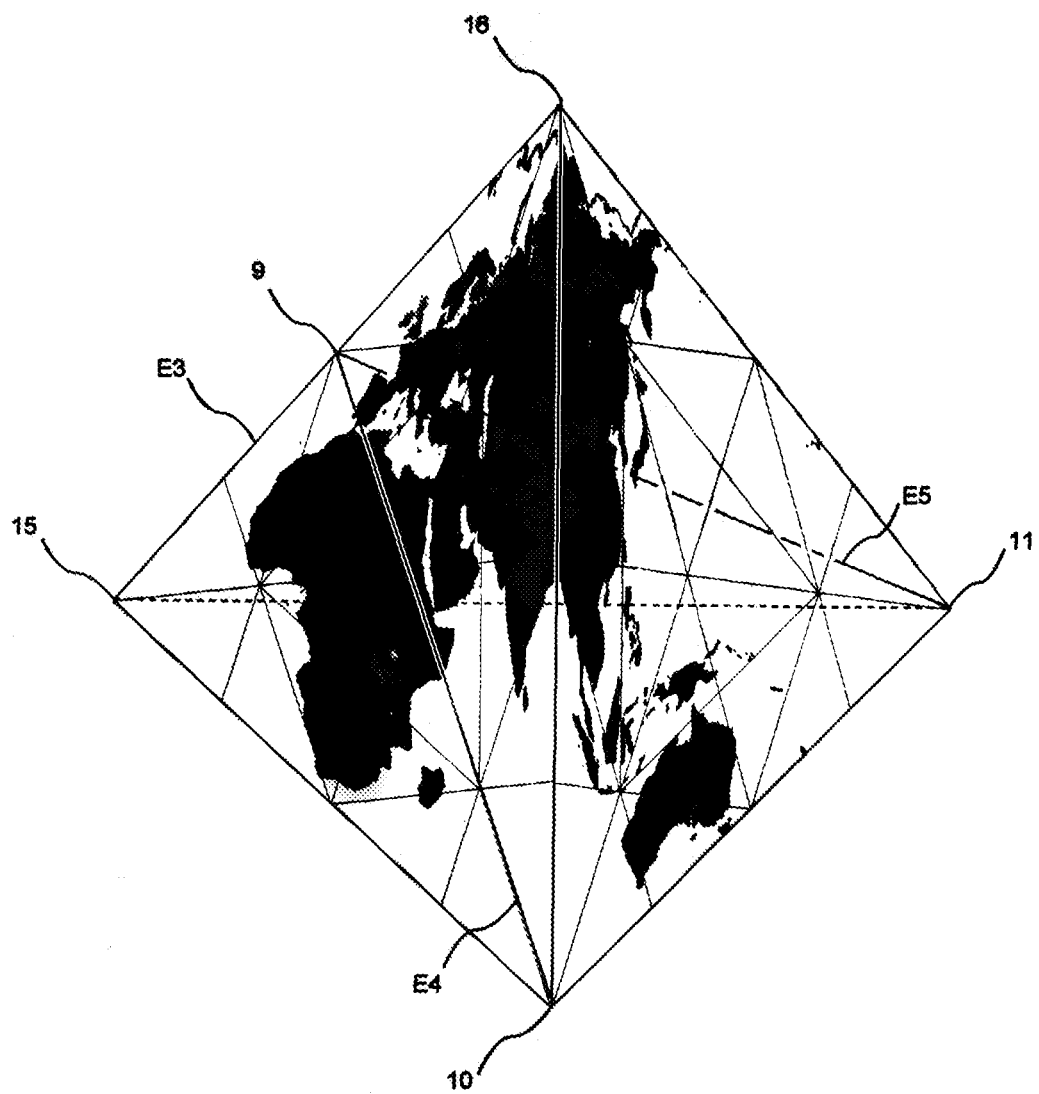
FIG. 7 is a schematic diagram of the earth mapped on a tetrahedron by iso-area mapping according to the invention.

FIG. 7 shows a tetrahedral image of the earth by iso-area mapping. A rectangular image is obtained by developing the tetrahedron along cut lines on a tetrahedral edge E3 extending between vertices 15, 16 and segments E4 and E5 that connect the midpoint 9 of the edge E3 to other vertices 10 and 11 respectively.

Figure 8:
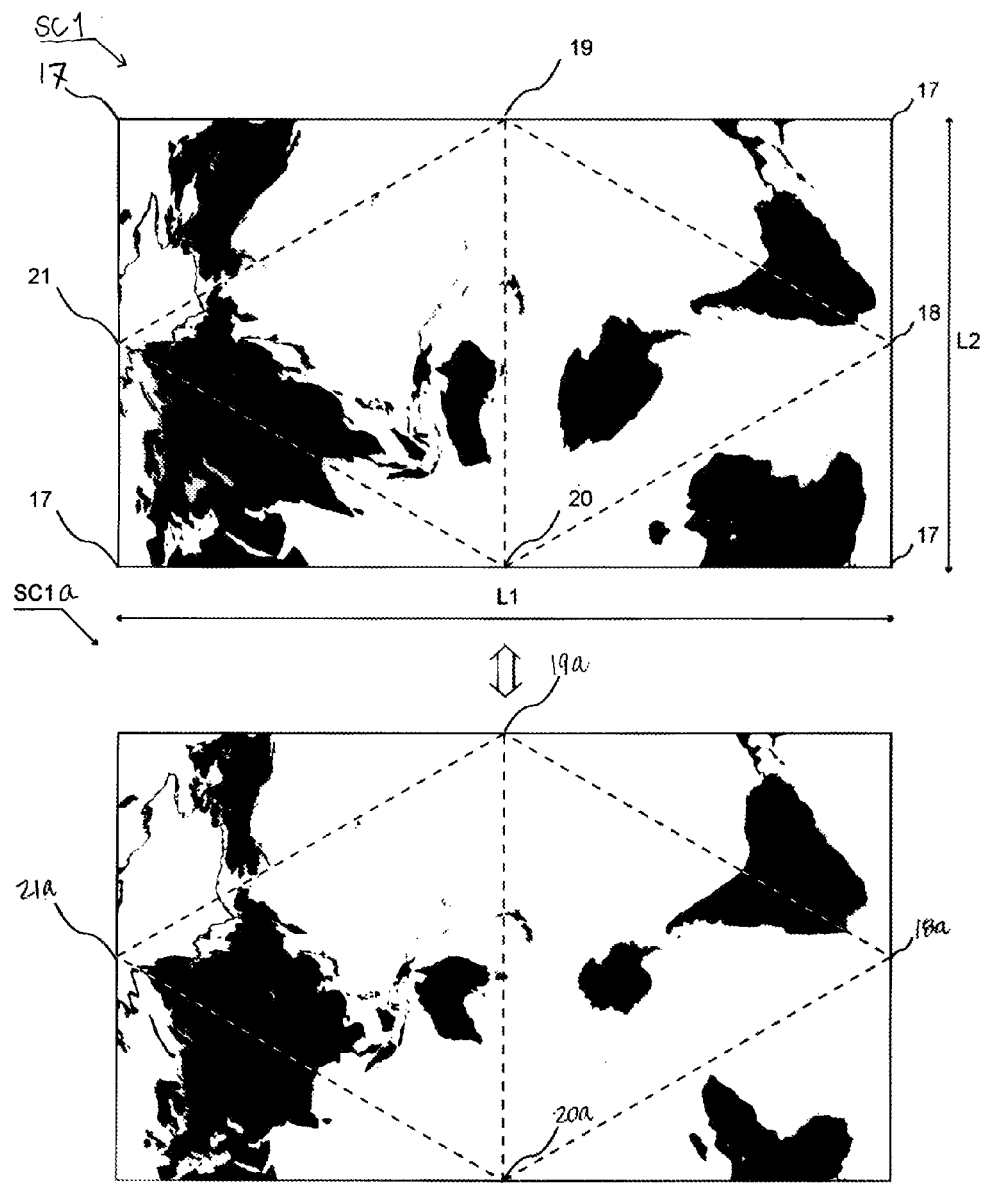
FIG. 8 is a schematic diagram showing a world map made through the iso-area mapping process according to the invention and a comparative world map made by omitting the iso-area mapping process.

In FIG. 8, SC1 denotes a rectangular omnidirectional image, which is an equal-area world map in this case, having the aspect ratio of 1:√3 (L1:L2). Points 9, and 15 shown in FIG. 7 have been transferred to points 17, 20 and 18 in FIG. 8 respectively. The vertex 11 appearing in FIG. 7 has been transferred to a midpoint 19 in FIG. 8. Angles around the vertex 11 have been developed to half surround the point 19 and make a straight angle since the sum of interior angles around a tetrahedral vertex 11 is 180 degrees. The method utilizes the geometrical nature of a regular tetrahedron that can be unfolded into a rectangular plane. FIG. 8 also shows a world map SC1a made by the same process excepting iso-area mapping. The map equally distributes four tetrahedral vertices on a rectangle, and symmetry of the regular tetrahedron contributes to maintain original of the solid angle of each face and the central angle of each edge. Therefore, local concentration of distortion does not occur. Nevertheless, some figures near vertices are distorted to an increase size.

The mapping process including multiple mapping steps such as the step of mapping onto a spherical polyhedron with 96 faces and the step of mapping onto a tetrahedron as explained with reference to the foregoing embodiment is hereafter called "multi-step mapping". Iso-area division and iso-area mapping are not limited to multi-step mapping. Instead, an omnidirectional view may be mapped directly on a rectangular plane by iso-area mapping. Users can customize a frequency of division and/or a dividing pattern of iso-area division as well.

For easier understanding of the present invention, explanation made herein is based on geometry, using various geometrical terms like regular triangle, congruence, etc. that have definite meanings. Upon practicing the invention, however, inevitable errors or modifications must be allowed in actual operations of computers or in an actual process for making computer programs or physical products such as cameras. Therefore, note that the invention assumes such geometrical imperfections. In particular, the first embodiment allows an approximation for practicing "iso-area mapping" or standardization in line length or interior angle provided it ensure the effects explained with reference to the first embodiment. For the same reason, the invention allows minor lacks and/or deformation in mapped planes and/or 3-D objects to be mapped. The remarks made in this paragraph are applicable not only to the first embodiment but also to all other embodiments.

In the foregoing explanation, the sphere inscribes to the regular tetrahedron. However, objects involved in the mapping, i.e. an object as a sender of information to be mapped (hereafter called a sender object as well) and an object as a receiver of the information to be mapped (hereafter called a receiver object as well) need not have an inscribing or circumscribing relation. The sender object and the receiver object may be related such that, for example, each flat face of a polygon as the receiver object intersects the spherical surface of a sphere as the sender object, or vice versa. In this case, local distortions between the start image and the end image can be minimized. It is also acceptable that the sender object and the receiver object are concentrically separate. The tetrahedron may be developed into a rectangular plane by cutting along arbitrary segments thereon. Instead of a rectangle, users can develop a tetrahedron to any other polygon such as a regular triangle, a plane outlined with some curves such as a circle, or a concaved face or any other arbitrary 3-D surface. Although tetrahedrons are suitable for obtaining developments, other polyhedrons are usable for making developments as well if other two-dimensional geometries are acceptable as developments.

Figure 9:
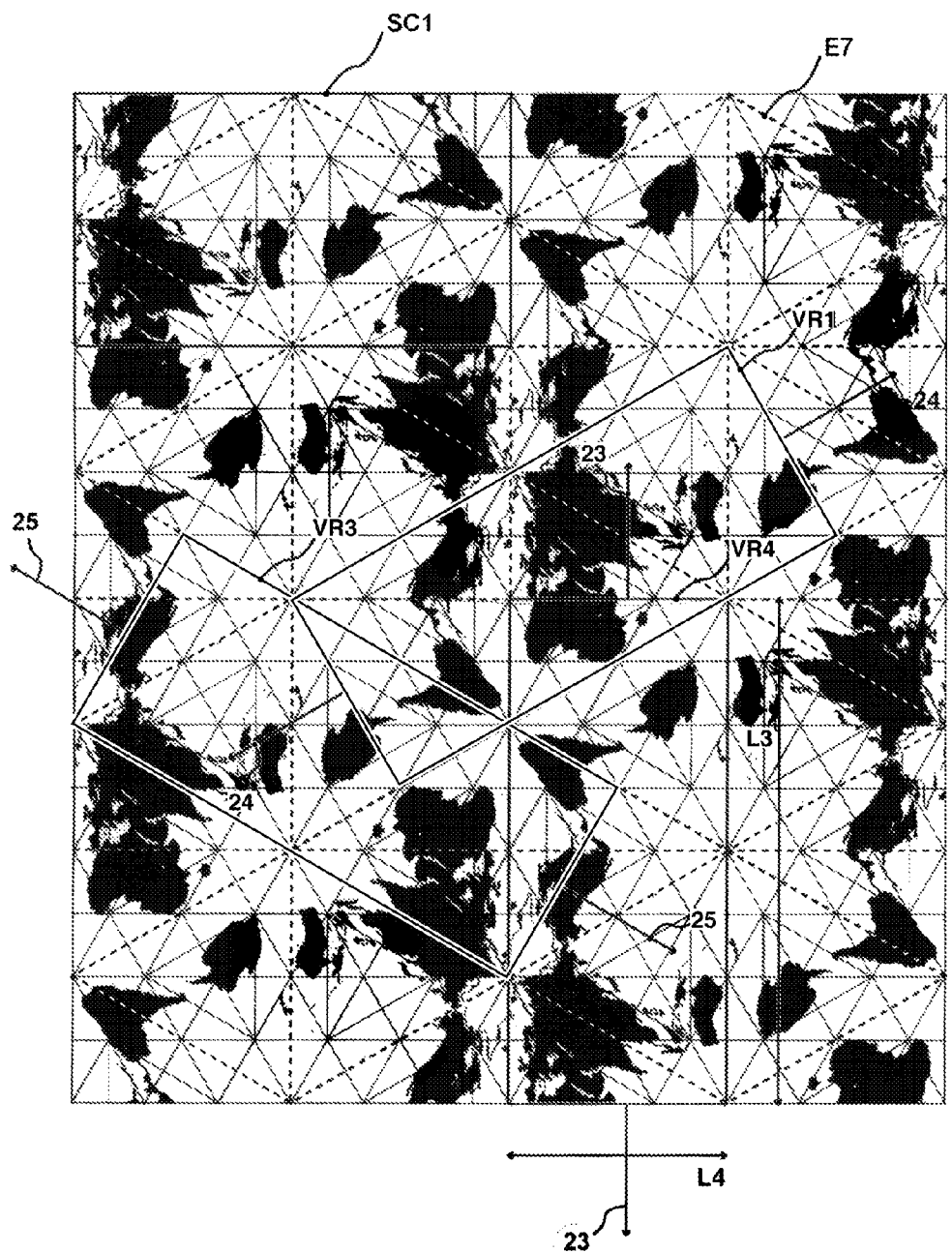
FIG. 9 is a schematic diagram of a tessellated image of some copies of a world map with a viewer according to the invention.

The image of FIG. 9 is a result of tessellation of the obtained omnidirectional rectangular image SC1. Broken lines E7 are mapped segments of tetrahedral edges, and they make a three-way grid. From the image of FIG. 9, some rectangular frames VR1, VR3, VR4 each covering one world map different in aspect ratio from the above-mentioned world map SC1 can be obtained. These frames can change the direction and can slide in three directions 23, 24, and 25 along the three ways of the three-way grid. Aspect ratio of these frames is L3:L4=4:√3.

Figure 10:
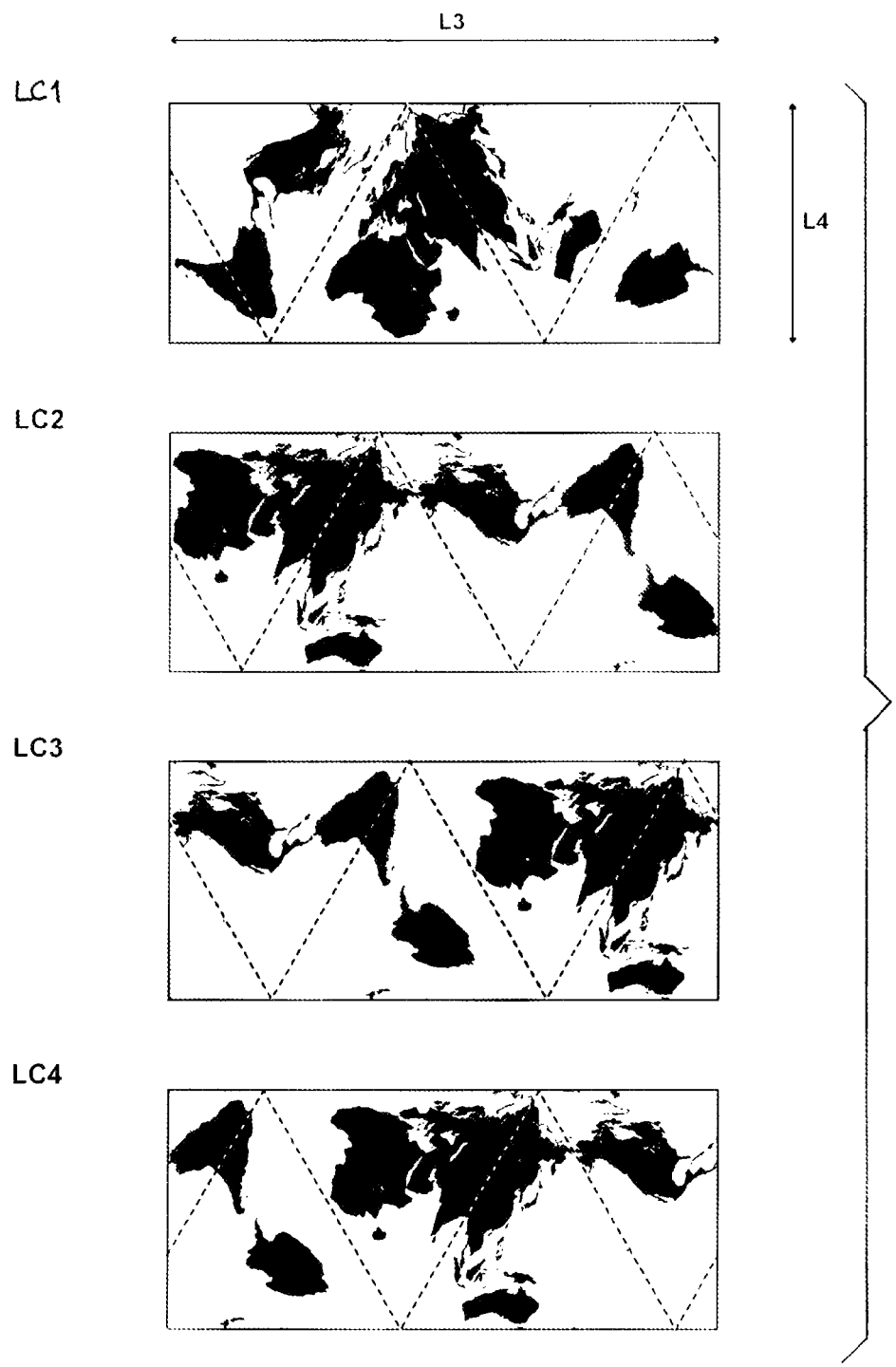
FIG. 10 is a schematic diagram showing four world maps extracted and outputted from the tessellated image shown in FIG. 9.
Figure 11:
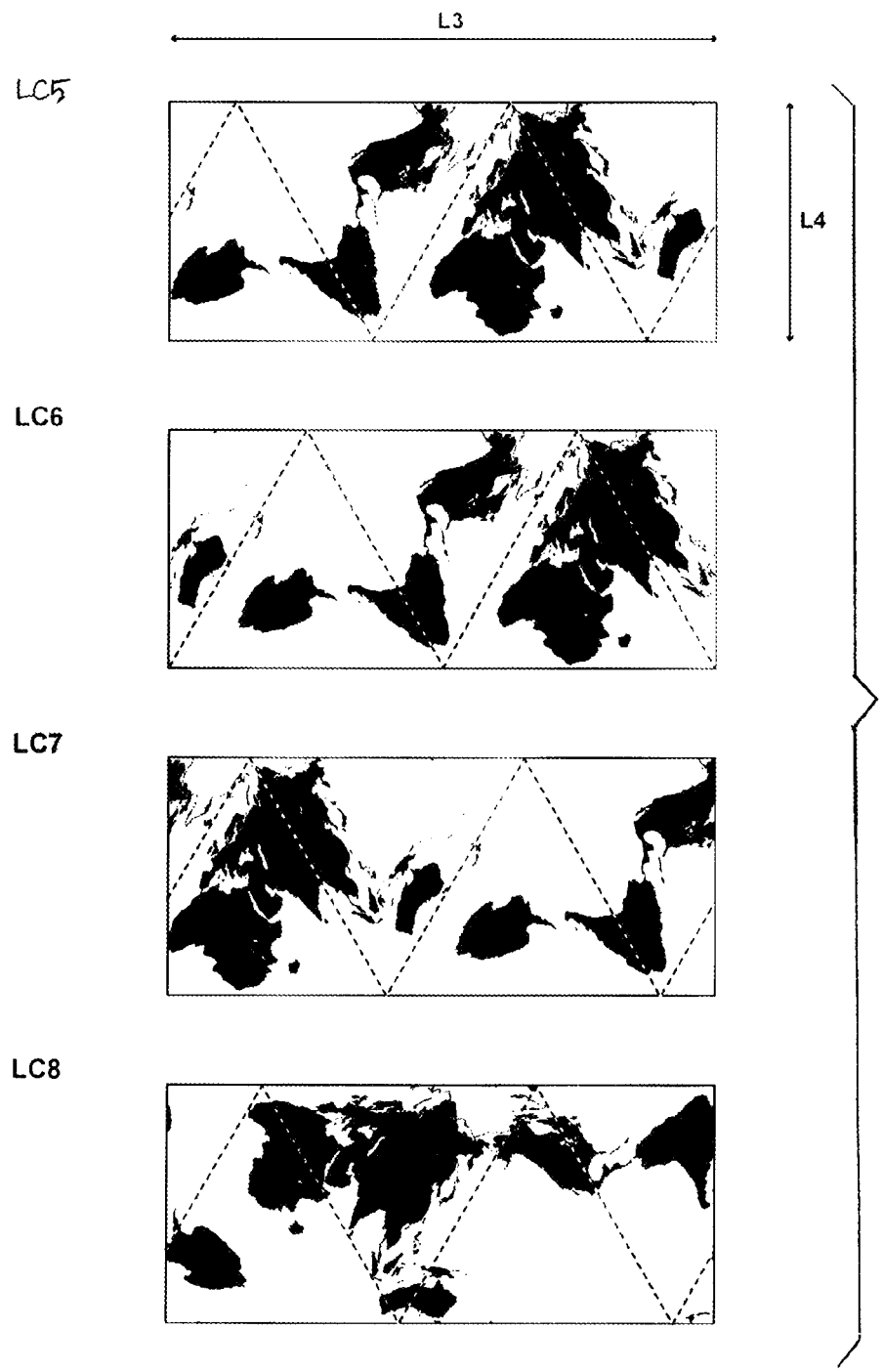
FIG. 11 is a schematic diagram showing another four world maps extracted and outputted from the tessellated image shown in FIG. 9.

SC1 is a world map locating Antarctica and Australia at a central position. By sliding the frame covering one entire world map, any appropriate equal-area world maps that are secondary omnidirectional views can be provided. FIG. 10 and FIG. 11 show world maps with the aspect ratio of 4:√3 carefully trimmed from the tessellated image to center different regions and not to interrupt most of continents and islands. These world maps LC1 through LC8 are equal-area world maps centering Middle East, Hawaii, Antarctica, India and China, U.K., Mexico, Australia and Japan, respectively, in this order.

Figure 12:
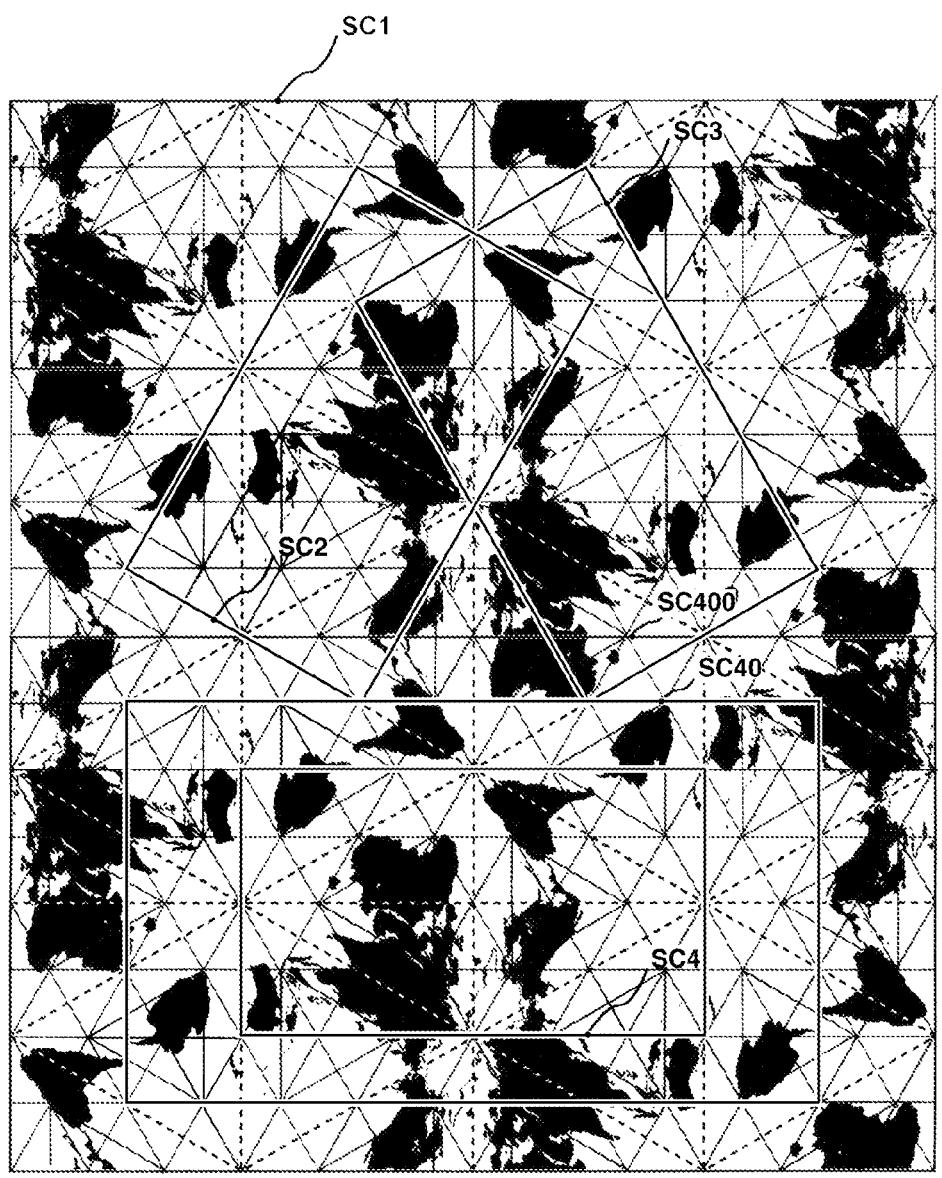
FIG. 12 is a schematic diagram of a tessellated image shown in FIG. 9 with another viewer framing a full-spherical field.

FIG. 12 is the same tessellation image as that of FIG. 9, and shows that world maps SC2, SC3 and SC4 having the aspect ratio of 1:√3 can be extracted in addition to the former world maps. In addition, a world map with a larger frame SC4 can be extracted for a better view of a geographical relation around regions (near Tasmania) at four corners of the world map, for example, SC4. Furthermore, a world map extracted with a frame SC400 covering 16π sr makes it easier to recognize geographical relations to anywhere in the world even from the regions at four corners of the world map. These frames are suitable for continuously displaying world ocean currents, sea and air routes, weather patterns, long term tracks of satellites, and so on, without interruption.

Figure 13:
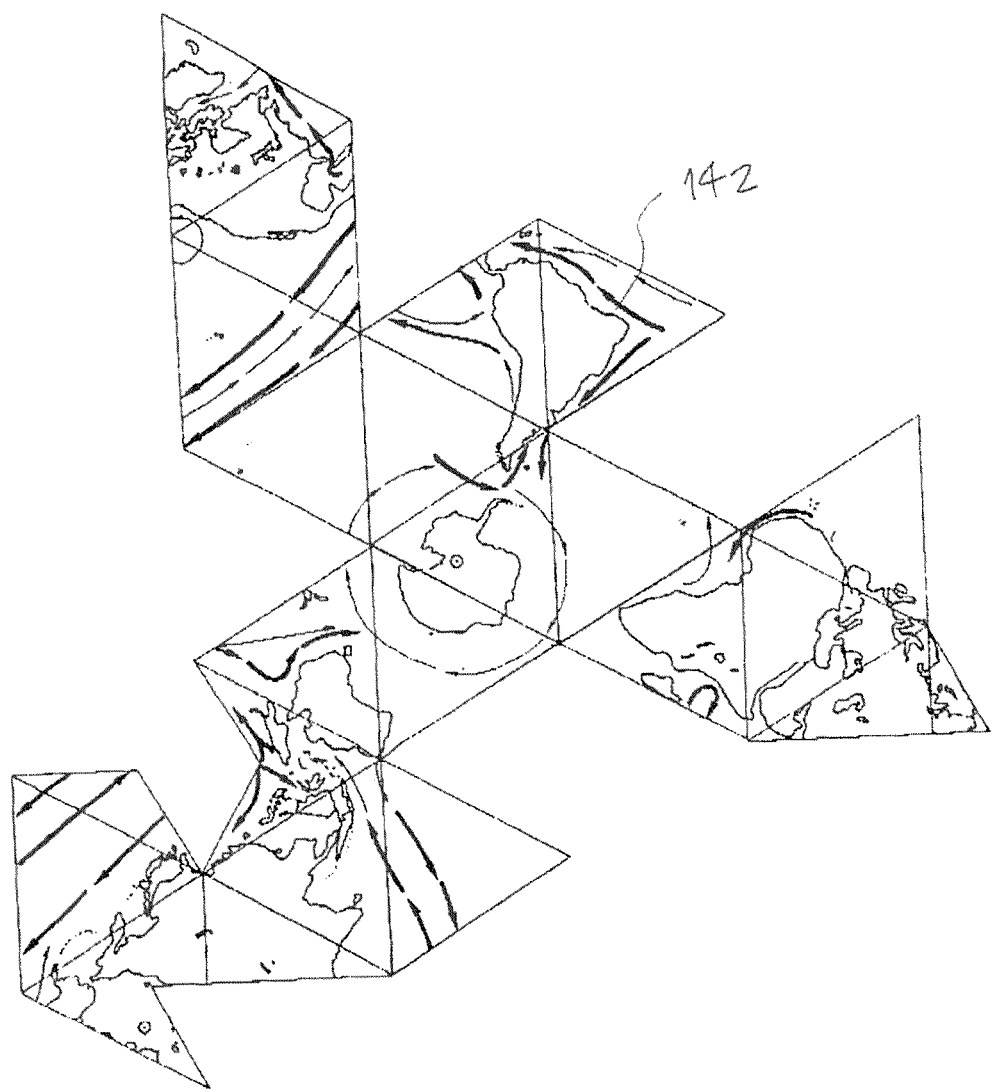
FIG. 13 is a schematic diagram showing world ocean currents of January in form of a Dymaxion map.
Figure 14:
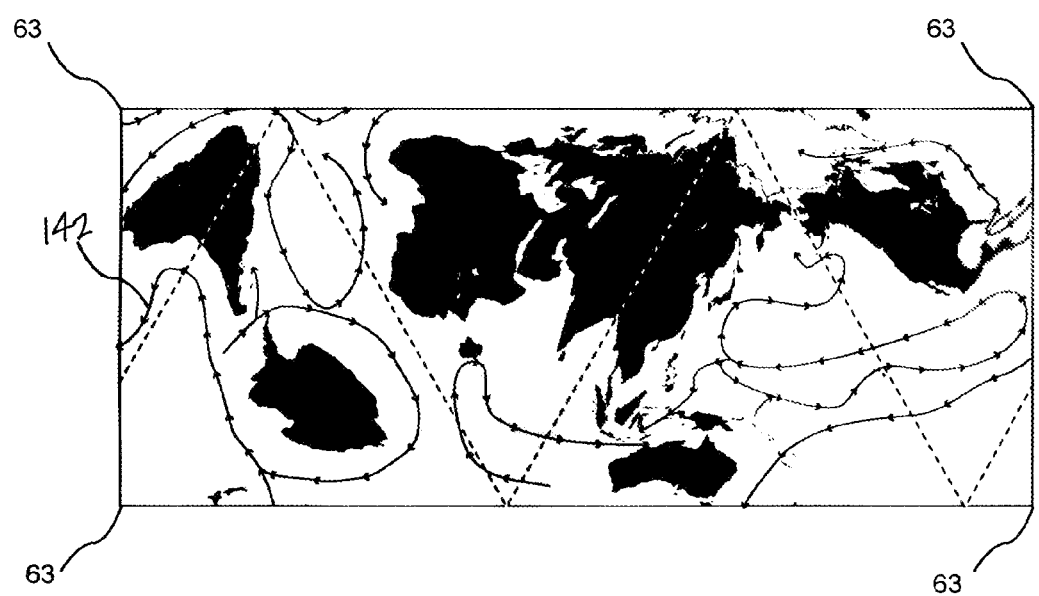
FIG. 14 is a schematic diagram showing world ocean currents of January in a world map according to the present invention.

As compared with the world ocean currents of January shown in the Dymaxion Map of FIG. 13, a world map according to the present invention as shown in FIG. 14 shows the same ocean currents clearly, continuously.

The frame for extracting a part of the tessellated image need not be rectangular. Instead, any other polygonal outline such as a triangular outline may be used. For example, only a part of the world such as the northern hemisphere may be extracted. Although the method has been explained by way of tessellation of a tetrahedral development in the lengthwise and crosswise directions, it contemplates other polyhedral development as well. Besides, the tessellation can be with gaps and/or overlaps as long as it contains some connections with seamless continuation. The tessellation can be arranged along any format such as a linear or a circular format. Tessellated images with local discontinuities are also contemplated by the present invention.

The first embodiment has been explained by way of a world map made by viewing the earth, taken as an object, from every external directions toward its center. However, irrespectively of optical axes being oriented inward or outward, omnidirectional photographs taken by a camera outwardly oriented from an internal single viewpoint can be treated as spherical images as well. These schemes of mapping have been regarded as different technical issues in existing techniques, but the present invention deals with both these schemes equally. Therefore, the technical matters explained here are applicable to other embodiments as well, and the first embodiment explained above may be used in omnidirectional photography as well.

Second Embodiment

Figure 15:
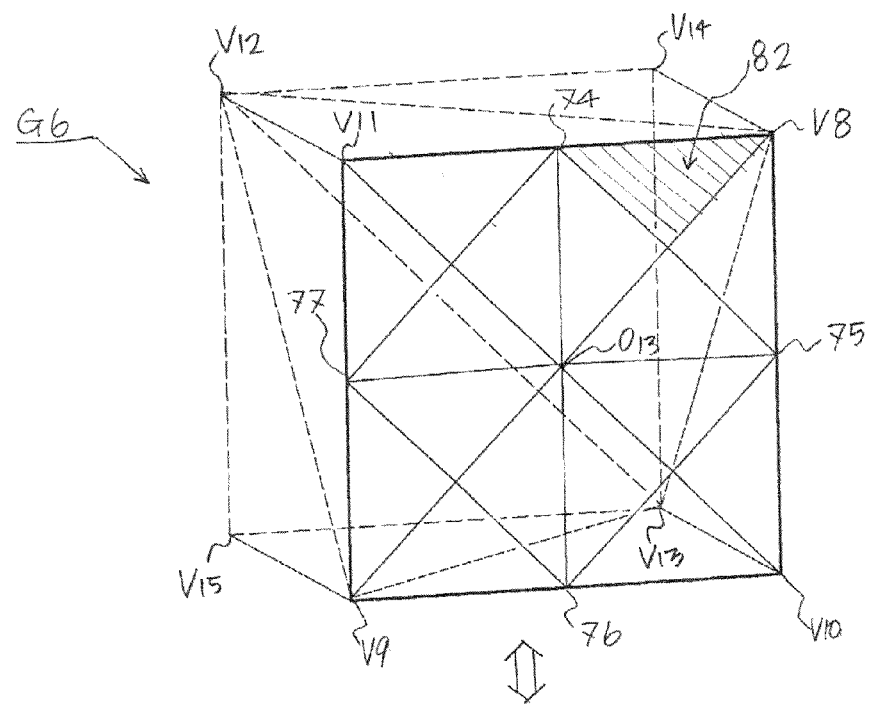
FIG. 15 is a schematic diagram of iso-area grids on a cube and on a spherical hexahedron according to the invention.
Figure 15:
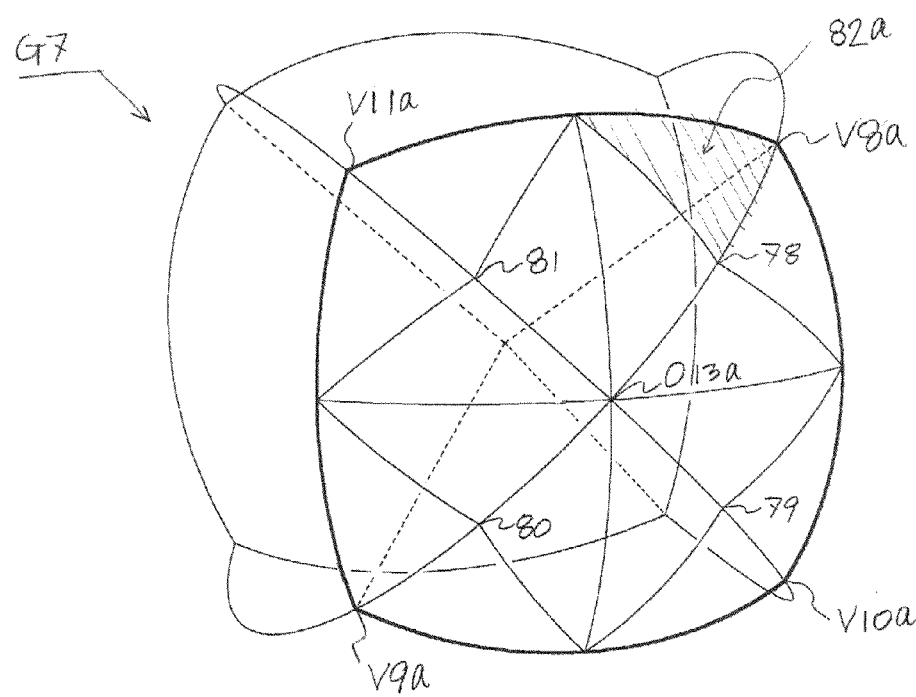

Iso-area division of a cube is next explained as a second embodiment of the invention. A cube can be readily transformed to a tetrahedron by converting four of eight cubic vertices to four faces. Therefore, information on a cube can be clearly remapped on cubic faces by photographing setting six optical axes along the cube. FIG. 15 shows a set of a cubic iso-area grid G6 and an iso-area grid G7 of a spherical cube circumscribing the iso-area grid G7, sharing common vertices. The grid G6 is an iso-area grid made by lines connecting diagonal corners of each cubic face and lines connecting mid points of all segments to equally divide each cubic face into sixteen triangles. One of these triangles is a region 82. In this manner, a cubic surface is divided to congruent 96 triangles.

In the grid G7, diagonal corners V8a, V9a, V10a, V11a of a spherical cubic face are connected by arcs (great circles), and their intersection O13a and midpoints of cubic edges are connected by arcs. Further, midpoints 78 through 81 of the great circles between the intersection 13a and the respective corners V8a, V9a, V10a, V11a are connected to the midpoints of the cubic edges. Thus, the cubic face is divided to sixteen equal spherical triangles. One of these sixteen spherical triangles is the region 82a. By similarly dividing the other three cubic face, the spherical face (spherical cube) is divided to 96 equal parts. In this manner, the region 82a on the sphere can be iso-area mapped at a region 82 on the cube. If a cubic image obtained by the iso-area mapping is iso-area-mapped on faces of a regular tetrahedron having the points V8, V9, V12, and V13 at its apexes, a regular tetrahedron having an iso-area-mapped image is obtained. If the image on the spherical cube is similarly mapped on a tetrahedron having points V10, V11, V14, V15 at its apexes, another regular tetrahedral image is obtained.

Third Embodiment

The iso-area division according to the invention includes a method of equally dividing a solid angle and next subdividing the divided solid angle with a network system such as graticule. It further includes a method of iso-area-mapping information on a polyhedron having a rectangular cross section onto the rectangular cross-section, thereby flattening out the image information.

Figure 16:
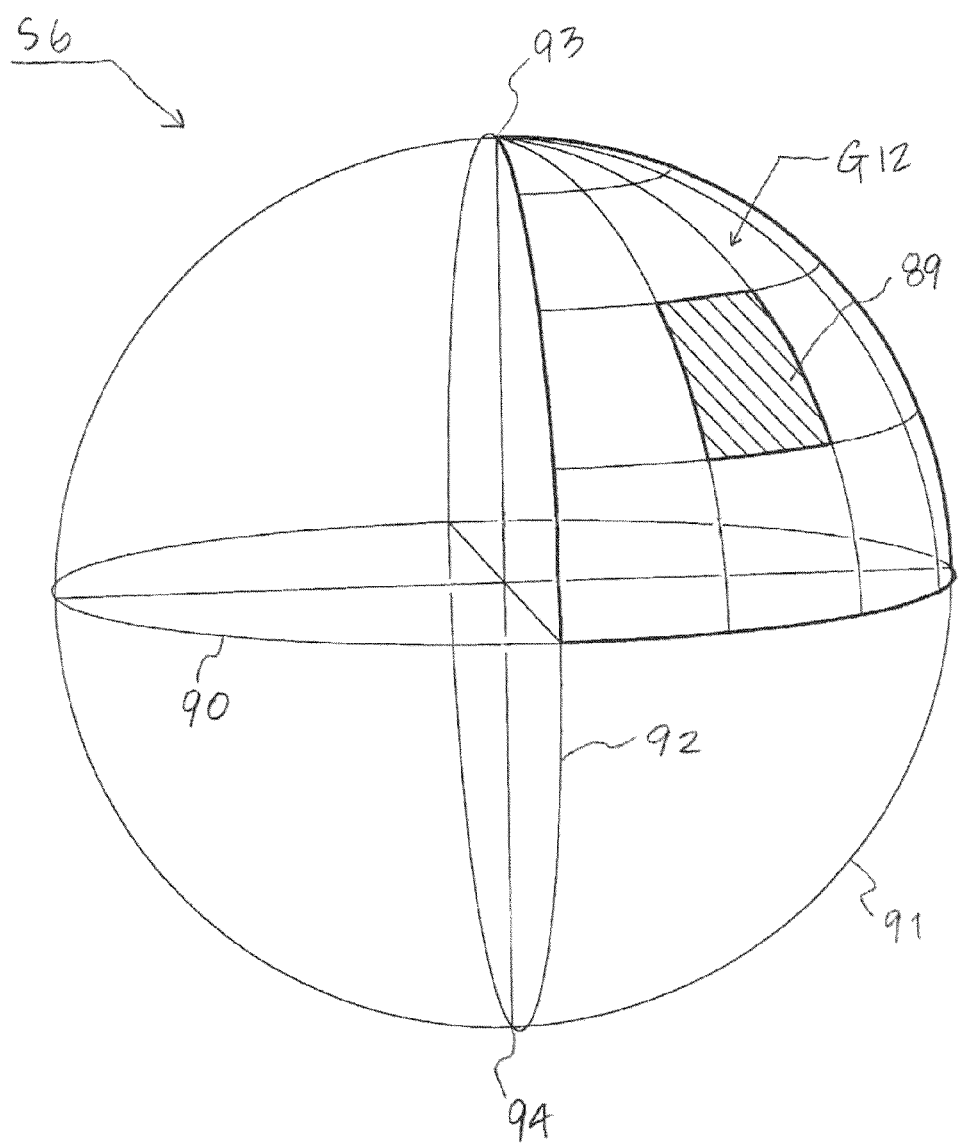
FIG. 16 is a schematic diagram of a graticule iso-area grid on full-spherical information according to the invention.
Figure 17:
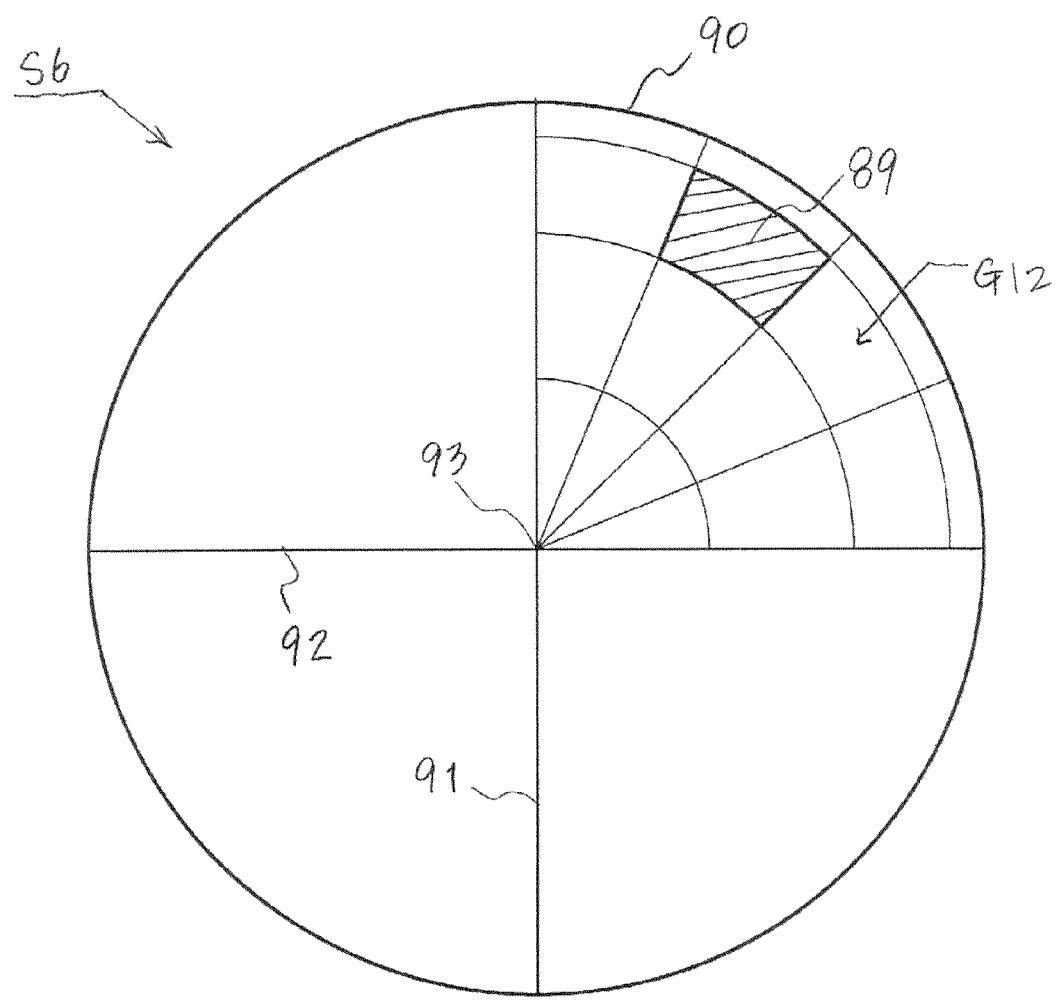
FIG. 17 is a schematic diagram corresponding to a top view of the full-spherical information shown in FIG. 16.

With reference to FIG. 16, the earth's surface, taken as typical omnidirectional spherical information, is equally divided along edges 90, 91, 92 of a spherical regular octahedron. Numeral 90 denotes the equator. Numerals 91 and 92 denote longitudes. A grid G12 subdivides the spherical regular octahedron with its graticule. One of the divisional region is shown at 89. A part of the grid G12 is shown on a sphere S6. It is preferable that, in this arrangement, the longitudes make a constant angle between every adjacent ones and the latitudes align in parallel to each other. Intersections 93, 94 of the longitudes 91, 92 correspond to the north and south poles in this case. FIG. 17 is a view centering at the North Point.

Figure 18:
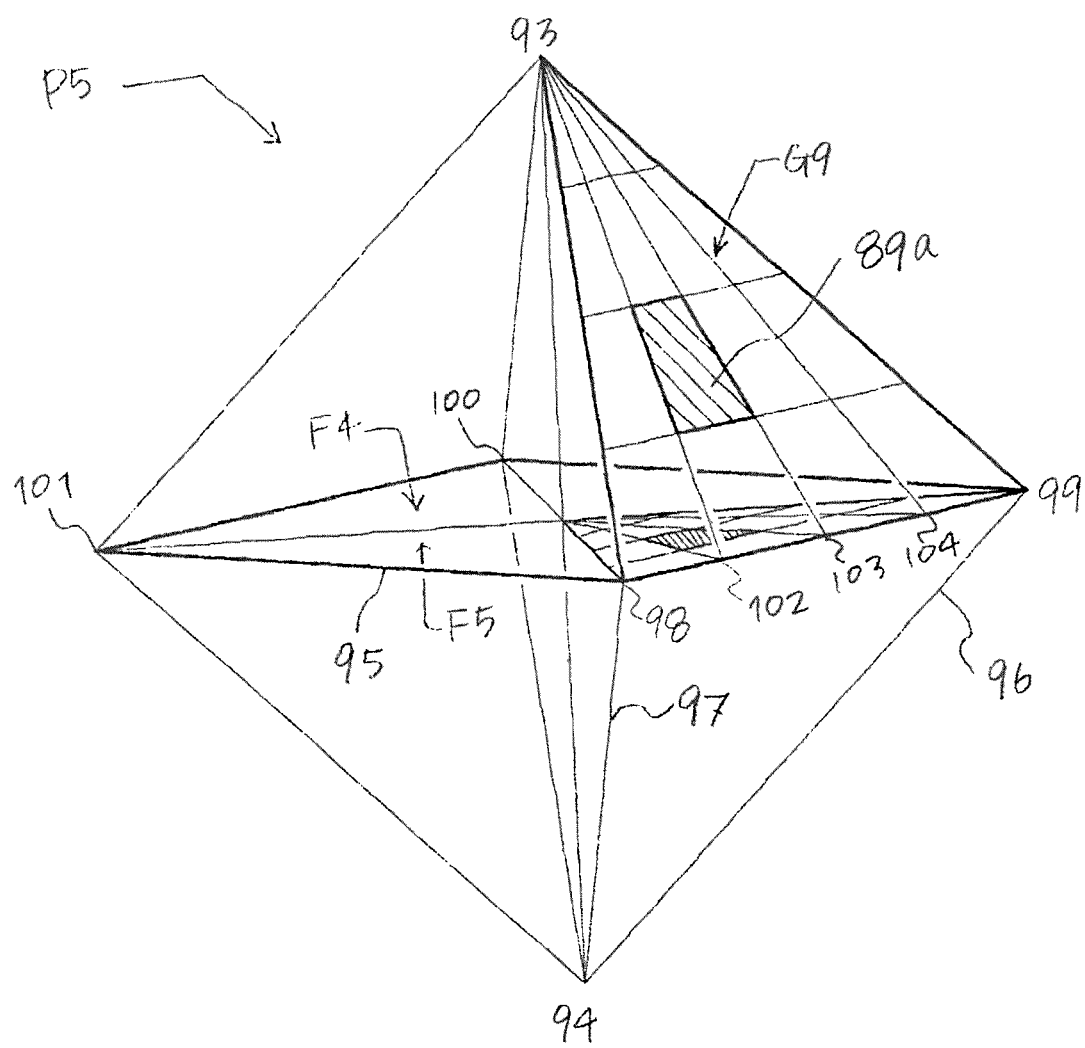
FIG. 18 is a schematic diagram showing a graticule iso-area grid on an octahedron according to the invention.

FIG. 18 shows a part of an iso-area grid G9 on an octahedron P5 sharing vertices with and inscribing to the spherical octahedron S6. Three squares 95, 96 and 97 share vertices of the octahedron as their vertices. The grid G9 comprises longitudes, which connect a point 93 (for example, north pole) to points 102, 103, 104 equally dividing an octahedral edge, and latitudes aligned in parallel to the segment connecting the vertices 98, 99, In this grid G9, the longitudes may make a constant angle between every two adjacent ones. A region 89a is one of divisional regions made by the grid G9. In this manner, respective regions are iso-area-mapped from the grid G12 to the grid G9, and the region 89, for example, is mapped on a region 89a.

Figure 19:
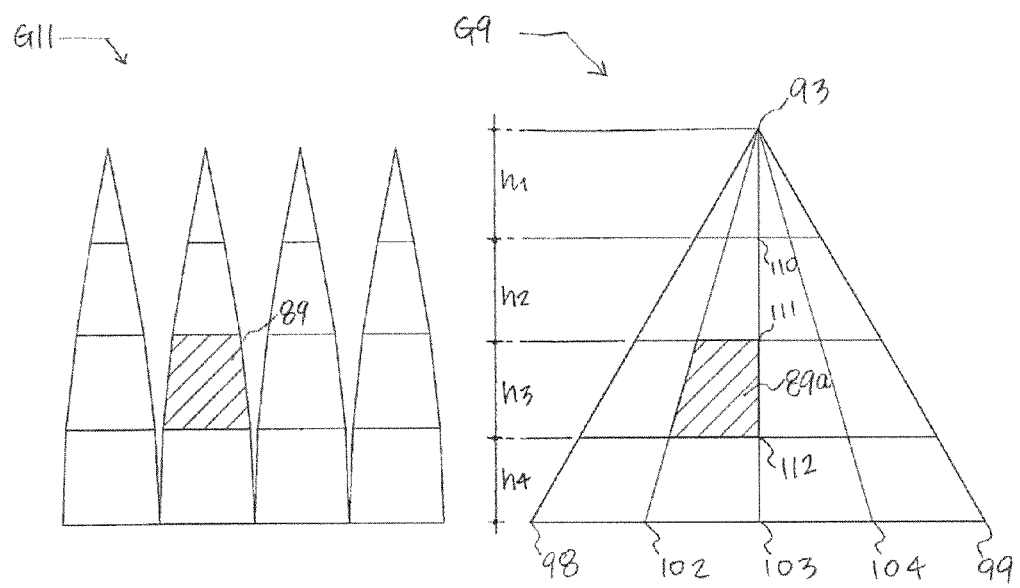
FIG. 19 is a schematic diagram showing two-dimensional developments of the grids shown in FIGS. 16 and 18.

A grid G11 shown in FIG. 19 is a development of the grid G12 shown in FIG. 16. A grid G9 is a front elevation of the grid on the regular octahedron P5 shown in FIG. 18. To ensure iso-area mapping of each divisional region from the grid G11 to the grid G9, distances between lines corresponding to latitudes are adjusted to satisfy h1:h2:h3:h4=22.3: 21.5:19.9:17.5.

Figure 20:
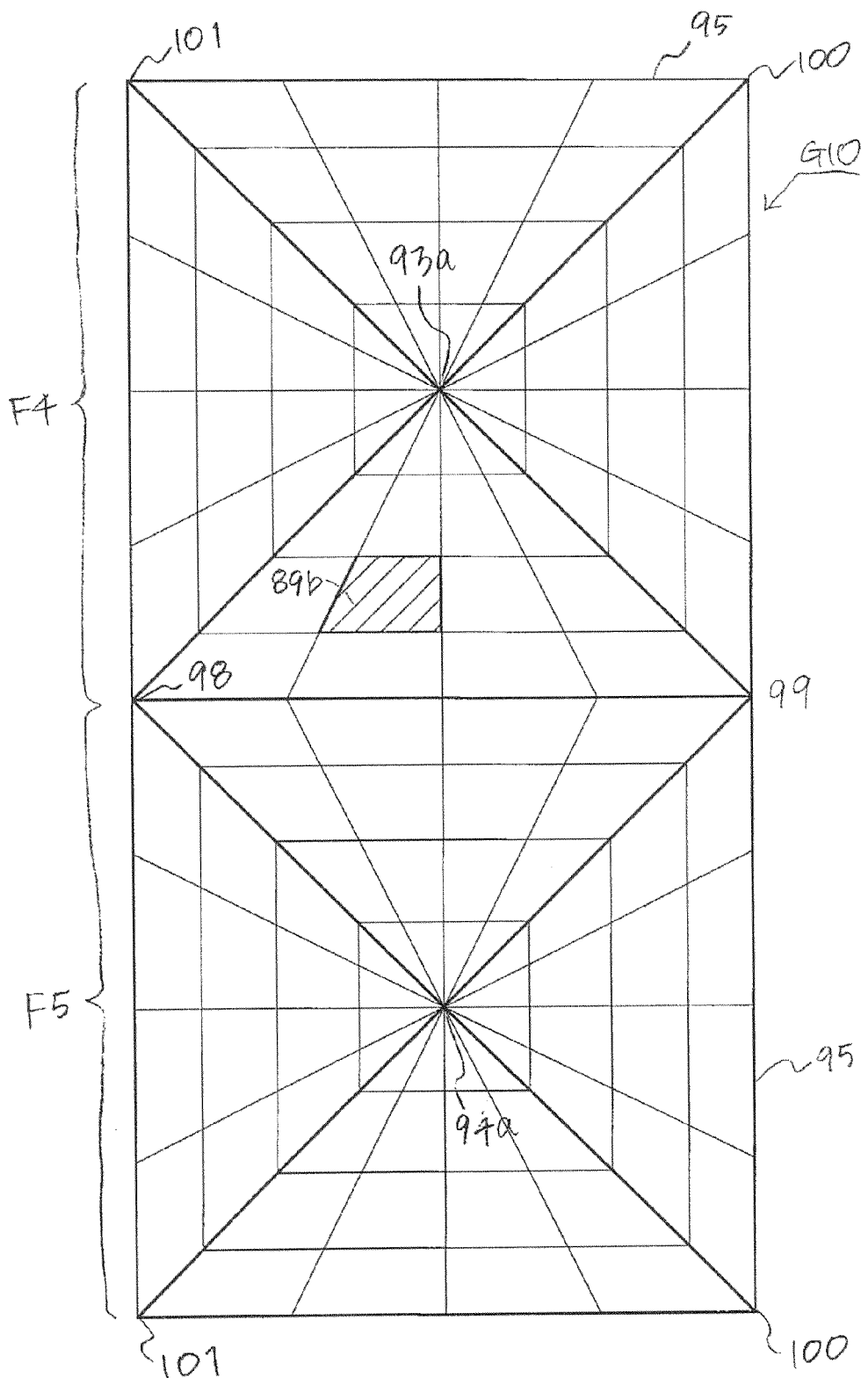
FIG. 20 is a schematic diagram showing a grid on two opposite square faces on which an octahedral image has been mapped according to the invention.
Figure 21:
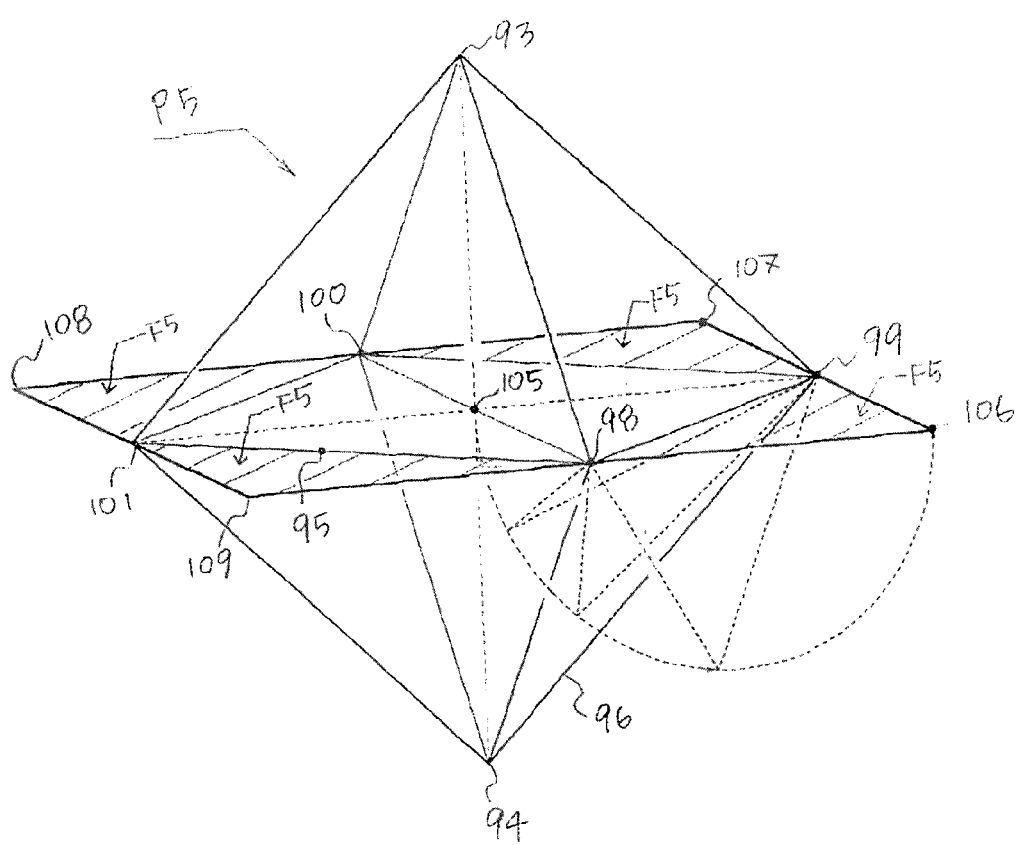
FIG. 21 is a diagram showing a process of integrating images mapped on two opposite faces and covering a full-spherical field onto a single square plane according to the invention.

After the same mapping operation with the grids is carried out on all other octahedral faces, a complete octahedral image P5 obtained thereby is next iso-area-mapped on front and back faces (F4 and F5) of one of three squares 95-97. FIG. 20 shows a layout of these front and back faces F4 and F5 of the square region 95 both now having mapped images. The grid G9 on the octahedron has been mapped on a grid G10, and the region 89a has been mapped on a region 89b. This side-by-side alignment of the layout of the regions F4, F5 as illustrated in FIG. 20 turns out a rectangular image of the aspect ratio of 1:2. FIG. 21 is an axonometric diagram of the octahedron P5 shown in FIG. 18. By dividing the back face F5 into four triangles with its diagonals and integrating them, turned upside down, with the front face F4, a square omnidirectional image having four corners 106,107,108, 109 is obtained. The operation carried out by using the square 95 can be replaced with the same operation using, instead, the square 96 or 97. Thus, three rectangular images can be made in total. This method capable of creating three different square images from a single omnidirectional image is significantly advantageous as compared with any existing art. These grids G12, G9, G10 are hereafter called "graticule-iso-area grids".

For easier understanding of the present invention, explanation made herein is based on geometry, using various geometrical terms that have definite meanings. Upon practicing the invention, however, inevitable errors or modifications must be allowed in actual operations of computers or in an actual process for making computer programs or physical objects such as cameras. Therefore, note that the invention assumes such geometrical imperfections. The terms, "equal", "parallel" and "ratio of 1:2", should not be construed in their strict definition. Instead, such terms herein contemplate a reasonably loose extent of approximation to involve the meanings of "substantially equal", "substantially parallel", and "ratio of approximately 1:2".

The same mapping method is applicable to any 3-D object having a rectangular cross sections each defined by two points on a face of the object and one or more points on another face of the object.

Figure 22:
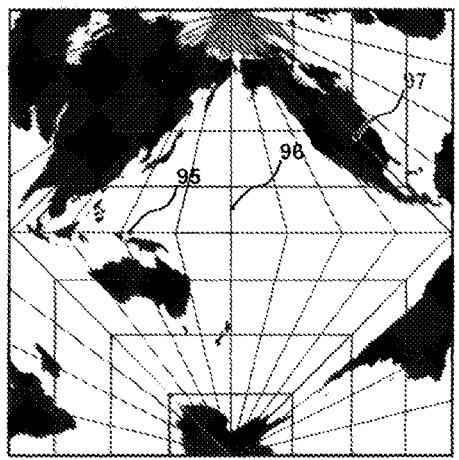
FIG. 22 shows three different images of a world map all flattened from an octahedral image according to the invention.

World maps LC13, LC14 and LC15 shown in FIG. 22 are examples of images that can be obtained by the above-explained method. These maps keep an equal-area layout even for the Antarctica and the icy field in the Arctic Ocean that are distorted in the Mercator projection, and maintain the latitudes concentrically parallel and longitudes radially extending from the poles.

In this and other embodiments, the grid used for the division may be displayed. Scales of longitudes, latitudes, angles of elevation, angles of direction, distances, etc. may be indicated as well. It is also possible to omit a mapping process on an octahedron and directly map a plane image such as a world map by an existing cartography, a panorama or a fisheye image on a rectangular plane while eliminating distortions.

Figure 23:
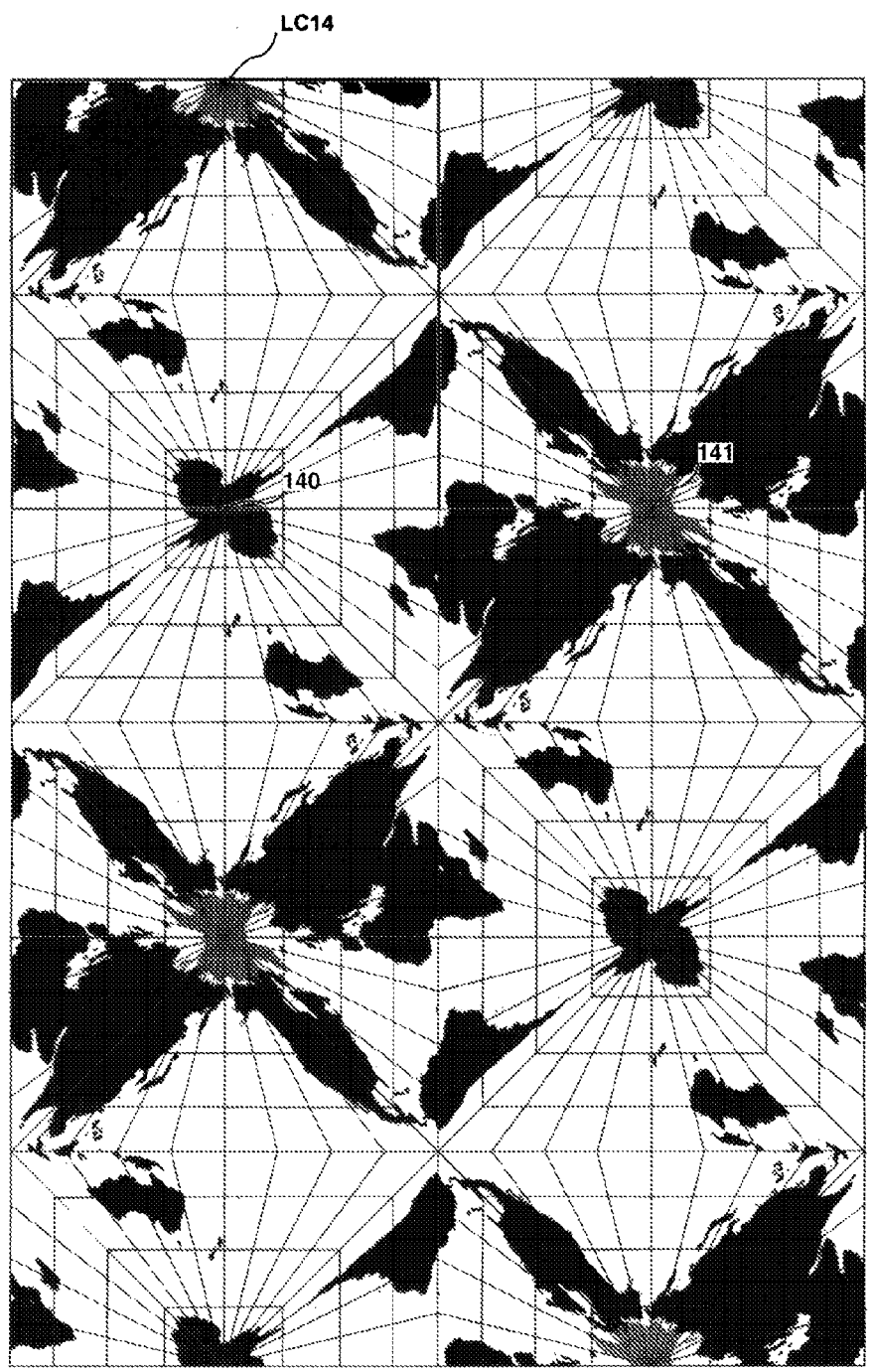
FIG. 23 is a diagram showing a result of tessellation of one of the three images of the world map shown in FIG. 22 according to the invention.
Figure 24:
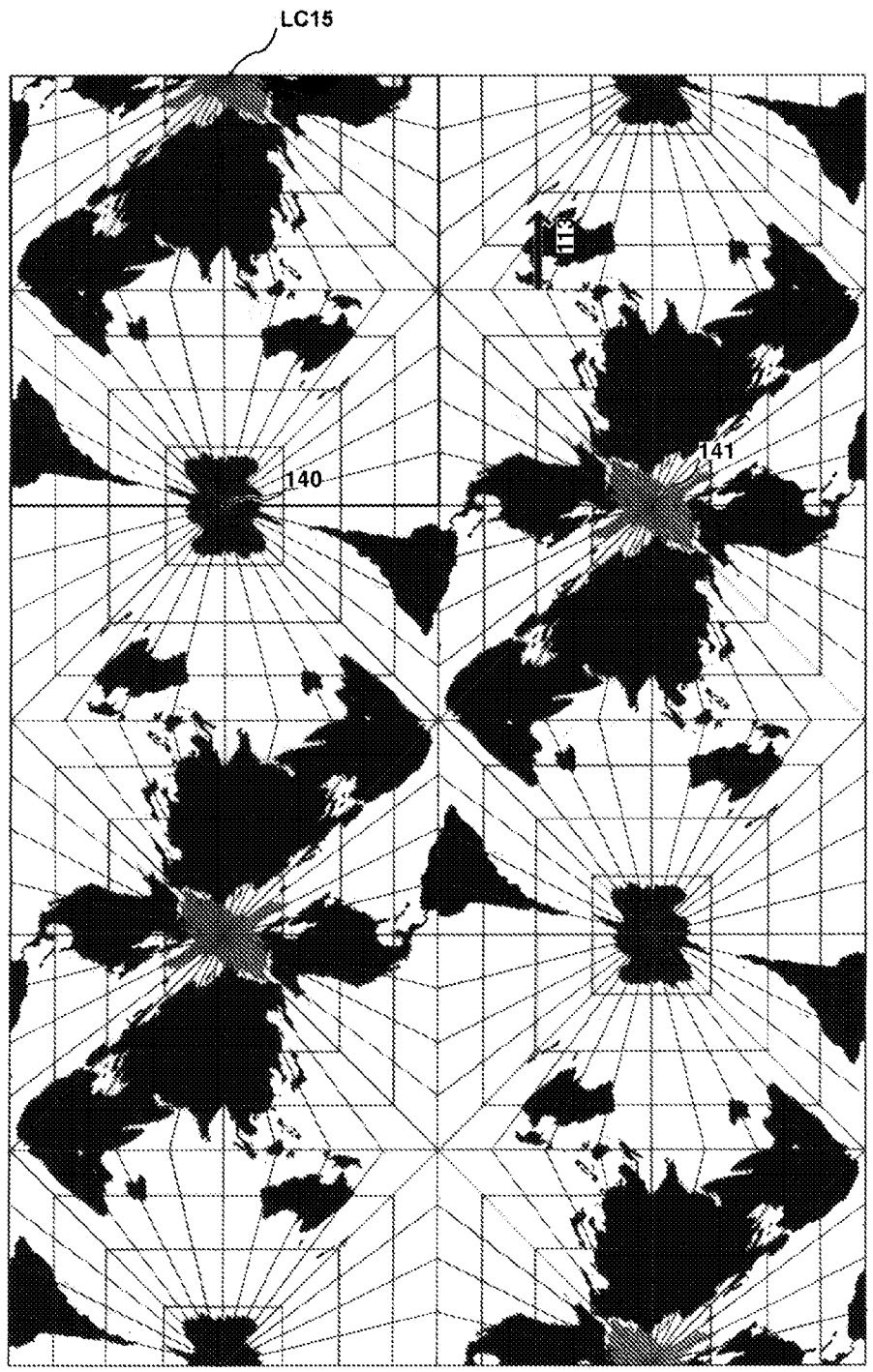
FIG. 24 is a diagram showing a result of tessellation of another of the three images of the world map shown in FIG. 22 according to the invention.
Figure 25:
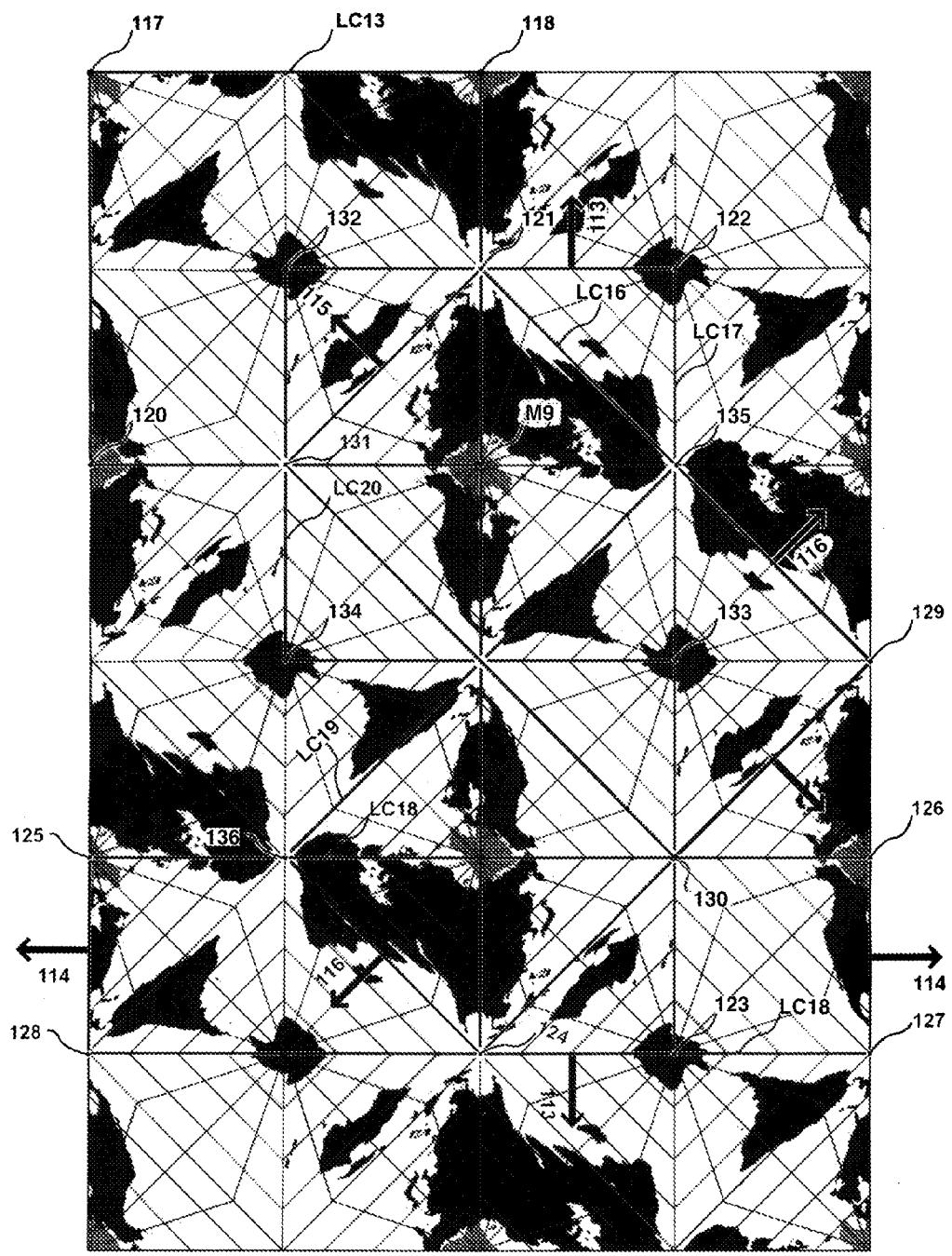
FIG. 25 is a diagram showing a result of tessellation of the rest of the three images of the world map shown in FIG. 22 according to the invention.

FIGS. 23 and 24 show images made by tessellating the world maps LC14 and LC15 respectively as unit or cell images. It may sometimes occur that a subject such as the Antarctica or an icy field on the Arctic Ocean appearing near a midpoint 140 or 141 of an edge of the square of one unit image connects to the same subject of a neighboring unit image along their border. FIG. 25 shows an image made by tessellating the world map LC13. In this map, all continents are displayed properly. As such, this method according to the invention presents three omnidirectional images and permits the best one of them for a particular purpose to be selected.

Further, a user can extract a secondary square unit LC20 (world map) defined by four corner points 122,133,134 and 132 centering at the North pole from a tessellated image shown in FIG. 25, as well as a world map as a secondary rectangular unit LC16 having the aspect ratio of 1:2 defined by four corner points 121,129,130 and 131. These maps display both the arctic and Antarctic polar regions accurately, and present easy-to-view images of the southern hemisphere that is critically distorted in a map by the Lambert's azimuthal equal-area projection. From this tessellation, users can extract a world map as a secondary rectangular unit LC17 having the aspect ratio of 1:4 as well.

The secondary unit LC17 functions as a viewer that can rotate and slide the viewer frame in the directions pointed by arrows 113. By moving the viewer frame, the viewer can extract a rectangular world map LC18. The world map LC18 functions as a viewer too, which can rotate and slide in the directions pointed by arrows 114. The secondary unit LC16 functions as a viewer too, which can rotate and slide in the directions pointed by arrows 115. By moving it, the viewer can extract a rectangular world map LC19 as well. The world map LC19 functions as a viewer too, which can rotate and slide in the directions pointed by arrows 116. As such, this method permits a user to select a viewer of a desired aspect ratio covering up to an entire view in maximum to obtain the best frame of a world map centering at any desired area of the world.

In this and other embodiments of the invention, the viewers may keep their rectangular shapes during zooming, sliding and rotating, or the viewers may change their aspect ratios and/or outlines to any arbitrary shapes. The iso-area division may be simplified and/or approximated, taking account of a limited speed of computer calculation though the distortion correction becomes limitative. Further, the process of subtracting information of distance for importing a view into a unit sphere may be omitted. In this case, the process will result in modifying a 3-D space. For example, if information of the universe with stars and other astronomical information is converted while keeping information of distances, observers can command, from a certain viewpoint (such as the earth), an entire visual field of night sky with stars in a rectangular omnidirectional image, and can realize, from another viewpoint, a particular 3-D space in which they can figure out distances to respective celestial bodies.

Another method for measuring distance on a two-dimensional display is provided by zoning a space of a visual field by a series of concentric spheres with different radii. Subjects in each divisional zone between two spheres are projected on one of the two spheres and then rectangulated according to the invention. Each rectangle displays only subjects located within the distance between two radii. Thereafter, a series of rectangle images are tessellated in the order of lengths of radii. As a result, the obtained tessellation sorts out the subjects in the order of their distances. A user can figure out a distance of any object described as a grid value of a 2-D coordinate. These matters explained with reference to the third embodiment are applicable to all other embodiments as well.

Fourth Embodiment

Figure 51:
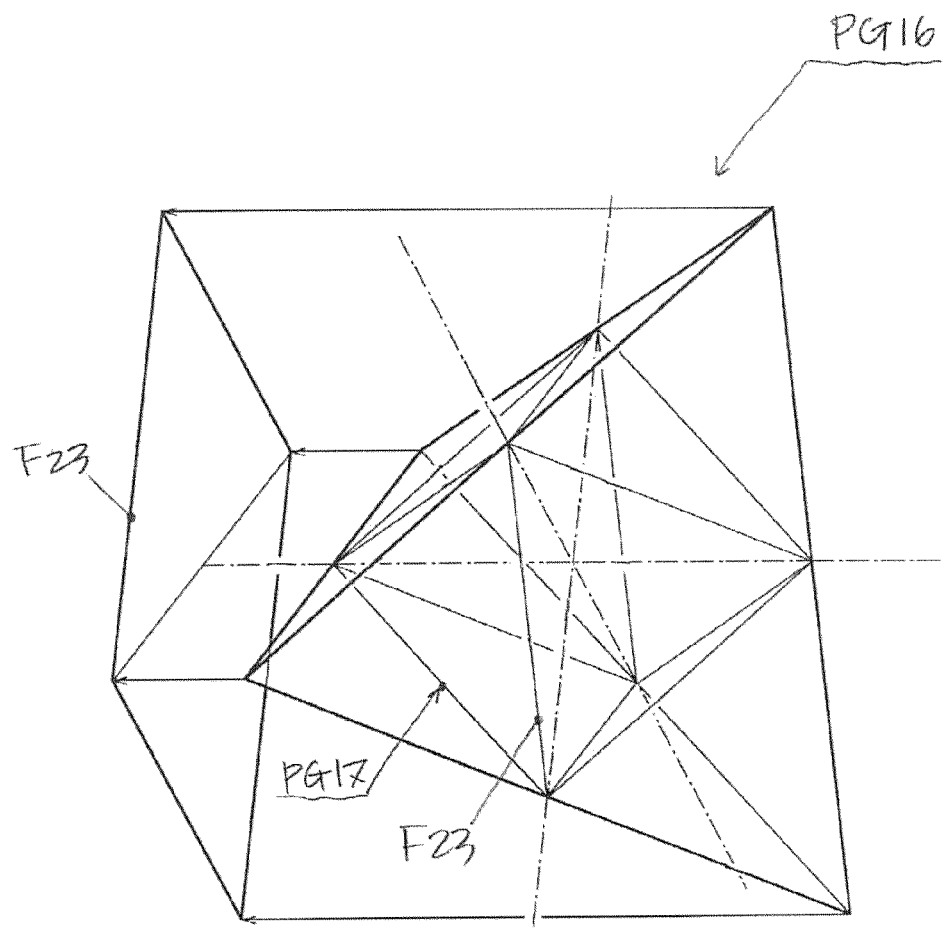
FIG. 51 is a schematic diagram illustrating a process of mapping a polyhedral image on a rectangular plane via a tetrahedron according to the invention.

The above-explained method may be modified to replace an octahedron with a tetrahedron. FIG. 51 schematically shows a tetrahedral omnidirectional image PG16. Two tetrahedral triangles are mapped on a front side of a square F23 and two other triangles are mapped on a back face of the square F23. An omnidirectional rectangular image is obtained by flipping the one side of the square F23 and uniting it to the other side. This method is usable as long as the square F23 is approximately parallel to a tetrahedral edge regardless of whether the square locates in or out of the tetrahedron PG16. The obtained image can be tessellated in the same manner as explained with reference to preceding embodiments.

Further, a couple of hexagonal images is obtained by diagonally mapping a cubic image on two sides of a hexagonal section. The obtained image can be tessellated with no gap and with some connections with seamless continuation. The method can be also applied to any polyhedron as long as a link of its edges composes a polygon along a great circle. For example, a couple of decagonal images is obtained by mapping an icosi-dodecahedral image on a decagonal section. A plurality of the obtained images can be tessellated with some gaps and with some connections with seamless continuation. The method can map an image on only one side instead of two sides. A tetrahedral image may be re-mapped on an octahedron PG17 to flatten out an image according to the method introduced above.

Fifth Embodiment

Figure 28:
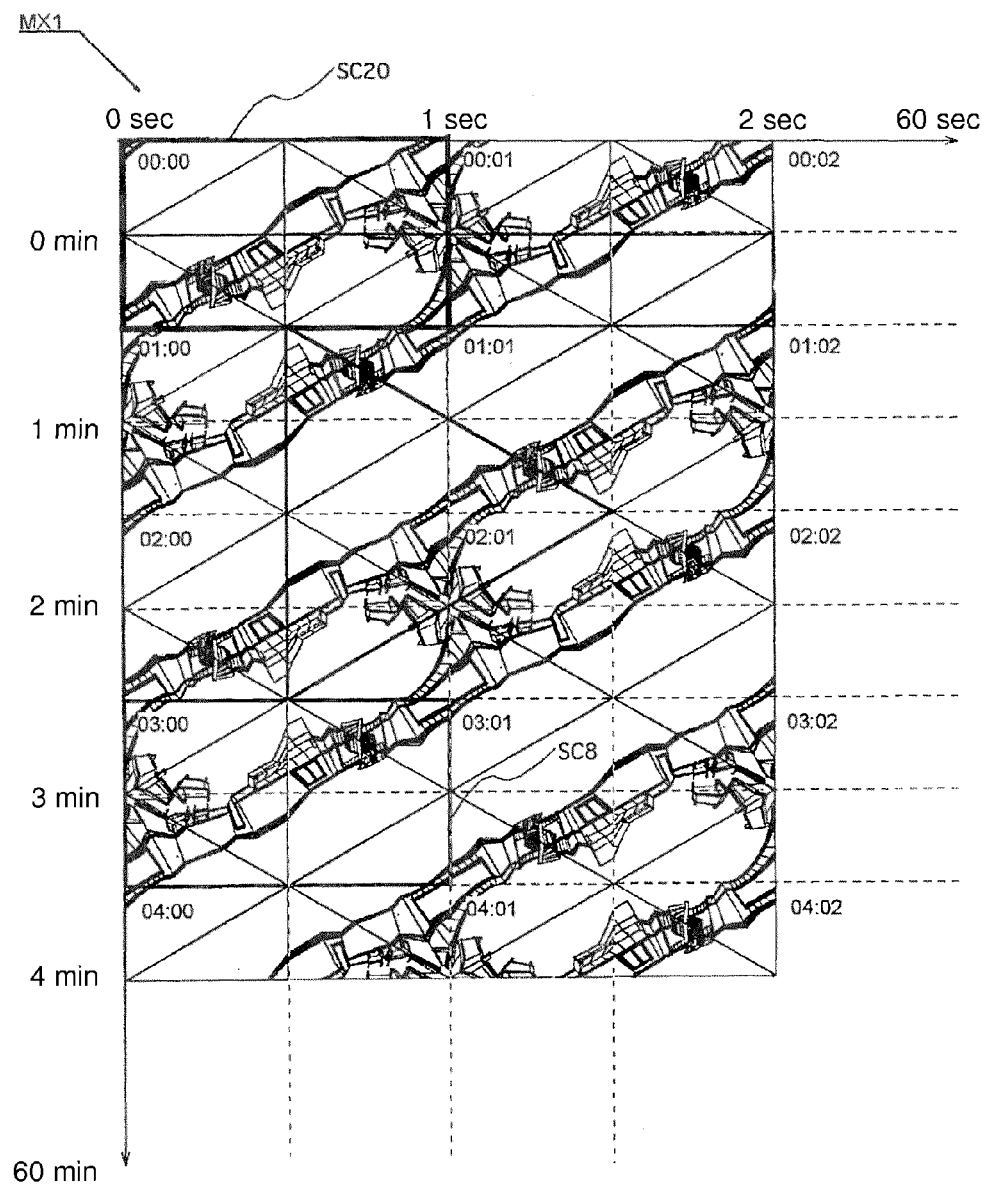
FIG. 28 is a schematic diagram of a tessellated image showing an entire sequence of a scene according to the invention.

The method according to the invention includes a tessellation method viewing an entire event for certain duration, hereafter called "chronological tessellation" as well. FIG. 28 schematically shows a chronological tessellation MX1 composed of 60 (vertical)×60 (horizontal) rectangular omnidirectional image units SC20, photographed at intervals of one second and tessellated chronologically. The image unit SC20 taken here is an image of an interior space with stairs and furniture. With this arrangement, it displays entire events for one hour at once with two different time scales: seconds in the horizontal direction and minutes in the vertical direction. With a chronological tessellation, spatial and sequential information of adjacent units properly matches seamlessly. It can be displayed as an animation by viewing the unit image SC20 one after another in chronological order. In this aspect, a chronological tessellation is a video format. Since the chronological tessellation shapes a rectangle, it can record an entire animation in jpeg or any other wide-use format for a still image. Time frames are not separated by visible boundaries and maintain seamless continuation of still objects across the frame boundaries.

Each unit SC20 may display an animation instead of a still image. If each unit SC20 shows an animation of one-second duration, a user can observe the entire sequence in detail in one second. Twenty-five images taken in a second may be overlaid on a region of unit SC20 or arranged three dimensionally in depth. This method can be customized to clearly show a subject for various needs by adjusting the exposure time, interval of exposure and number of columns and rows of tessellation. An observer can sweep all events of a full day by a chronological tessellation composed of 24 (vertically)× 60 (horizontally) units photographed every one minute and tessellated in the chronological order. In case of monitoring a crowded station, a chronological tessellation of unit images photographed by the shutter speed of one minute filters out moving passengers and extracts only things long left in the crowd such as suspicious packages. A chronological tessellation need not arrange unit images chronologically. If it is more efficient to observe, units or parts of units may be arranged in an unchronological order. The technical matters explained in this paragraph are applicable to all other embodiments as well.

Figure 29:
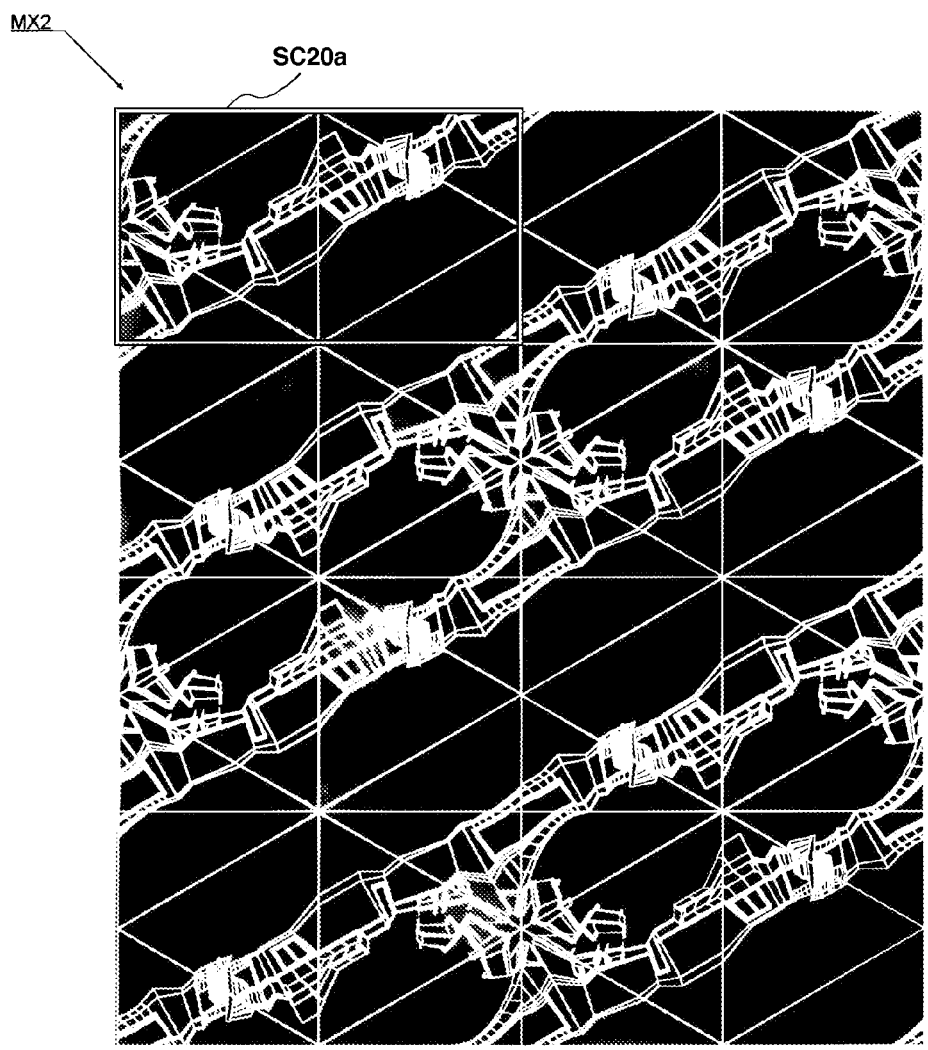
FIG. 29 is a schematic diagram of an image tessellated by a negative template image according to the invention.

The invention includes a monitoring method for extracting only unusual events. FIG. 29 schematically shows a tessellation image MX2 generated by tessellating a unit image SC20a repeatedly. The image SC20a is an inverted negative image of SC20 and it is used as a template image showing a normal condition of the space to be monitored.

Figure 30:
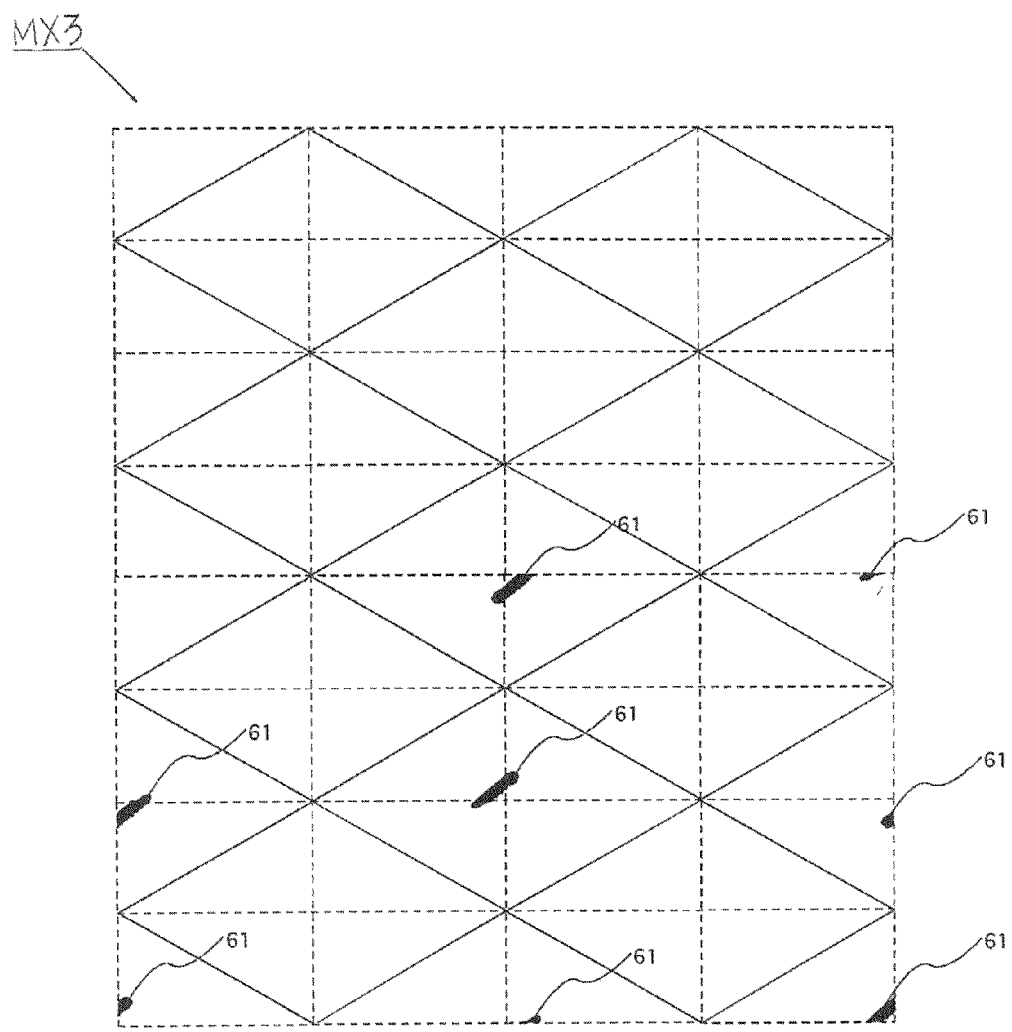
FIG. 30 is a schematic diagram of an image made by integrating the images shown in FIGS. 28 and 29 for monitoring purposes according to the invention.
Figure 61:
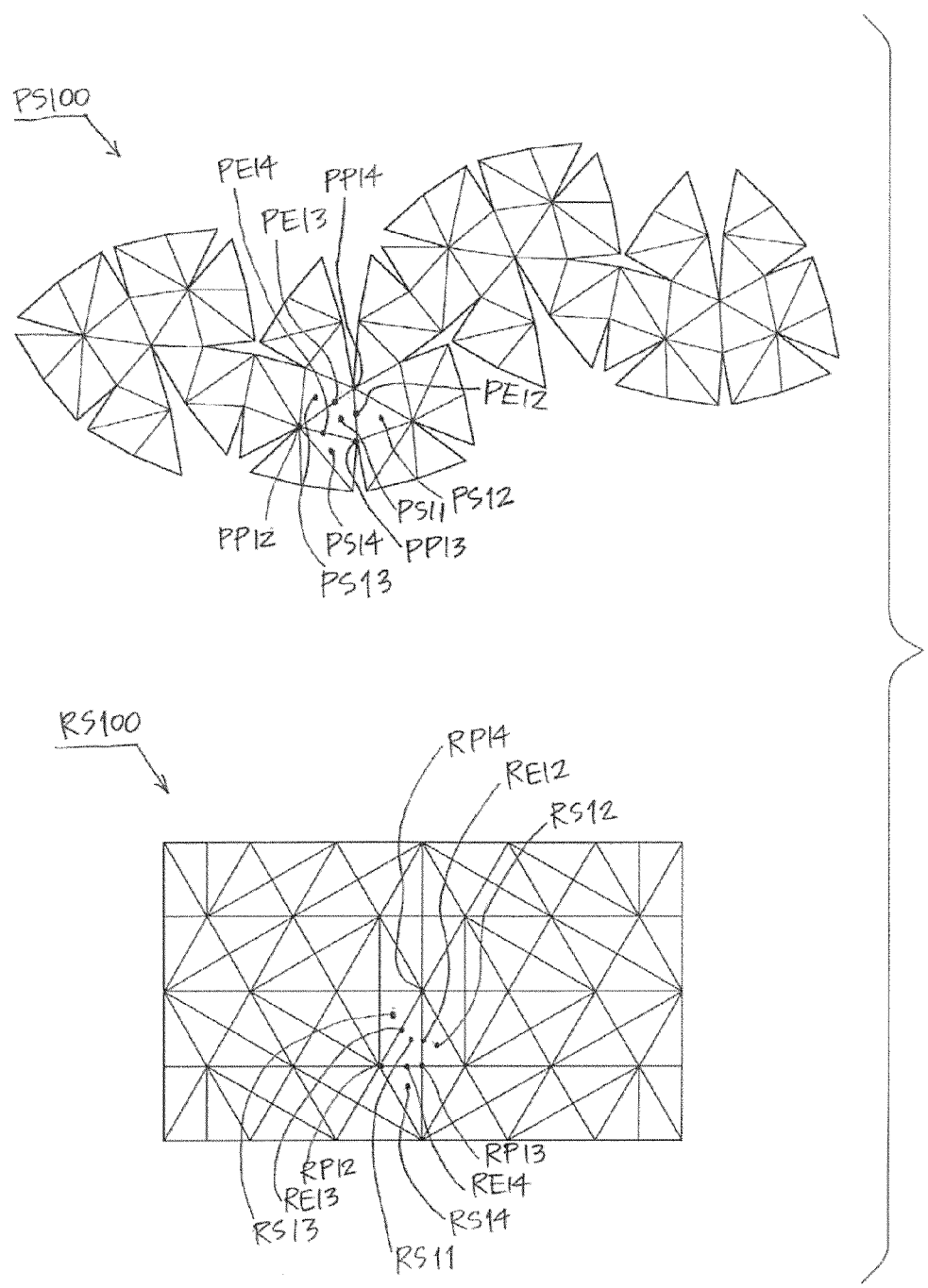
FIG. 61 is a schematic diagram illustrating another model of the mapping concept according to the invention for development of an image from a polygon.
Figure 62:
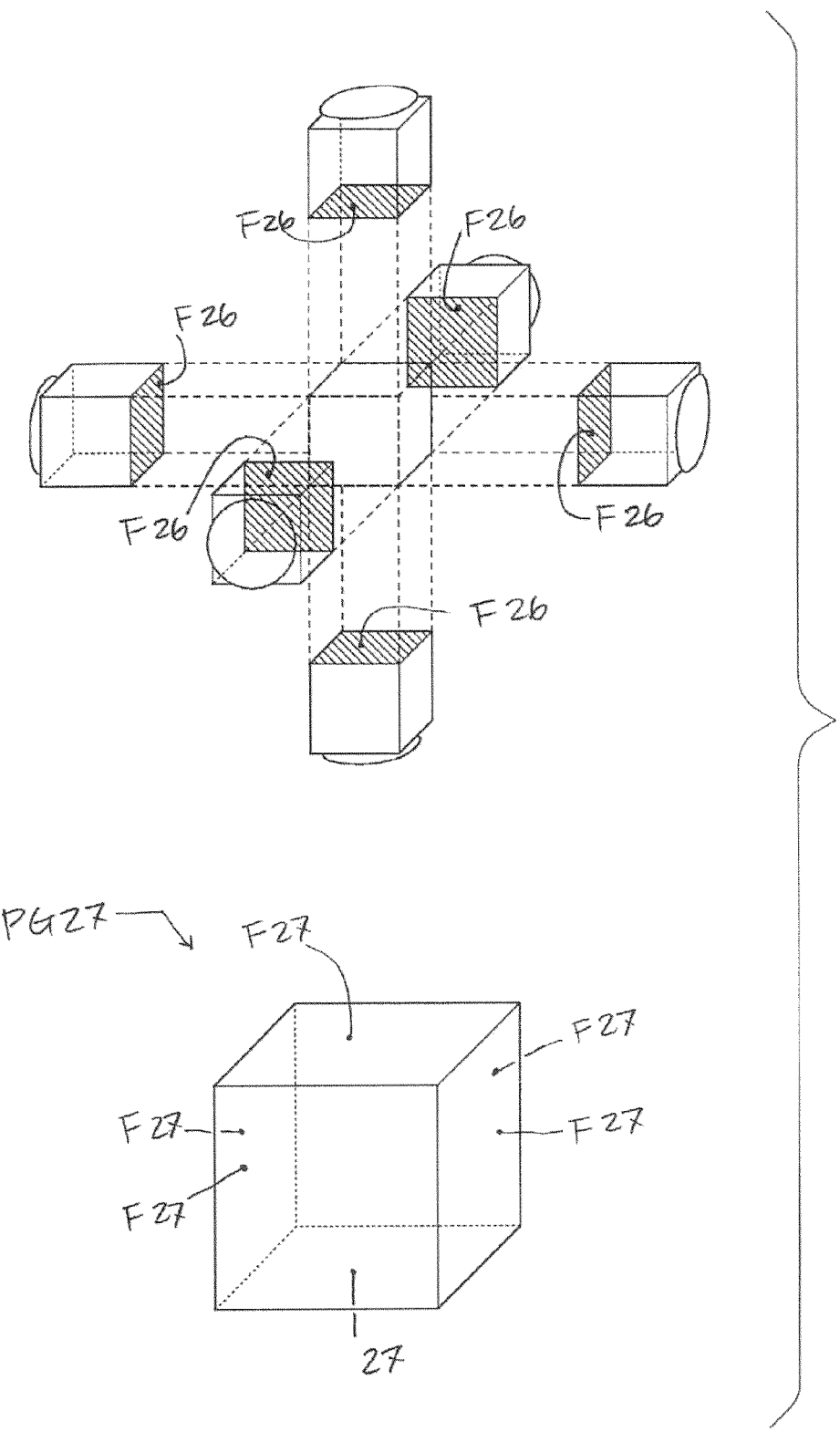
FIG. 62 is a schematic diagram illustrating a process of uniting images on discontinuous planes of projection onto one object according to the invention.

FIG. 30 schematically shows a monitoring display MX3 combining the tessellation images MX1 and MX2. White blanks in the display represent nothing has been changed. It keeps the display surface blank unless any movements or changes occur. A subject's negative image on MX2 perfectly matches and cancels out its positive image, complementary colors, on MX1. Once a change or a movement occurs in a visual field, images on the tessellation images do not match and cannot cancel the colors. An un-matched part emerges as a FIG. 61. This method permits a user to find an accident by observing the display MX3 and to start inspection of the time frame around the FIG. 61 on the display MX3 by moving the viewer.

Usually, the most part of monitoring display MX3 remains white as long as an ordinary condition is maintained in the monitored space. Widely used file formats such as jpeg can efficiently compress such images and can reduce the file size when the data is saved in hard discs. With a template image SC20 saved separately, it is possible to restore an original chronological tessellation image by combining the template image SC20 with the image MX3. This method is advantageous for long time video recording with a full frame in a full motion which requires a big capacity of data storage.

The template image SC20a may be renewed to update the ordinary state in accordance with changes of conditions such as daylight, for example. A tessellation image MX2 may contain several template images taken under different conditions. Several template image units or parts of units can be arranged in an unchronological order. It is also possible to modify the tessellation image MX1 by delaying, which means shifting one or more time frame for tessellating units and inverting the color, which can substitute for template tessellation MX2. In this case, this method can provide a monitoring display MX3 by combining a chronological tessellation and the modified tessellation image. In this case, the display notifies a change as a figure during the delay of time frames. It also can invert a chronological tessellation image instead of template tessellation image. It also can obtain a monitoring display by image enhancement and suppression by controlling each color component RGB, CMYK, HSB or Lab) and/or opacity so as to cancel the color, brightness, saturation, and/or hue of unchanged object so as to emphasize the desired subjects.

Sixth Embodiment

Figure 63:
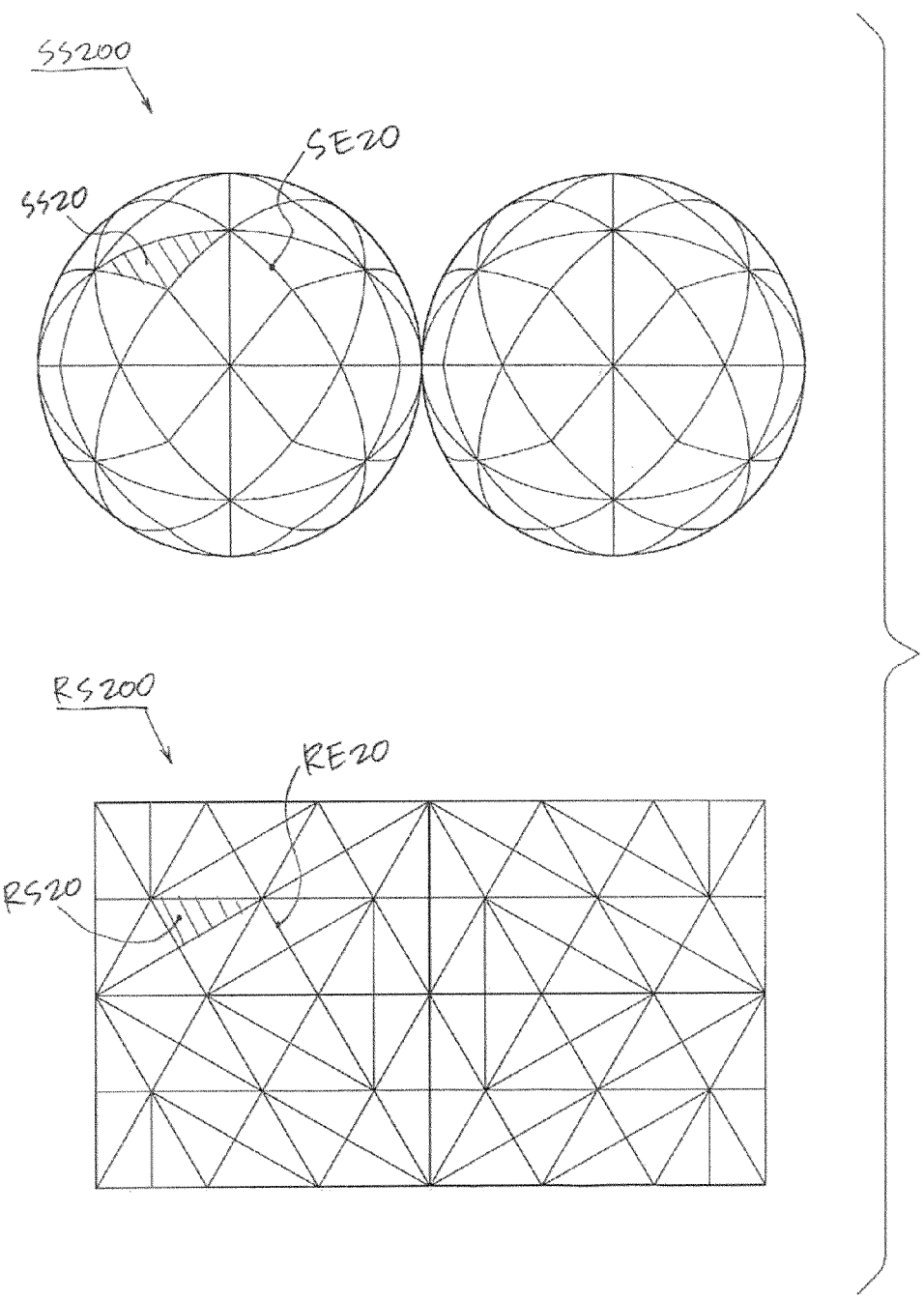
FIG. 63 is a schematic diagram illustrating another model of the mapping concept according to the invention for circular images.

The invention includes a method of iso-area-mapping an image from one plane to another. FIG. 63 shows such a method of mapping a couple of circular images SS200 taken by a fisheye lens on a rectangular plane RS200. The images SS200 constitute an omnidirectional view taken by two times of exposure. Each of the circular images covers $2\pi$ sr visual field. Here is made a grid composed of segments SE20 on the basis of iso-area division by the grid G2 shown in FIG. 2, taking account of the projection characteristics of the lens, which inevitably influence the projected image, to ensure that an original solid angle of each divisional region be equal. The segments SE20 include curves. The grid composed of segments SE20 divides the region SS200 into 96 regions.

Still referring to FIG. 63, a grid composed of segments RE20 divides the rectangular region RS200 into 96 regions equal in area (solid angle). Numeral RS20 denotes one of these divisional regions. Both the grid on the circular images SS200 and the grid on the rectangular region RS200 are generated according to iso-area division by the grid G2 shown in FIG. 2. Therefore, each divisional region SS20 in the region SS200 has an exclusive correspondence with a particular one of the divisional regions RS20 in the rectangular region RS200. Thus, circular images SS200 are iso-area-mapped on a rectangular plane by mapping individual regions SS20 on their respective counterpart regions RS20.

In this mapping process, it is necessary to adjust an area ratio of a region when mapping on a rectangular plane to maintain its original solid angle when photographing.

Seventh Embodiment

Figure 64:
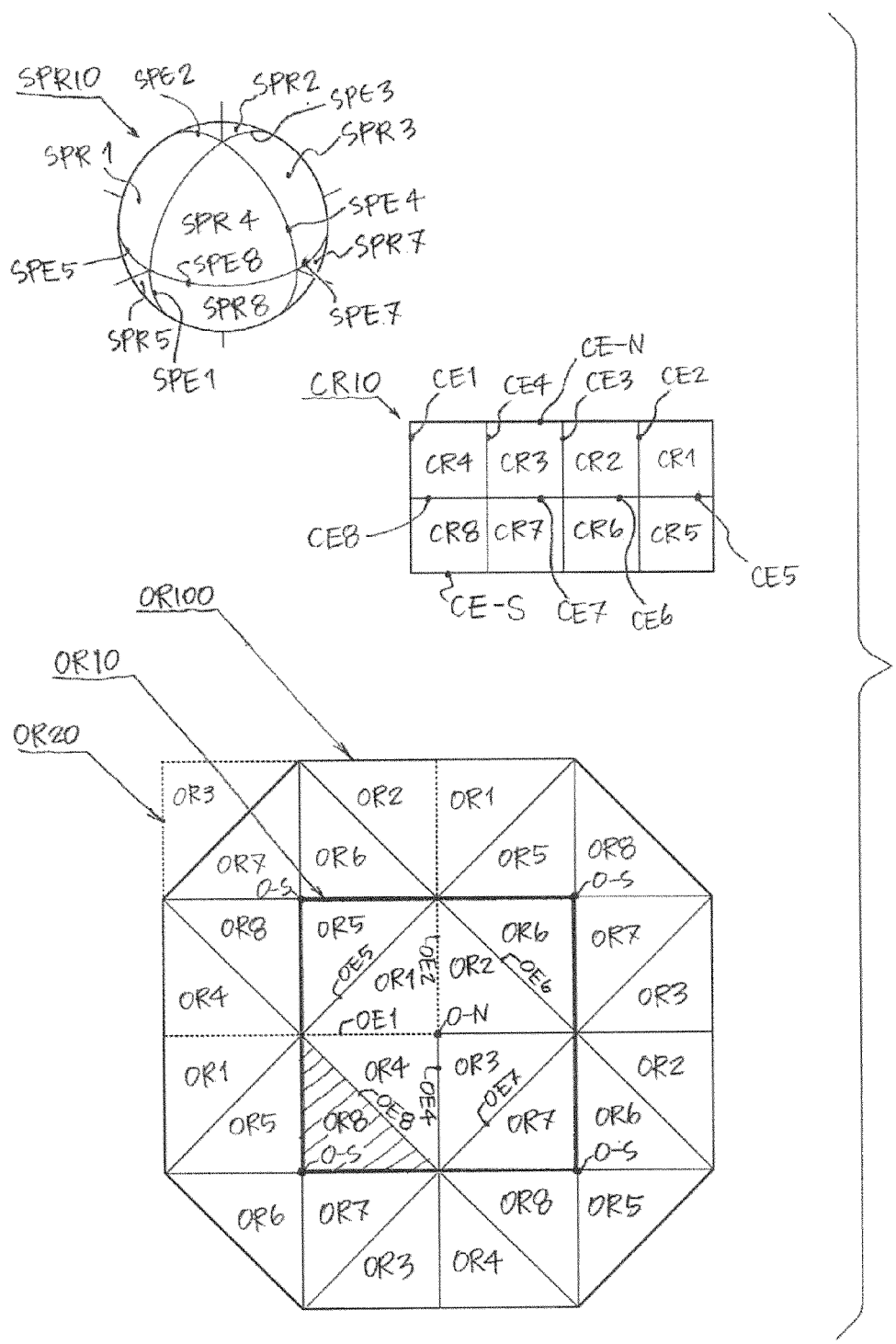
FIG. 64 is a schematic diagram showing the mapping concept according to the invention in comparison with an existing cylindrical projection.

The invention includes a method of mapping a plane image taken by an existing technology, such as an existing world map, on a rectangular plane according to the invention while reducing errors in solid angle. In FIG. 64, a region CR10 represents an existing cylindrical projection of a full spherical image SPR10 of, for example, the earth. Segments SPE1 through SPE8 are transferred to segments CE1 through CE8 respectively. Regions SPR1-SPR8 are transferred to regions CR1-CR8 respectively. Segments CE1-CE8 equally divide a region CR10 into eight regions CR1-CR8. On the other hand, a region OR10 is a rectangular plane region based on the method shown in FIG. 20. Segments OE1-OE8 equally divide a region OR10 into eight regions OR1-OR8.

Still referring to FIG. 64, the entire region CR10 is iso-area-mapped and rectangulated on the region OR10 by mapping the individual regions CR1-CR8 to their respective counterpart regions OR1-OR8. Segments CE1-CE8 are mapped on segments OE1-OE8. A segment CE-N is originally a point representing the North Pole and it is mapped on a point O-N to maintain more faithful relative geographical relation on the spherical surface. Another segment CE-S is originally a point representing the South Pole, and it is mapped on four points O-S at corners of a rectangular region OR10 to maintain more faithful geographical relation on the spherical surface. Although the south pole is divided to four points O-S, this suggests that the world map can be rearranged to gather the four points O-S at one central point.

The region OR10 typically represents one entire world with no gaps and overlaps. However, since the points O-S are divided to four corner points of the region OR10 to display the information of one entire earth surface of the earth without gaps and overlaps, it is difficult to figure out the geographical relation around the points O-S. In the past, it had been misunderstood that the world is on an infinite plane since both a sphere and an infinite plane do not have a dead end, and any point on the surface has expanses to all directions. In that sense, standard world maps developed on planes cannot represent perfect geographical relations in peripheral regions.

In contrast, the method according to the invention can restore an infinite plane in a two dimensional format by tessellating regions OR1-CR8 repeatedly around a region OR10 to represent an endless expanse of spherical surface. Thus, the method according to the invention maintains geographical relations of any points or zones (such as the peripheral regions OR5-OR8) of the world to their neighbors in all directions. For instance, the relation of a region SPR8 on a sphere bordered on regions SPR4, SPR5 and SPR7 is represented on a hatched region OR8 bordered on regions OPR4, OPR5 and OPR7 on a two dimensional format.

Eighth Embodiment

Figure 26:
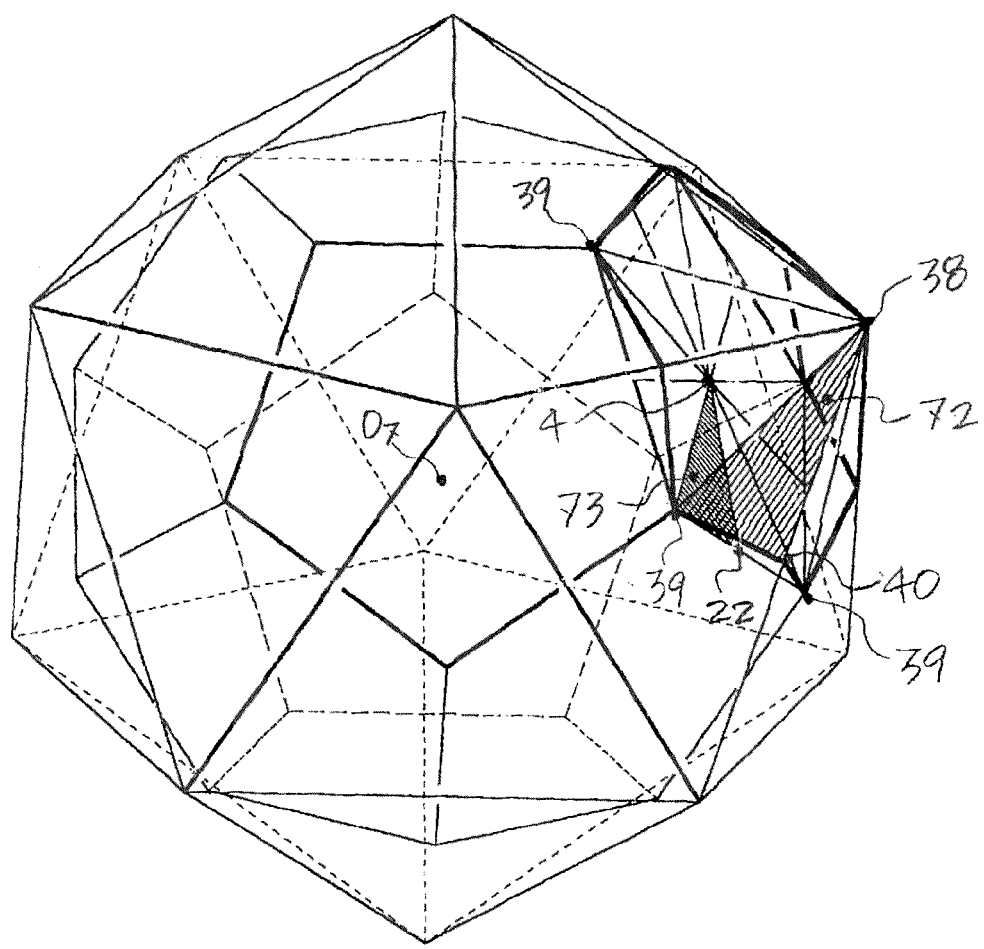
FIG. 26 is a schematic diagram showing iso-area mapping of an image from an icosahedron to a dodecahedron according to the invention.

Next explained is a method of obtaining a rectangular plane image via multi-layer mapping (or multi-step mapping) using, especially, regular polyhedrons. A mapping between regular polyhedrons can evenly distribute errors of a solid angle, i.e. an area ratio, a central angle, a face angle and an interior angle by a simple optical projection. FIG. 26 illustrates a part of a mapping process from an icosahedron to a dodecahedron. A dodecahedron is obtained by topologically converting icosahedral vertices to a face and icosahedral face to vertices. An icosahedral triangle is evenly divided into six congruent regions (incl. mirror image) by segments connecting the triangle's center 39 to its vertices 38 and midpoints of its edges respectively. One of these regions is the hatched region 72. An entire icosahedral image is evenly divided into 120 regions by implementing the same process in all other icosahedral triangles. The icosahedral image is iso-area-mapped on an inscribed dodecahedron. A dodecahedral pentagon is equally divided into ten congruent regions (incl. mirror images) by segments connecting the pentagon's center 4 to its vertices 39 and midpoints of its edges respectively. One of these regions is another hatched region 73. Each divisional region such as a region 72 is mapped on each corresponding divisional region such as a region 73.

Figure 27:
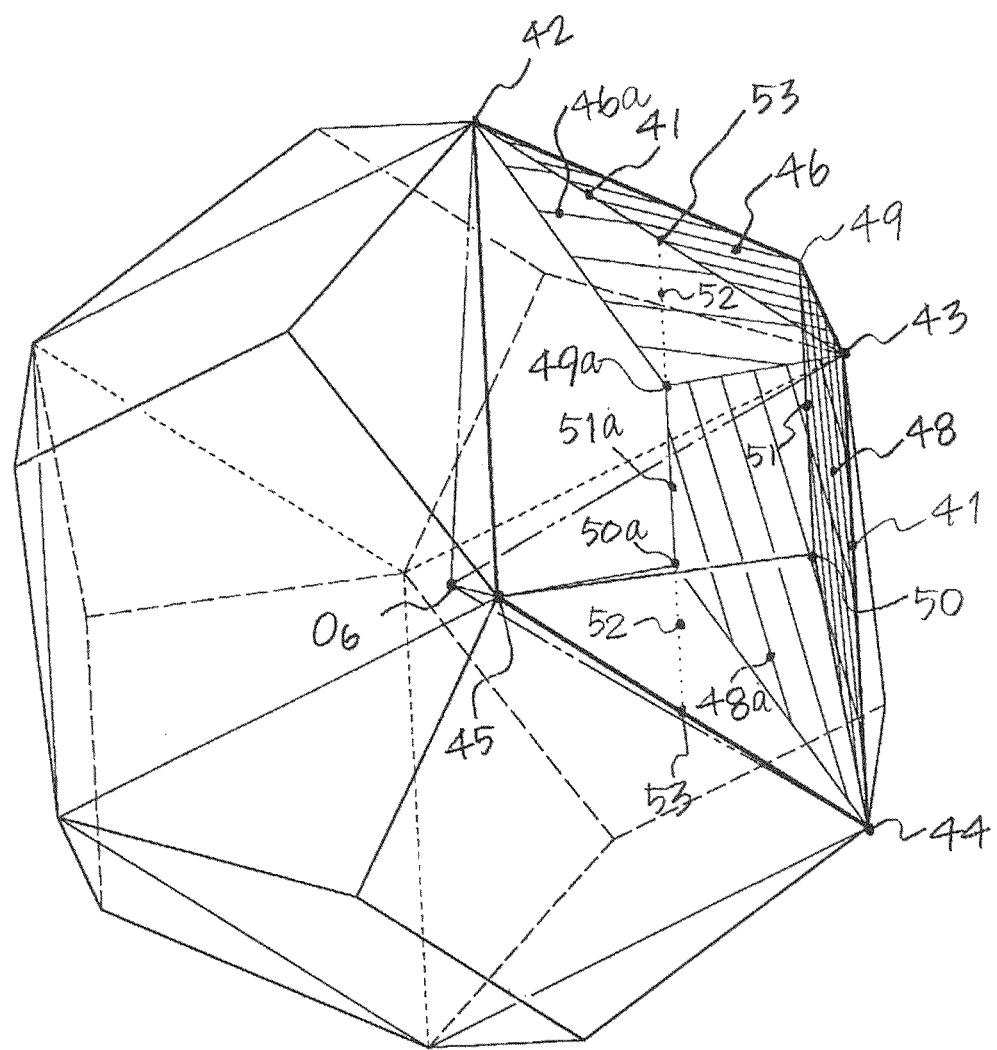
FIG. 27 is a schematic diagram showing iso-area mapping of an image from a dodecahedron to a cube according to the invention.

FIG. 27 illustrates the next part of the mapping process from the dodecahedron on a cube. The dodecahedron inscribes the cube. An edge 41 of the cube tangent to the dodecahedron divides a dodecahedral face into a triangle 46 and a trapezoid 48. These regions are mapped on a triangle 46a sharing points 49a, 42 and 43 on the cube as its vertices and on a trapezoid 48a sharing points 49a, 50a, 44 and 43 on the cube as its vertices. Positions of the points 49a and 50a on the cube are preferably adjusted to ensure that the mapping is just an iso-area mapping. A resulting cubic image is again mapped on a tetrahedron or an octahedron and thereafter flattened out to present a rectangular image.

The multi-layer mapping is applicable for any 3-D object and especially suitable for combinations of objects having symmetries and/or geometrically common grounds. Multi-layer mapping by optical projection from a geodesic sphere to any of a quasi-regular 32-face polyhedron (truncated icosahedron), regular dodecahedron and regular icosahedron is also suitable as iso-area mapping because even a simple optical projection ensures iso-area mapping.

As such, the method according to the invention makes it possible to ultimately rectangulate any image by combining operations of dividing and/or unifying faces of a polyhedron.

As mentioned above, for easier understanding of the present invention, explanation made herein is based on geometry, using various geometrical terms that have definite meanings. Upon practicing the invention, however, inevitable errors or modifications must be allowed in actual operations of computers or in an actual process for making computer programs or physical products such as cameras. Therefore, note that the invention assumes such geometrical imperfections. For this reason, the geometrical terms, "regular polyhedron", "midpoint" and "equal division" used in this eighth embodiment and other embodiments of the invention may be interpreted to mean "polyhedron," "point nearby midpoint" and "division" provided the same effects as those of the eighth embodiment are retained.

Ninth Embodiment

A reversed process of any of the mapping methods according to the preceding embodiments is another embodiment of the present invention as well. Especially, it is useful for texture mapping that is a technique for mapping a plane image on a 3-D object. In this texture mapping, an operator has to inspect the mapped image from a variety of angles to confirm whether all images are properly mapped on a desired object. If any visible seam or a distorted part is found, which degrades the appearance of the end image, the operator is involved in a time-consuming work to modify and align an image with others. The invention, however, provides a rectangular display that covers more than one entire surface of a desired object, in which an operator can works on a texture image while checking seams on individual edges of an image and can next iso-area-map the obtained image on a desired object without visible distortions and seams.

Figure 34:
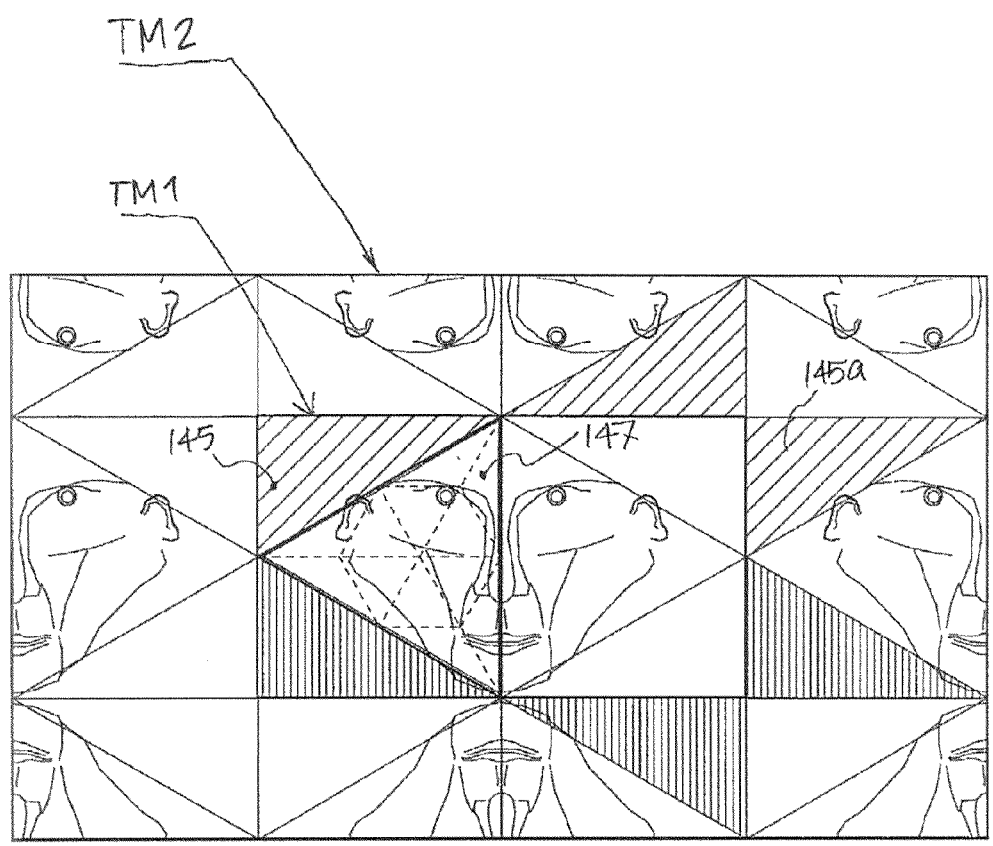
FIG. 34 is a schematic diagram of a rectangular operation interface for texture mapping according to the invention.

FIG. 34 schematically shows a rectangular interface. A rectangular region TM1 covers an entire surface field in which a user draws an entire surface image for a desired 3-D object. Broken lines represent a part of the same iso-area grid as illustrated in the first embodiment, which divides a part of the region TM1. A triangle 147 is one of divisional regions made by the grid. The other regions are divided as well in the same manner. The image drawn in the region TM1 is tessellated around the region TM1 to permit a look over the joint line of adjacent ends of every two tessellated regions TM1. Here is used an image region TM2 larger than $4\pi$ sr. For example, the image in a region 145 is displayed in a region 145a as well.

Figure 35:
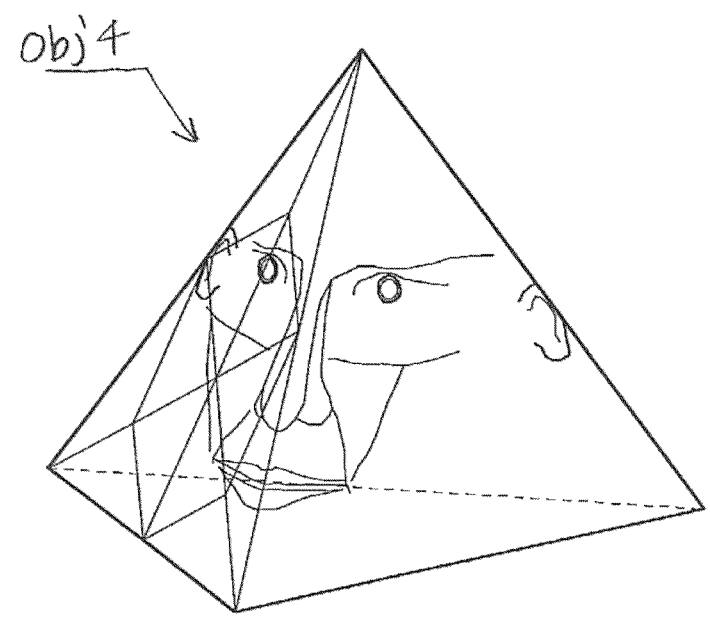
FIG. 35 is a schematic diagram showing a process of mapping a two-dimensional image on a tetrahedron and a sphere according to the invention.
Figure 35:
Figure 35:
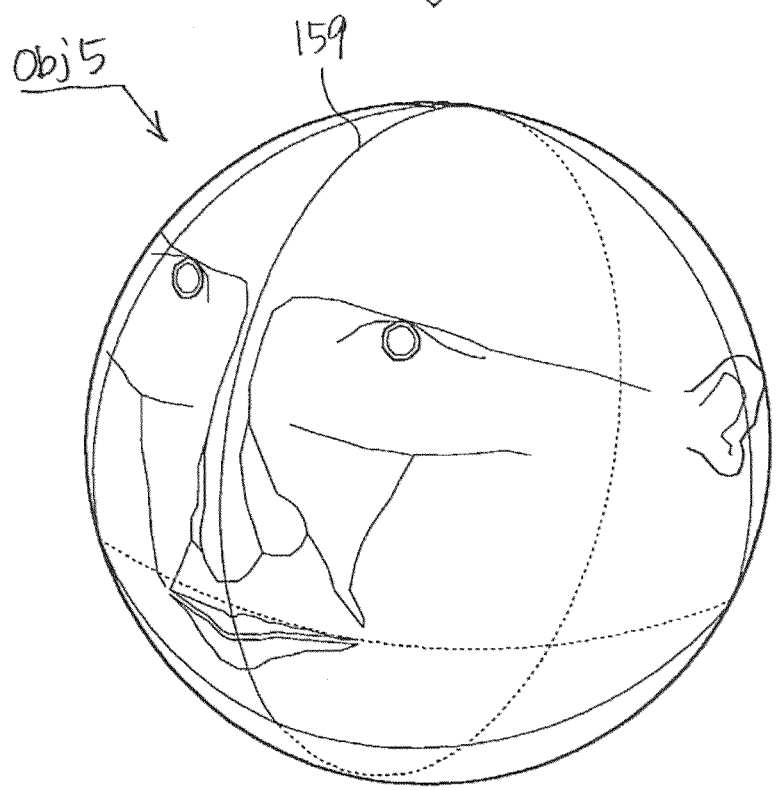
Figure 36:
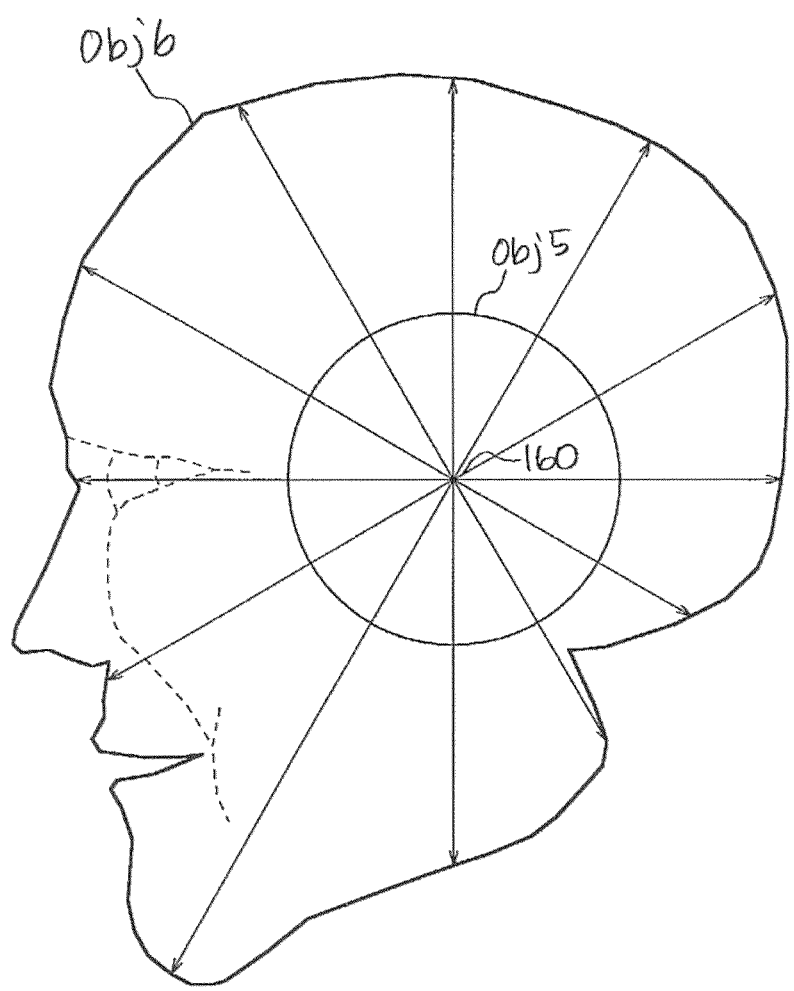
FIG. 36 is a cross-sectional schematic diagram showing a process of mapping a spherical image onto a medium of an arbitrary shape according to the invention.

FIGS. 35 and 36 show a reversed process of the first embodiment. With reference to FIG. 35, a tetrahedral image obj4 is prepared by folding the rectangular image TM1 of FIG. 34. This tetrahedral image obj4 is iso-area-mapped into a spherical image obj5. A cross section taken along a great circle 159 is shown in FIG. 36, which also shows a positional relation between the sphere of the spherical image obj5 and a desired object obj6. In this schematic diagram, the spherical image obj5 is projected on the object obj6 with its optical center located at a center 160 of the sphere of the image obj5 for easier explanation. If it is necessary to implement an iso-area mapping through all processes, the projection should be iso-area-mapping as well and does not have an optical center. The object of the spherical image obj5 may be circumscribed to or intersect a subject to be mapped.

In this fashion, especially for an animation that exposes a subject from many angles, an operator can carry out a texture mapping operation while commanding the substantially entire surface image of the subject to be seamlessly mapped. A rectangular image may be directly iso-area-mapped on a desired object without multi-layer mapping via a sphere or a tetrahedron. The reversed image processing is applicable not only to the first embodiment but also to other related embodiments.

Tenth Embodiment

Figure 37:
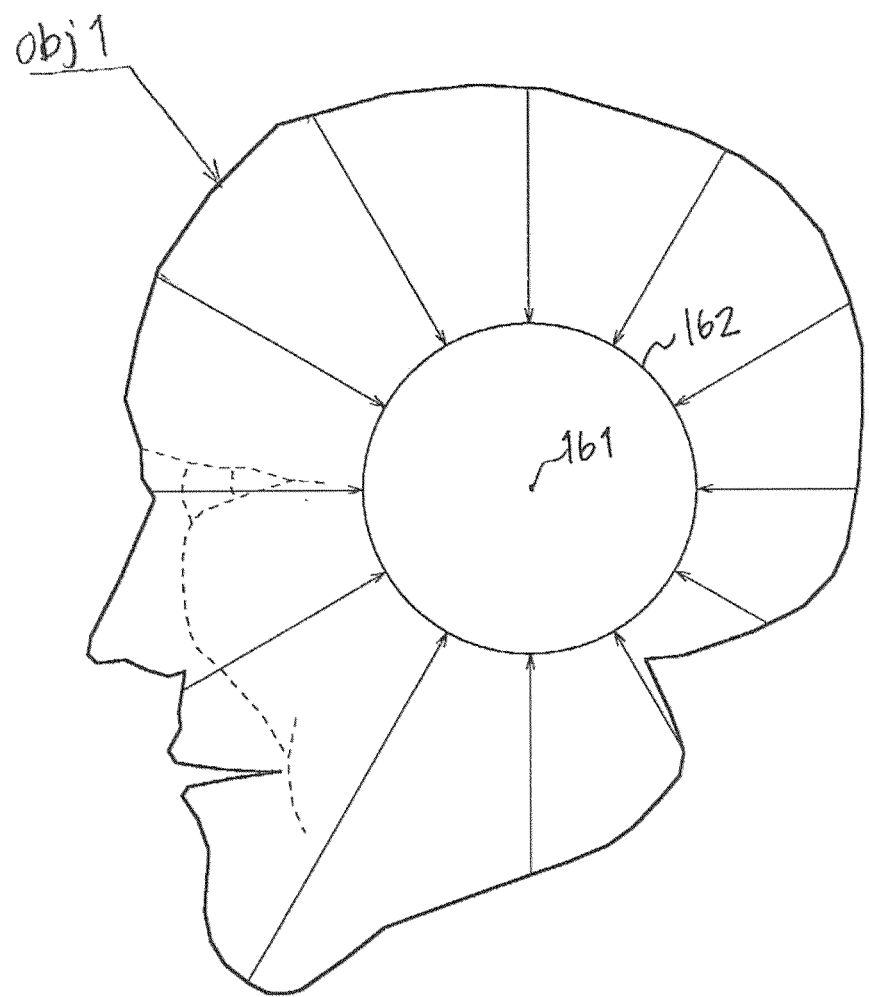
FIG. 37 is a cross-sectional schematic diagram showing a process of mapping an object of an arbitrary shape onto a sphere according to the invention.

The invention includes a method of mapping an entire surface image of a desired object onto a rectangular plane possibly via a mapping on a sphere. FIG. 37 shows a cross-sectional view of an object obj1 that is a human head.

A spherical image 162 is obtained by dividing an entire surface of the object obj1 into regions, next capturing each divisional region by setting an internal optic axis of each component camera from all direction and then mapping these captured images on the sphere 162. The obtained spherical image is flattened out to generate a rectangular image according to the invention. The object obj1 can be mapped directly on a tetrahedron without a mapping process on a sphere.

Eleventh Embodiment

Figure 38:
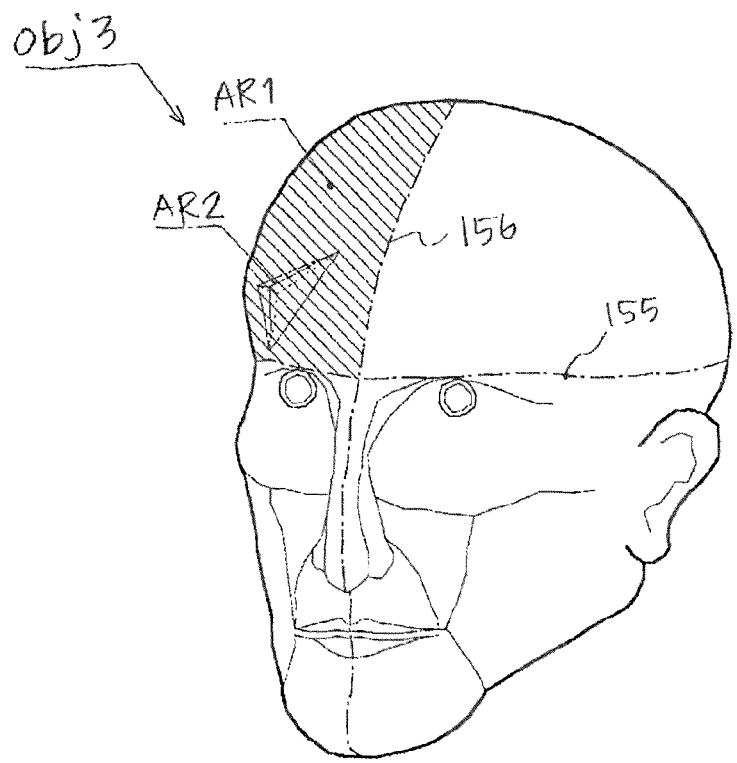
FIG. 38 is a schematic diagram showing a first half process of multilayer mapping of an arbitrary shape on an octahedron according to the invention.
Figure 38:
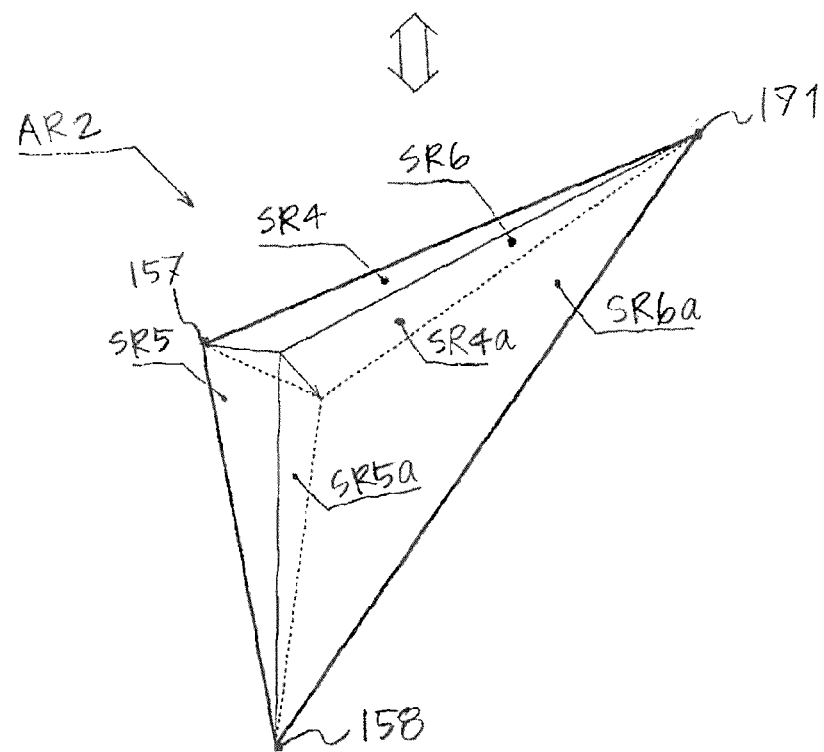
Figure 39:
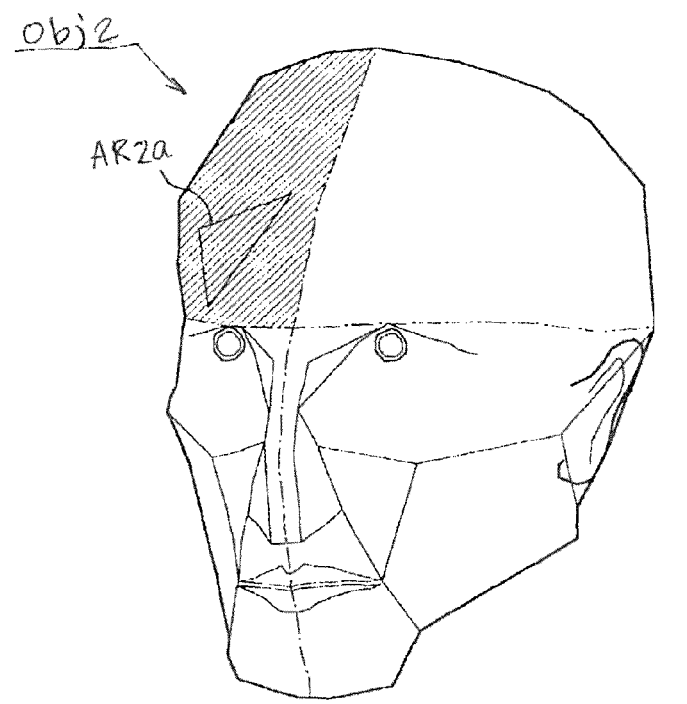
FIG. 39 is a schematic diagram showing a second half process of multilayer mapping of an arbitrary shape on an octahedron according to the invention.
Figure 39:
Figure 39:
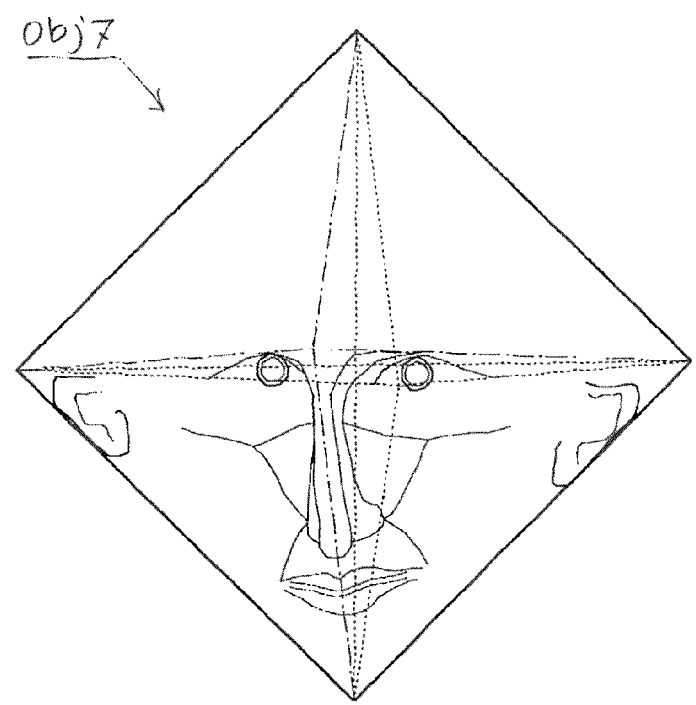

The invention includes an iso-area mapping and multi-layer-mapping applied to arbitrary 3-D objects. FIGS. 38 and 39 schematically show a multi-layer-mapping process of a substantially entire surface of an arbitrary object on an octahedron. In FIG. 38 single dot and dash lines 155 and 156 equally divide an entire surface of an object obj3 (in this illustration, a head) into eight regions. One of the regions is a hatched region AR1. Geometry of the region AR1 and other regions can be described by many polygons. In other words, the polygons compose many pyramids. One of them is a pyramid AR2. In its detailed illustration, triangles SR4, SR5 and SR6 compose pyramid surfaces of AR2 and are mapped on triangles SR4a, SR5a and SR6a on its base triangle defined by vertices 157,158 and 171. Thus, the mapping unifies some polygons to one polygon by maintaining an area ratio of SR4:SR5:SR6 to be equal to SR4a:SR5a:SR6a so as to be an iso-area mapping.

FIG. 39 shows an object obj2 obtained by applying the same operation to other regions. An octahedral image is obtained by repeating this iso-area mapping for unifying polygons. Thus, many faces on a region AR1 are integrated to an octahedral triangle. A desired image is obtained by again unifying octahedron's two square pyramids to two sides of an inscribed square. The unification with a multi-layer-mapping gradually simplifies geometry of a 3-D object, which can rectangulate a geometry that contains a dead angle for a simple optical projection with a single optical center. The illustrations are modified for a better explanation.

Twelfth Embodiment

The invention includes a rectangular interface for image operation while commanding an entire visual field. A projection of an omnidirectional image on a spherical screen, such as a dome theatre needs several cameras, typically component cameras of a composite camera unit, for input and several projectors for output for dividing and sharing visual fields. An existing interface does not maintain solid angles of input and/or output image, and causes distortion in a displayed image. This makes it difficult for an operator to figure out each divisional image and its connection to an adjacent one. The method arranges individual divisional images from respective cameras in a rectangular interface format while maintaining solid angles of their visual field. Thus, the method enables user to operate images for constructing an omnidirectional image while commanding an entire view with proper solid angle.

Figure 40:
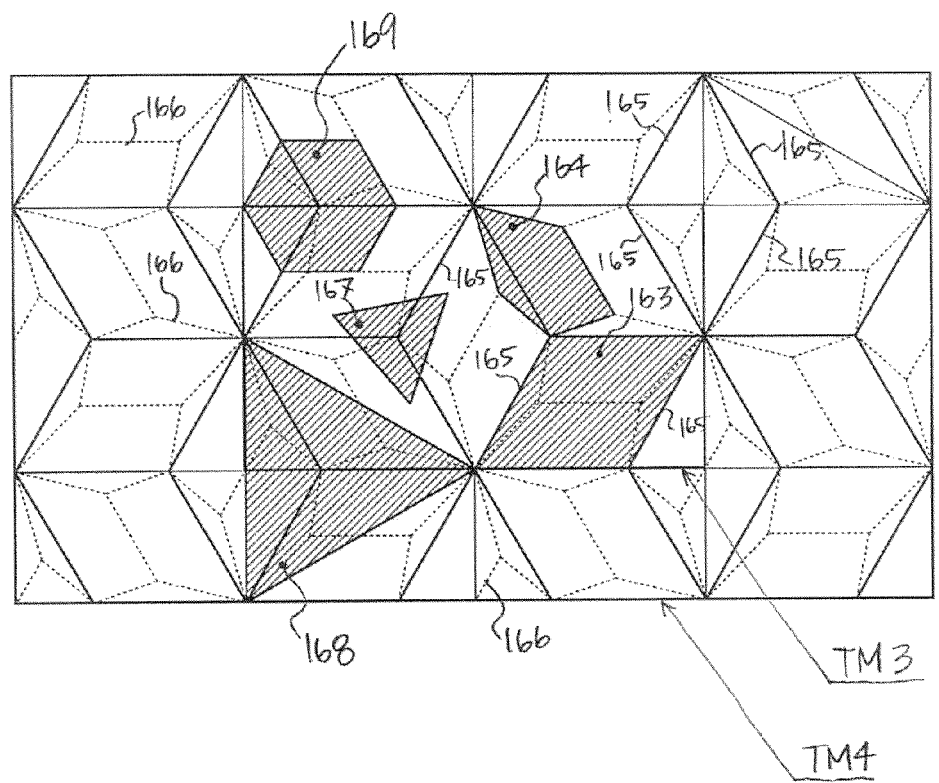
FIG. 40 is a schematic diagram showing a rectangular operation interface for a dome theater.

FIG. 40 shows a rectangular region TM3 utilizing a tetrahedral development which commands an entire visual field for spherical projection screen. A rectangular interface TM4 contains the region TM3 to show if its seams connect adjacent regions properly. In case of an operation to input a cubic image according to six cameras and to output the image to be displayed on a spherical screen by twelve projectors arranged according to an dodecahedron, the method equally arranges and displays the six input images in six parallaxes such as a hatched regions 163 which is defined by segments 165 and equally arranges and displays the twelve output images in twelve pentagons such as a hatched regions 164 which is defined by segments 166.

Similarly to the arrangements, each hatched region 167, 168 or 169 represents a divisional image of an icosahedron, tetrahedron and octahedron for input and output. Thus, the invention provides a rectangular interface which commands more than an entire visual field in which operator can conveniently stitch each image and synchronize each animation while checking seams on every edges of the image to project it properly on a screen. It is able to display divisions of angles of elevation and direction. The method can be applied to a technology relating to a holography.

Thirteenth Embodiment

Figure 31:
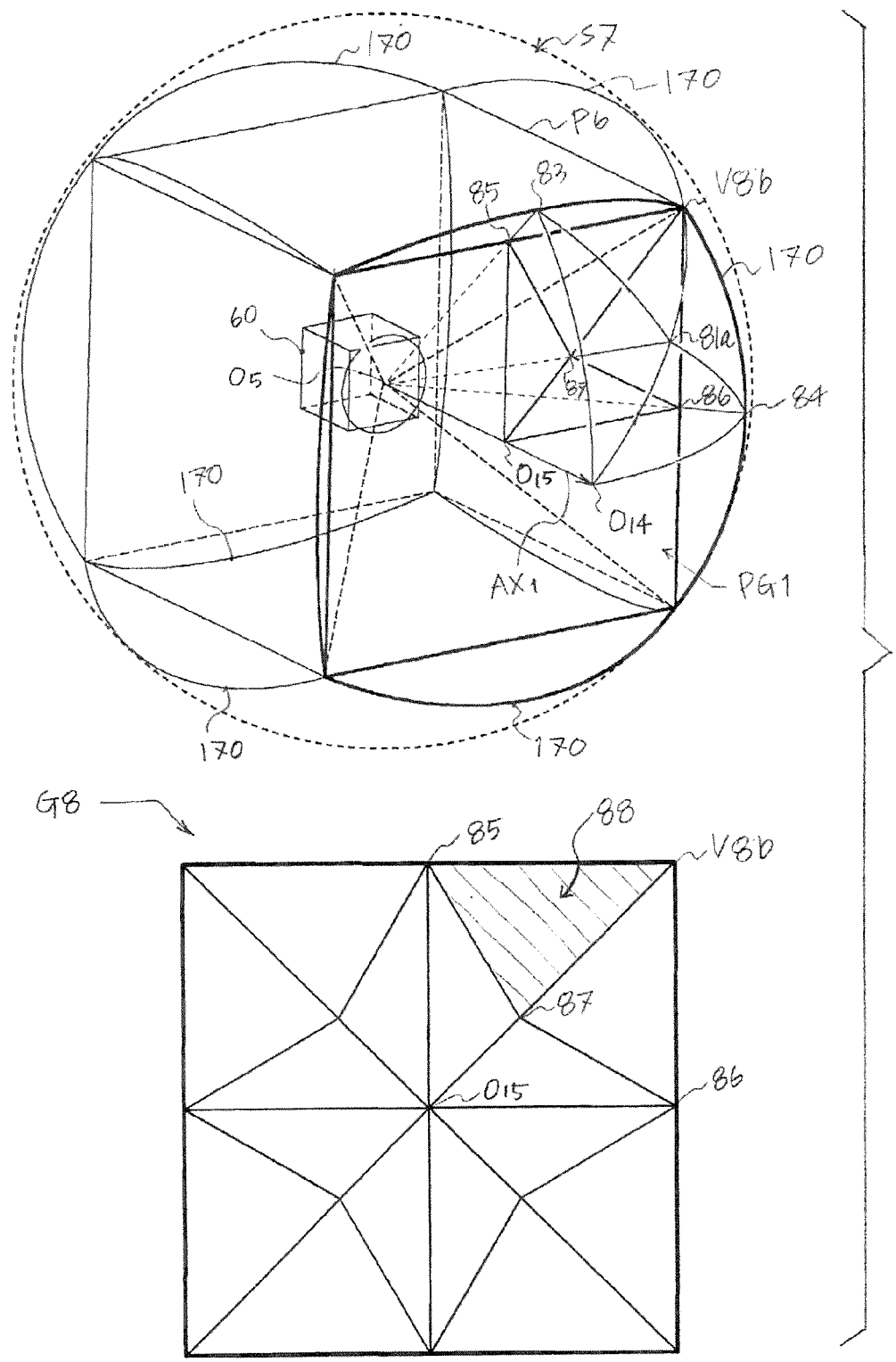
FIG. 31 is a schematic diagram showing an aspect of optical projection by a cubic omnidirectional camera according to the invention.

The mapping process in the invention includes an exposure that is an optical projection. FIG. 31 schematically shows an exposing method to equally divide an omnidirectional image into six $\frac{2}{3}\pi$ sr visual field. Great circles 170 divide an omnidirectional image and compose a spherical cube S7. Each component camera 60 is installed at the center O5 of the spherical cube S7 with its external optic axis AX1 towards the center O15 of the each cubic face PG1 tangent to the spherical cube S7. Angle of view of the camera is wider than 109.4712206 degrees to cover the divisional $\frac{2}{3}\pi$ sr visual field. Thus, the captured images are mapped on a spherical cube to be rectangulated by the operation introduced in the second embodiment.

Arcs connecting points 83, O14, 84, V8b and 81a on the spherical cube S7 by great circles compose a part of the iso-area grid G7. It shows a part of grid G8 on a cubic face obtained by internal projection of the grid G7 with an optical center O5. The grid G8 can be utilized as a filter. An obtained photograph by the camera 60 is iso-area-mapped on the grid G6 shown in FIG. 15.

Fourteenth Embodiment

The invention relates to a mapping in which surfaces to map and to be mapped are separated, including a case of mapping (projecting) a view on a plane of projection via mapping (reflecting) on a reflector facing to the plane of projection from a certain distance. The following explanation illustrates an example that simplifies operations to align and unite divisional fields of view.

Figure 32:
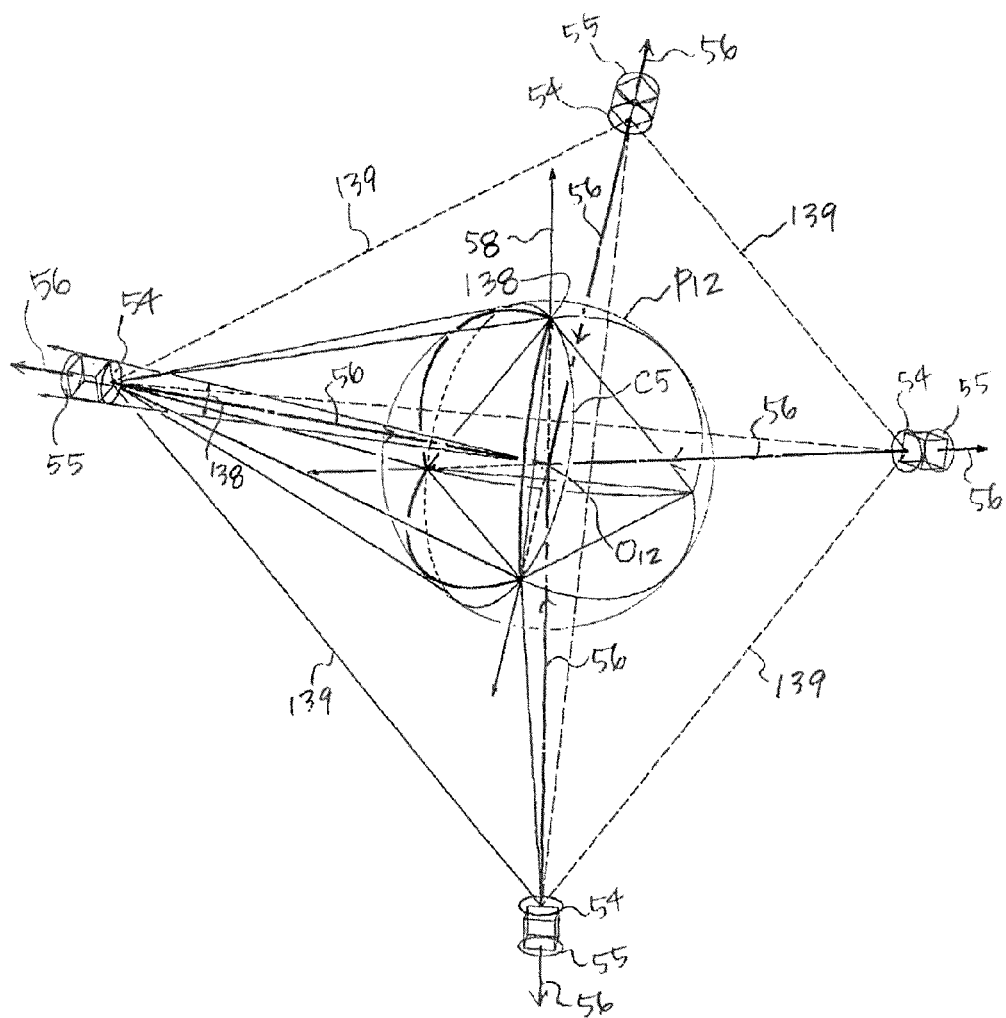
FIG. 32 shows a schematic diagram showing an omnidirectional camera with a concentric optical center according to the invention.

It is impossible to concentrate optical centers of a plurality of cameras because of the existence of the camera bodies. A composite camera unit having such component cameras has difficulty to take a close-up picture. FIG. 32 schematically shows a method for a simultaneous exposure by four cameras at tetrahedral vertices with a concentric optical center. Each camera 54 with an internal optic axis towards a reflector P12 captures a reflected image on the reflector P12. Four devices are arranged to cover an entire visual field while sharing a common virtual optical center O12. A curvature of the reflector P12 are adjusted according to the angle of view of the camera and distance from the optic center O12. It is convenient for the reflector's geometry to correspond to an arrangement of cameras. A tetrahedral reflector P12 fits to tetrahedral arrangement of the four cameras 54 as illustrated.

Figure 33:
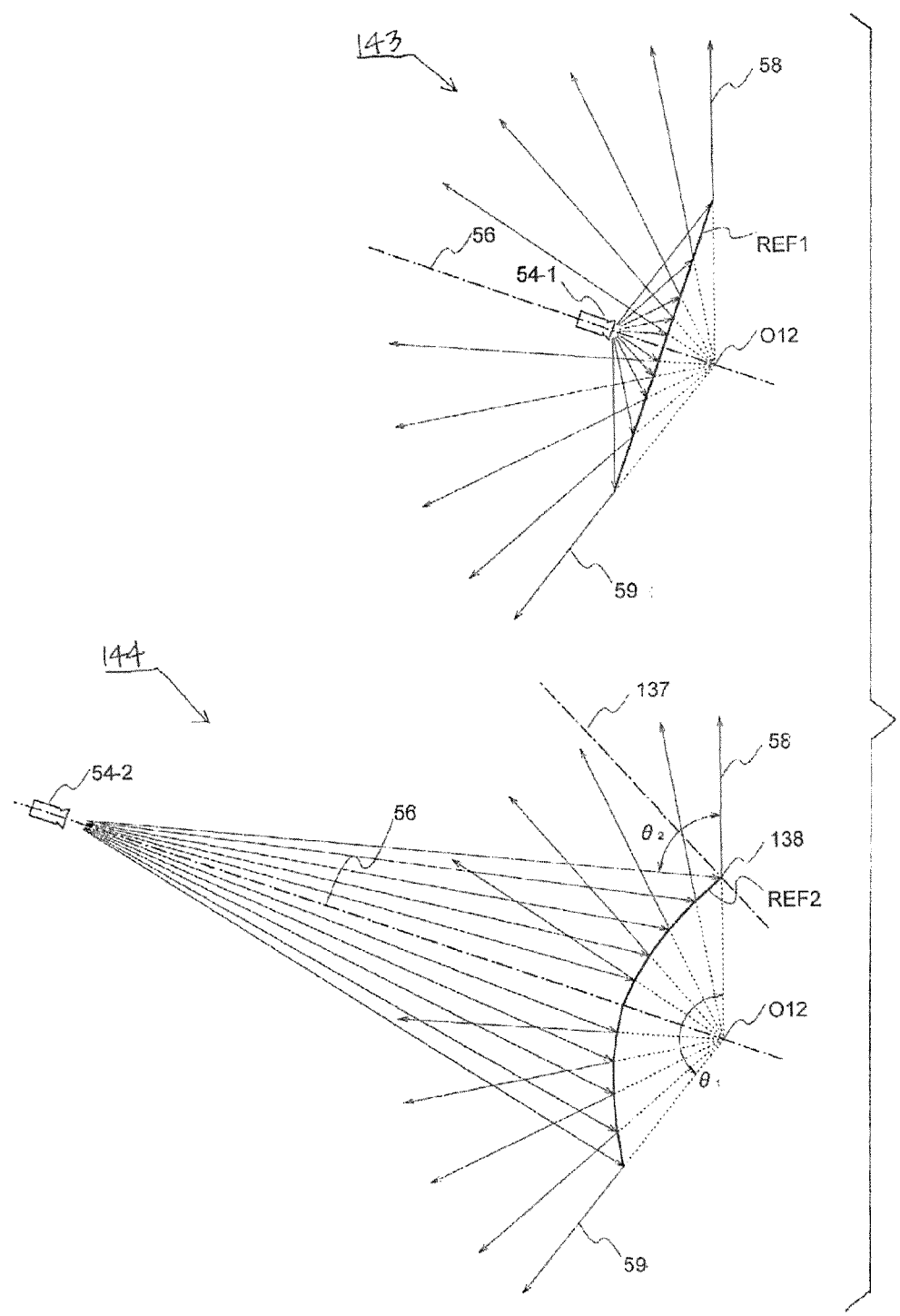
FIG. 33 is a cross-sectional schematic diagram for explaining the camera shown in FIG. 32 in detail.

FIG. 33 shows two cross-sectional diagrams both taken along an optic axis 56. One of these cross-sectional views, 143, shows a combination of a camera 54-1 having a lens wider than 141° and a reflector. In a model using such a wide-angle lens, the reflector makes a flat reflection face REF1. The other cross-sectional view, 144, shows a combination of a camera 54-2 having a typical angle of view and a reflector. In a model using such a typical lens, the reflector makes a reflection face REF2 curved to present 1π sr visual field to the camera 54-2. A defect of the method may be that the obtained entire image captures the cameras themselves too. If it is disturbing, another camera 55 with an external axis 56 can be attached behind the camera 54-1 or 54-2 to replace the image of the camera 54-1 or 54-2 with an image captured by the camera 55.

Fifteenth Embodiment

Figure 52:
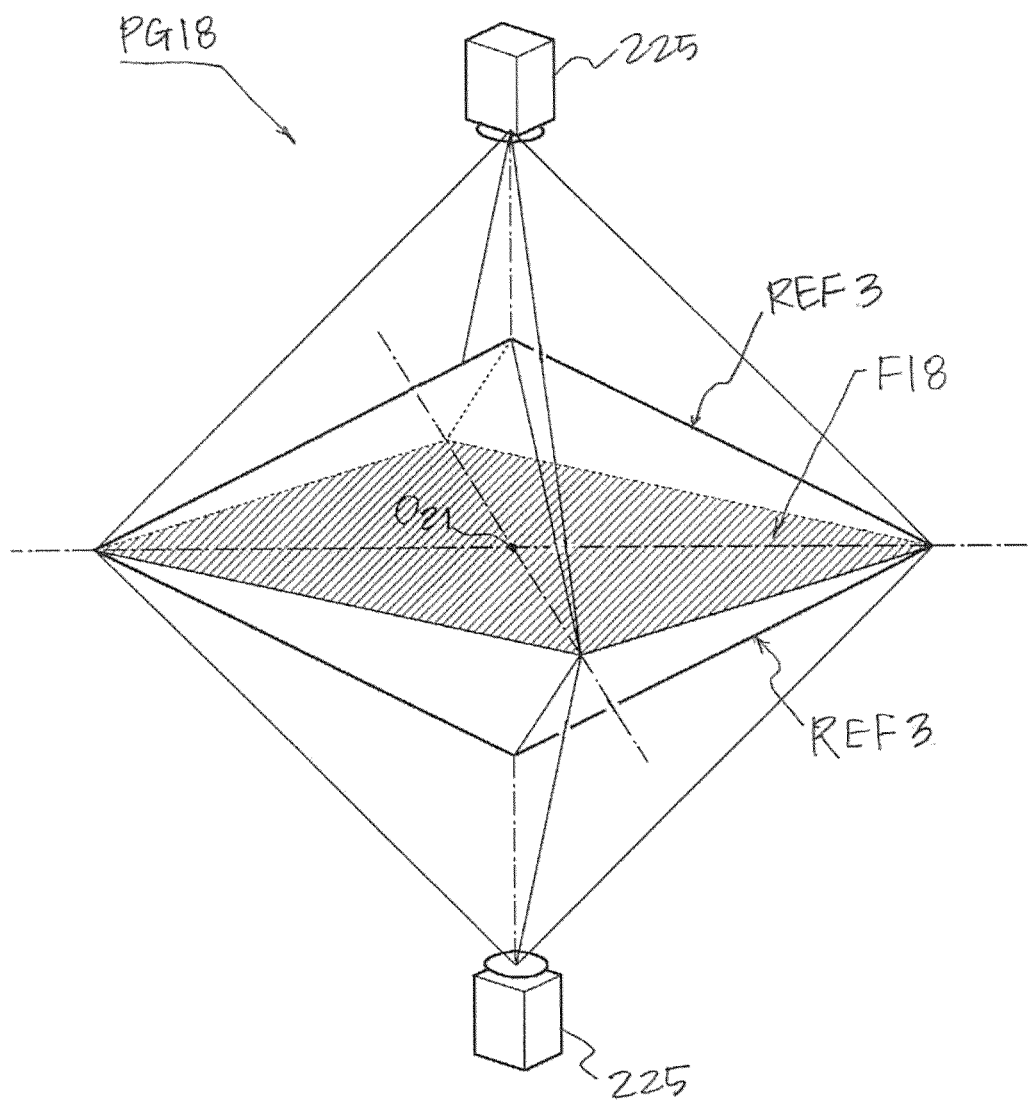
FIG. 52 is a schematic diagram showing a process of quickly creating a rectangular image by using two cameras according to the invention.

The invention includes a multi-layer-mapping via a series of 3-D objects. Meanwhile the invention includes a photographing method to quickly obtain a rectangular image by reflector. It reduces complex image processing after exposing and is able to display a sequence of real time animation without delaying its time frame. FIG. 52 shows a composite camera unit PG18 composed of two component cameras 225 with two square-pyramid-shaped reflectors REF3 each facing to a counterpart one of the cameras 225. The two reflector shares a square base F18 of the pyramids and a virtual optical center O21. The cameras 225 and reflectors REF3 are arranged to divide an entire visual field into two parts each for reflecting each field to each camera. Each of these cameras can obtain a half the entire visual field in a square format by one occurrence of exposure. As a result, the composite camera unit PG18 can obtain a rectangular omnidirectional view by simply combining the two images obtained. Since the camera concentrates optical centers, the process has no need to correct an error caused by separation between optical centers.

A photographed image can be mapped on an octahedron to obtain three rectangular images by the method introduced in the third embodiment. The pyramid's base F18 is not necessarily be a square. For example, a pyramid with rectangular base with the aspect ratio of 3:2 or 9:8 provides eventually a rectangular image with 3:4 or 9:16 aspect ratio to fit in a wide-use display monitor. A pyramid with rectangular base with the aspect ratio of 1:2 provides eventually a square image. The reflector can be replaced by any arbitrary 3-D objects other than a square pyramid, such as other polyhedron including (semi) regular polyhedron, open surfaces including hyperboloid, 3-D objects containing curved surfaces and surfaces of revolution. For example, it is suitable that geometry of a reflector is designed to correct distortions such as solid angle's distortion while reflecting a view to a camera.

Sixteenth Embodiment

Figure 49:
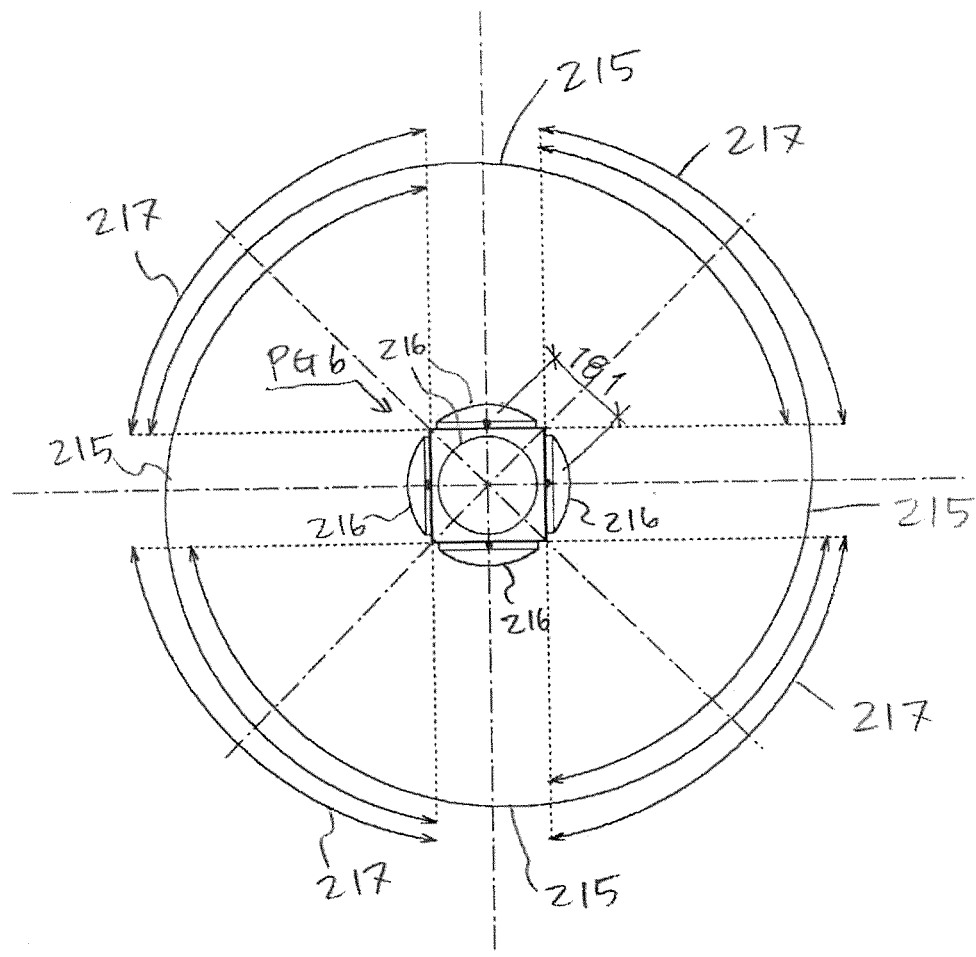
FIG. 49 is a schematic diagram showing a method of obtaining an omnidirectional stereoscopic photo with a cubic composite camera according to the invention.

Parallax between optical centers in a composite camera generates stereo photos. FIG. 49 is a top view of a cubic composite camera PG6. Each lens 216 along each optic axis covers 2π sr visual field 215. A parallax 181 between adjacent two lenses 216 generates a stereoscopic visual field 217 captured by the lenses.

The term of "lens" used in this explanation pertains to any optical element for converging light such as a pinhole. A plurality of cameras (incl. a couple of lenses for a parallax) can share a common plane of projection. For example, a plane can receive exposures by these optical centers and/or optic axes one after another. A plane of projection includes a 3-D surface composed of a plurality of faces. For example, an exposure on ellipsoid's surface from one of two focuses can avoid diffused reflections. The note in this paragraph is not only for the 16th embodiment but also for the all embodiments.

Seventeenth Embodiment

The invention includes a photographing method that considers an exposure as a mapping process and a plane for placing a film, image sensor including any other photosensitive components thereon as a surface for mapping. This embodiment illustrates a plurality of plane of projection composing a polyhedral surface. Most of existing cameras have a film or image sensor on a flat plane. For carrying out the invention with an existing camera it needs an image processing to modify and adjust an obtained omnidirectional image to a rectangle. The process causes a loss in an image's quality or delay for displaying the image in case of showing an animation. The method places image sensors on a preferable polyhedron and simplifies the process by directly exposing, that is mapping, an image on the polyhedral surface of projection.

Figure 42:
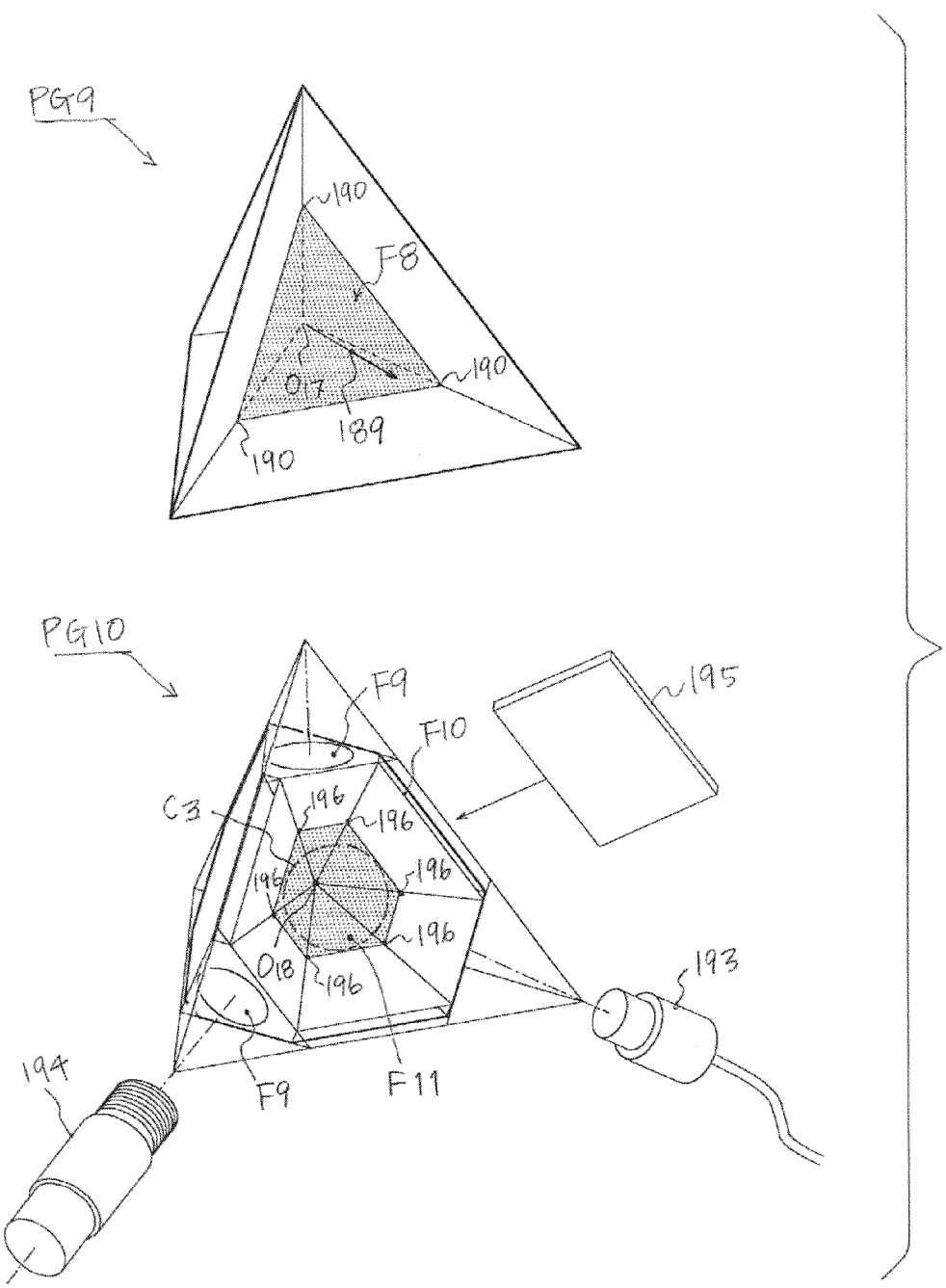
FIG. 42 is a schematic diagram showing a tetrahedral composite camera with polyhedral surfaces of projection according to the invention.

FIG. 42 shows a tetrahedral camera PG9 with a lens, which is in this case, a pinhole 189, on each tetrahedral face. The camera arranges planes of projection parallel to the tetrahedral faces. A plane F8 is one of the planes of projection. Four optic axes are equally distributed and face to four planes of projection and cover an entire visual field. Thus, the camera PG9 can obtain a tetrahedral image by a simple exposure without complex image processing. An exposure especially by a pinhole is a pure optical projection without a distortion that an ordinary lens tends to cause. A mechanism of a camera with a pinhole is simple, which is able to minimize a size of composite camera. However, a resolution quality is low by a pin whole camera. By dividing an entire visual field, a plurality of cameras with a pinhole can accumulate resolutions and a composite camera can maintain a high resolution image. Three inner pyramid surfaces defined by a tetrahedral center O17 and vertices of the tetrahedron PG9 can replace a plane of projection F8 such that each camera can photograph almost 2π sr visual field.

Eighteenth Embodiment

The invention includes a method in which an outline of a plane of projection fits to an image circle. FIG. 42 shows a composite camera PG10 with an outline of a truncated tetrahedron that truncates its vertices and edges. The outline of its face forms a hexagon. Thus, the camera PG10 mounts a hexagonal plane of projection F11 according to a tetrahedron. The hexagonal plane fits to an image circle C3 well. Truncated vertices F10 and edges F9 can mount output (input) connectors or sockets for power 193, thumbscrews of tripods 194 and/or slots for data storage devices 195. It is difficult to keep these necessary components away from an entire visual field when upon a single exposure. The camera PG10 hides them by arranging them along edges and vertices of a polyhedron that defines its camera alignment.

Nineteenth Embodiment

The invention includes a mapping method with a much subdivided iso-area grid on a plane of projection. The grid determines shapes and arrangements of image sensors such as CCD or CMOS and electro-optic modulators (EOM) such as LCD or CRT. Many existing cameras arrange rectangular image sensors along a rectangular grid. The arrangement does not match to a circulation for reading out and does not evenly arrange color filters for three primary colors. The method adjusts the image sensor's shape to a hexagon or other polygons to evenly arrange image sensors along an iso-area grid.

Figure 43:
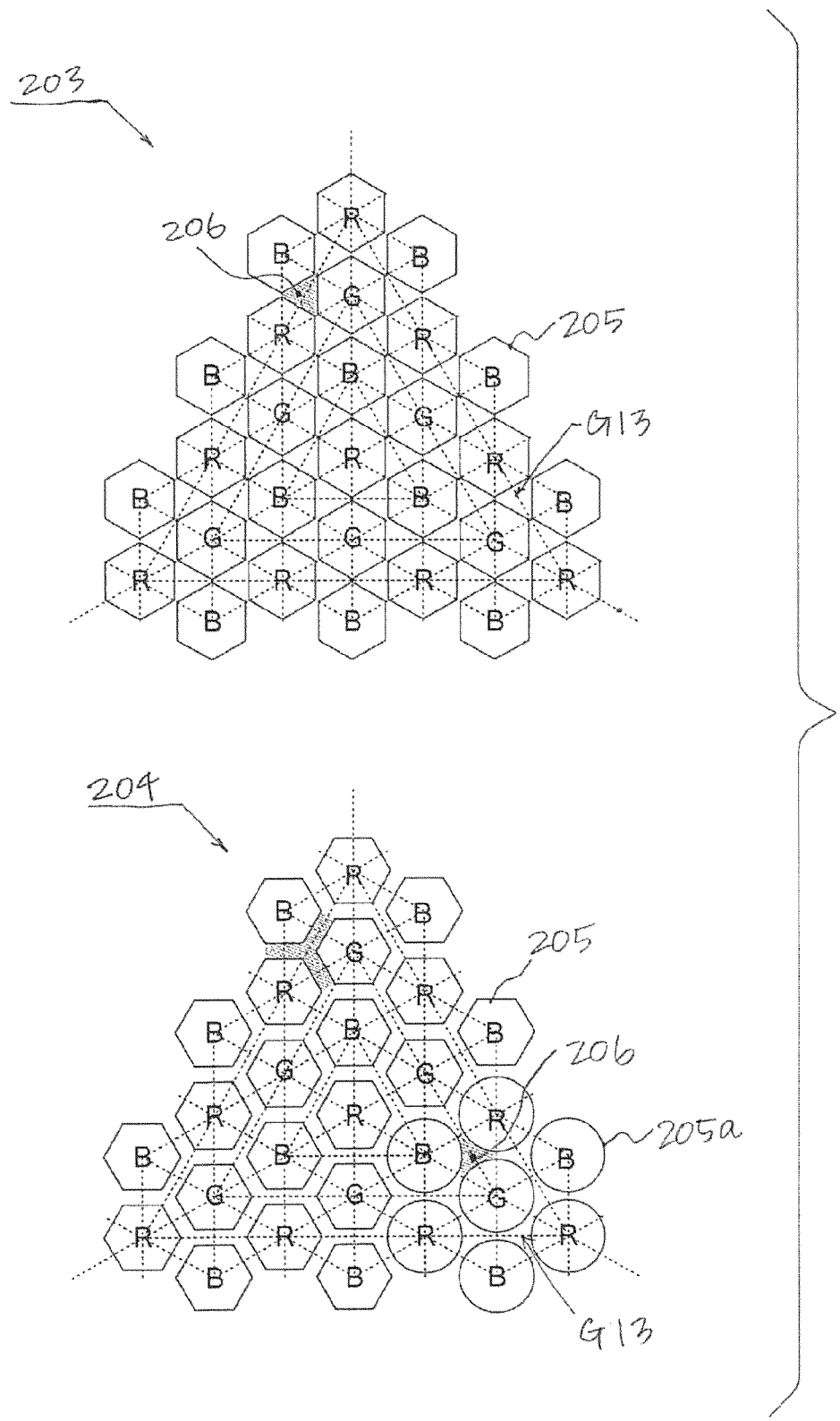
FIG. 43 is a schematic diagram showing preferable shapes and arrangements of image sensors for subdivided iso-area grids according to the invention.

FIG. 43 closes up an image sensor's arrangement 203. A subdivided iso-area grid G13 arrays image sensors 205. Regions 206 between image sensors provide circulations for reading out. Output efficiency by a hexagonal image sensor is better than by a rectangular sensor since it fits to a circle of confusion. Symbols R, G and B stand for three prime-color filters that are arranged evenly along a three-way grid by a dense iso-area division. It illustrates that a hexagonal image sensor and a three-way grid fit better in a tetrahedral or other polyhedral composite camera with a triangular face and minimize a quality loss than a rectangular image sensor and grid.

Another arrangement 204 is obtained by rotating each sensor 205. A round image sensor 205a can replace the sensor 205. A region 206 between the sensors provides a circulation for reading out. Its hexagonal shape and the three-way-gird can be other polygonal shape and/or other grid pattern. For example, a pentagonal sensor and a pentagonal grid pattern fit to a dodecahedral composite camera. The image sensor can be replaced by other sensors for another electromagnetic or a sound wave. A grid other than an iso-area grid can be used for an arrangement of the sensor. The method can be applied for the shape and an arrangement of electro-optic modulators (EOM) such as LCD or CRT. It is preferable for both optical modules to correspond in shape and arrangement.

Twentieth Embodiment

The invention includes a method with a 3-D surface of projection for each optic axis composed of a plurality of planes. On one hand, it is suitable that an ordinary camera has a plane of projection for rolling up a stripe of film. On the other hand, in such a mechanism, there is a difference in distance from its focal point to a plane of projection at its center and its periphery. That causes a critical over exposure at its center if an image at peripheries needs be exposed properly in a wide-angle photo. It needs an adjustment by a complex composition of several lenses to solve it. Instead, the method provides a 3-D surface of projection that arrays distances from its focal point to every point on the surface. This method is explained by taking a cubic composite camera as an example.

Figure 41:
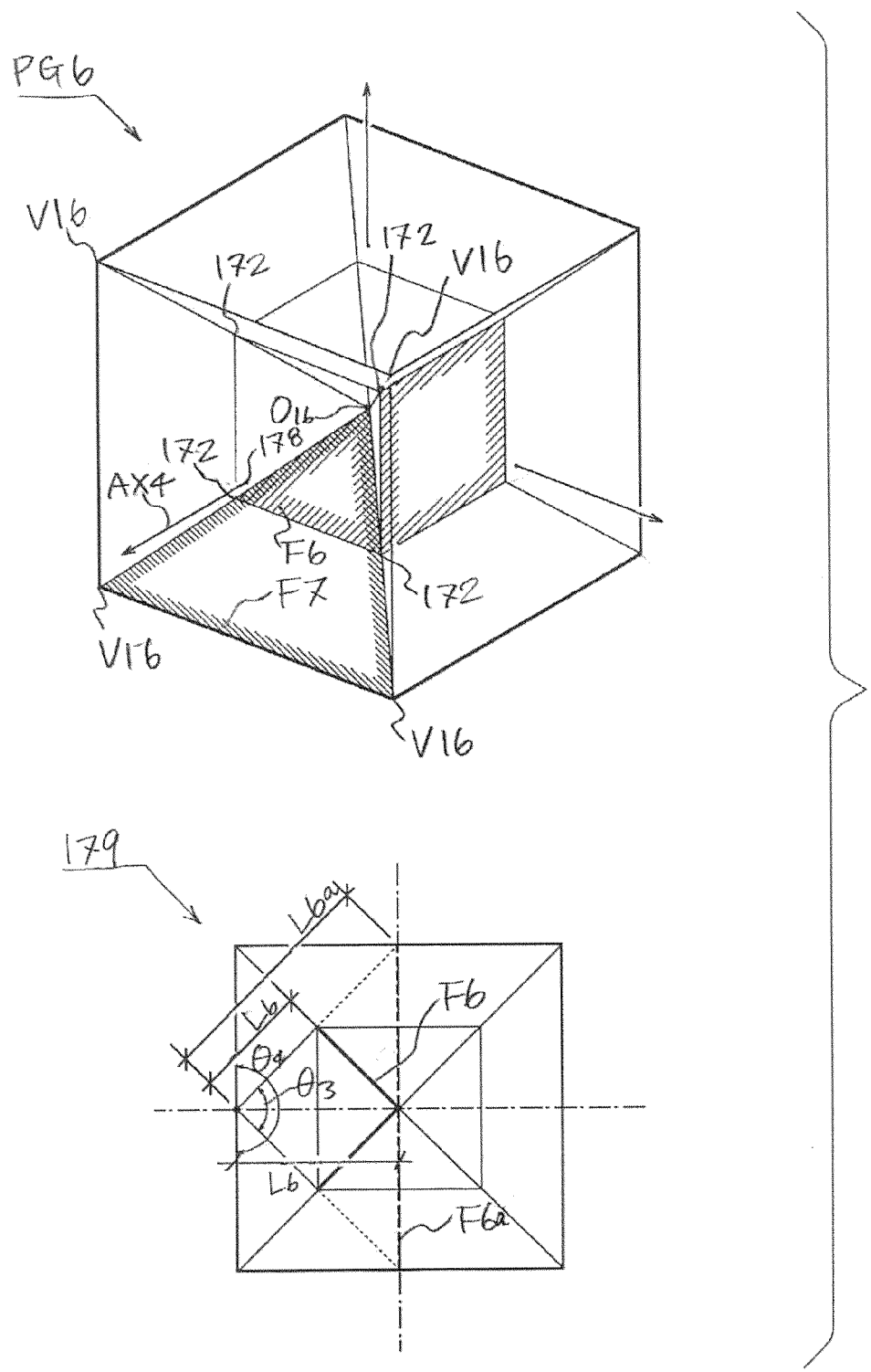
FIG. 41 is a schematic diagram showing a cubic composite camera with a three dimensional arrangement of planes of projection for each optic axis according to the invention.

FIG. 41 schematically shows a composite camera PG6 arraying an optic axis AX4 at the center of each cubic face. A lens, in this case a pinhole is positioned on the axis AX4 in particular at the intersection 178 with a cubic surface. Thus, the camera divides an entire view into six parts. A square pyramid of projection F6 is composed of four triangles defined by a cubic center O16 and midpoints 172 of segments connecting the center O16 and cubic vertices V16. A hatched region is one of the four triangles.

Four triangles F7 defined by a cubic center O16 and cubic vertices V16 can compose a 3-D surface of projection instead. The arrangement with an accurate pinhole can capture almost a 2π sr view. Each obtained images by each axis is wider than an assigned view therefore overlaps to adjacent images. The overlapping visual field generates a stereo photo. A square defined by points 172 can be a part of a 3-D surface of projection. A cross section 179 of the camera shows that such a 3-D surface of projection reduces differences in distance from its focal point to points on the surface.

Figure 57:
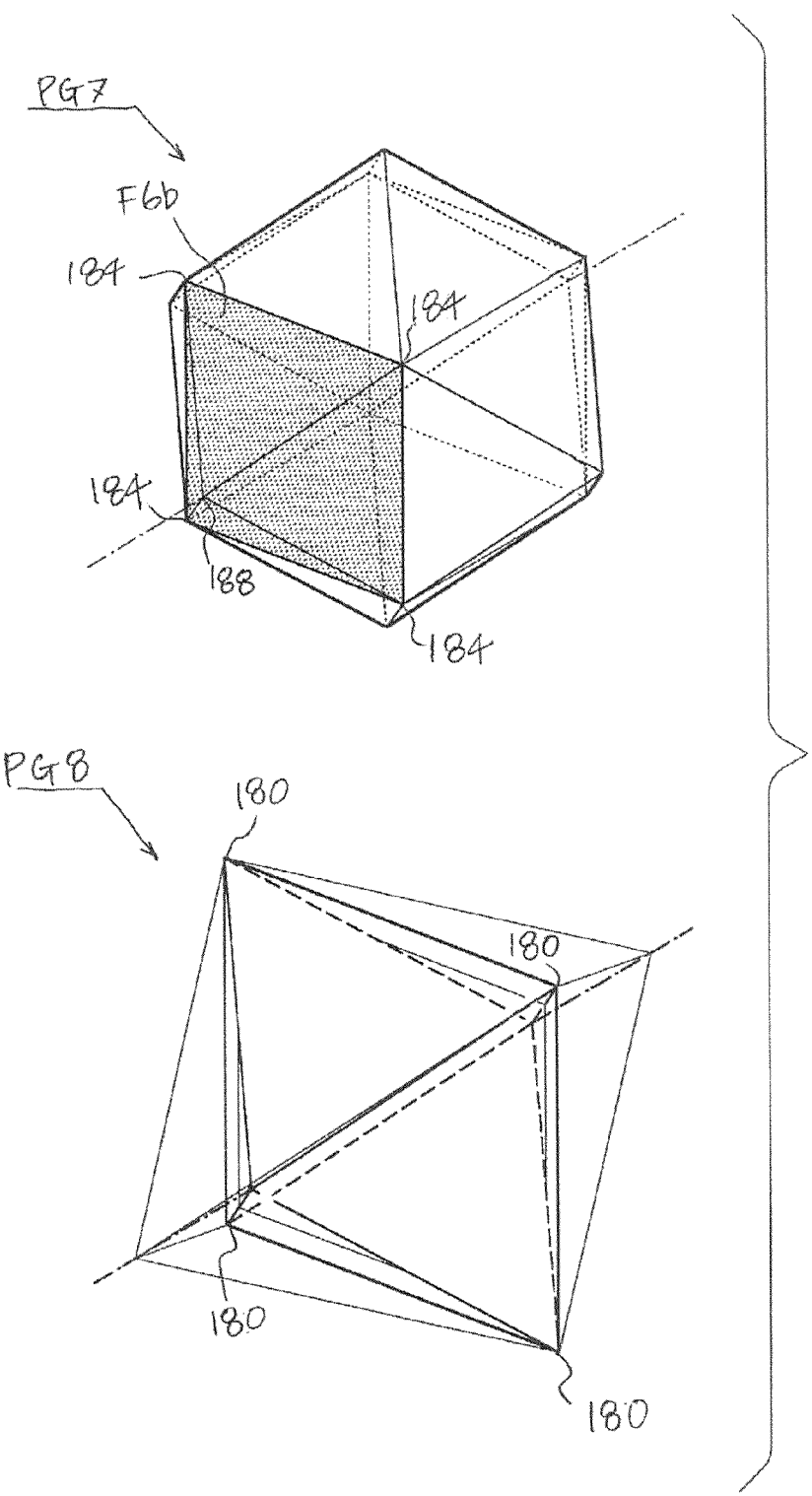
FIG. 57 is a schematic diagram of a rhombic dodecahedral image and an octahedral image captured by the camera shown in FIG. 41 according to the invention.

In FIG. 57, exposed images on 24 planes of projection are assembled in a polyhedron PG7 with 24 faces. An obtained image by a plane F6 is mapped on a square pyramid F6b defined by its apex 188 and other vertices 184. The obtained images can be assembled in a similar polyhedron, a rhombic dodecahedron too. The polyhedral image is iso-area-mapped on a rectangular plane possibly through multi-layer-mapping on a cube, tetrahedron or octahedron. Images obtained by the planes F7 are assembled on an octahedron PG8 and flattened out on a square defined by its vertices 180.

The method can obtain several types of polyhedral images and choose an optimum rectangular image. Simple explanation for better understanding needs geometrical term. Therefore, for practicing the 20th embodiment it allows an error by a parallax owing to the volume of camera as long as it obtains the same effect. The note in this paragraph is not only for the 20th embodiment but also for the all embodiments.

Twenty-First Embodiment

The invention relates to mapping a 3-D surface on a rectangle. The invention includes a method to integrate the 3-D arrangement of plane of projection on a rectangular plane. The embodiment illustrates an octahedral composite camera, which simplifies a complex arrangement by integrating the surfaces on three square planes.

Figure 44:
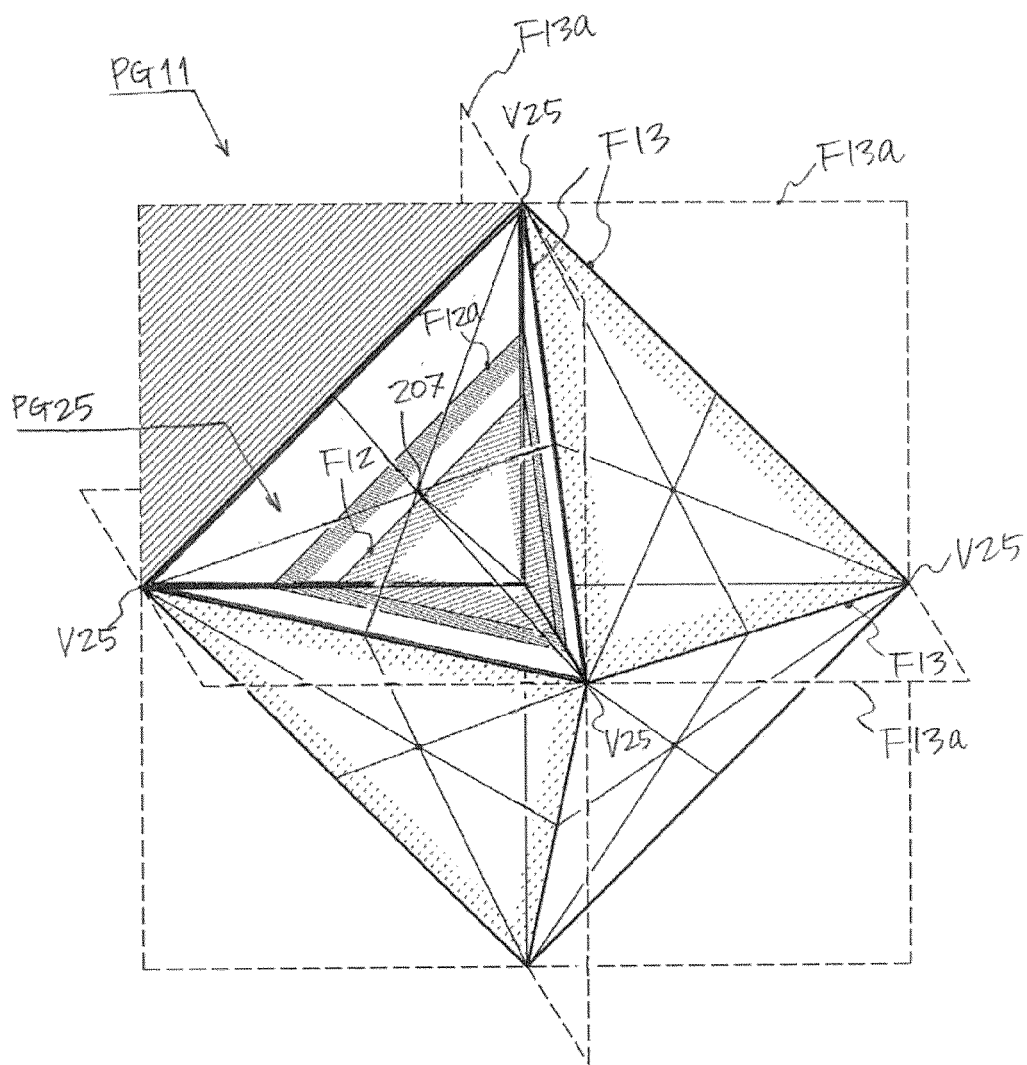
FIG. 44 is a schematic diagram showing an octahedral composite camera with three squares integrating a three dimensional arrangement of planes of projection for each optic axis according to the invention.

FIG. 44 shows an octahedral composite camera PG11. A lens, which is a pinhole 207 in this case, is mounted on an octahedral face. Planes of projection are mounted on a part of inner faces of a triangle pyramid PG25 defined by an octahedral face as its base and by the center of the octahedron as its apex. It shows that eight surfaces of projection are integrated on three inscribed squares F13 defined by octahedral vertices V25. Thus, image sensors can be easily arranged on the squares, which provide eight pyramid's surfaces of projection for eight optical axes. The method can be applied to other 3-D object as long as it obtains the same effect.

An octahedral camera can obtain an entire view with image sensors on a pyramid surface F12 that capture ½π sr view by a lens 207. It can obtain two tetrahedral entire views with a larger pyramid F12a by which each lens captures 1π sr view. It can obtain four sets of entire views with image sensors mounted on entire squares by which each lens captures 2π sr view. Otherwise, it can generate a stereo photo by overlapping images obtained by the larger surfaces of projection.

Planes F13a including F13 can be utilized as reflectors. The planes cross at right angles and are able to reflect lights from any directions to where it comes from. Thus, cameras with the reflector can quickly survey relational position each other by utilizing the principle. This method is applicable only in case that each surface of projection covers ½π sr view. In case of wider view, the reflector disturbs a visual field. Planes F13a can be utilized for stabilizing the camera. The octahedral camera illustrates a 3-D surface of projection in this embodiment but can mount a plane of projection parallel to an octahedral face as well.

Twenty-Second Embodiment

The invention includes a method to cover a desired entire space by networking a plurality of cameras. A single stand-point of a camera occasionally has a blind zone if the desired space shapes complicated. Such space needs to distribute a plurality of visual fields to cover overall space. The method can quickly survey relational position of cameras.

Figure 45:
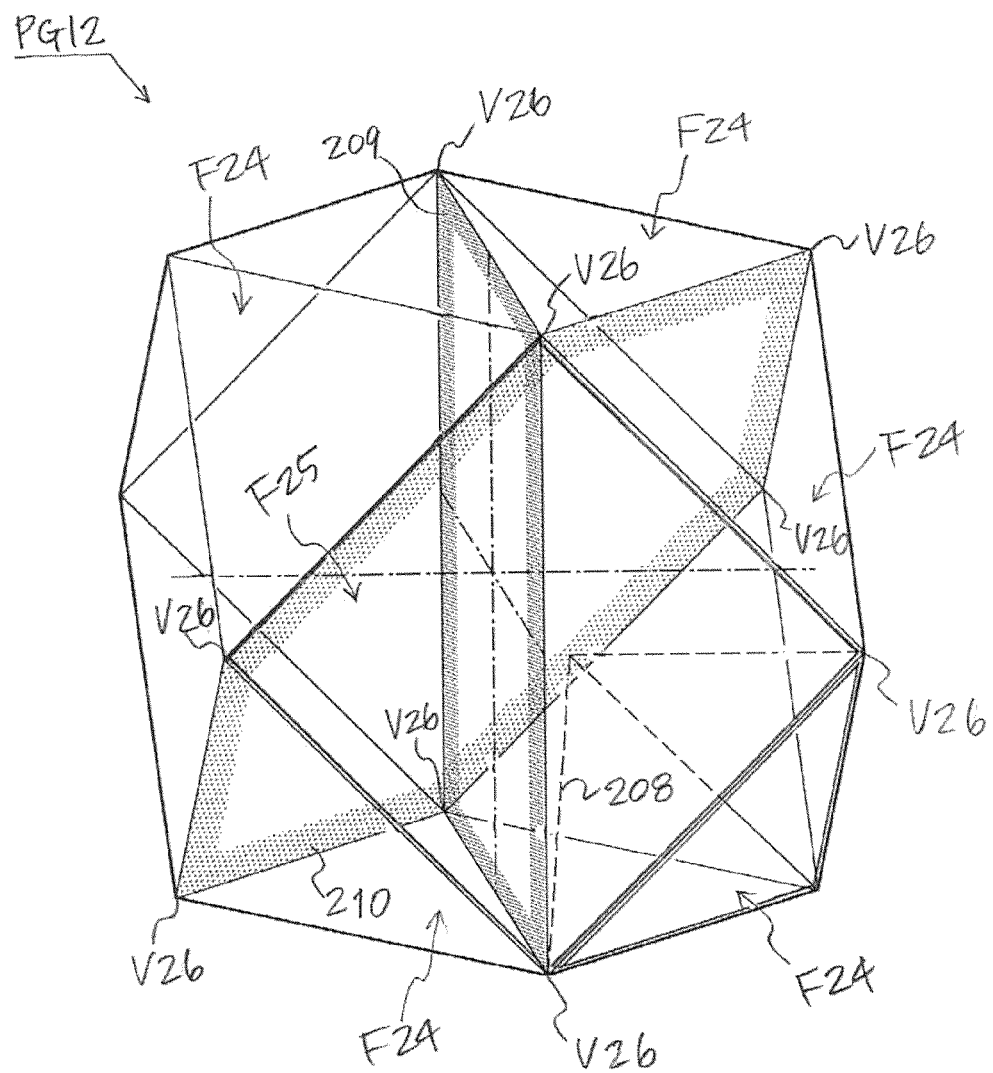
FIG. 45 is a schematic diagram of a cuboctahedral composite camera with a reflector suitable for capturing positional relations among cameras according to the invention.

FIG. 45 schematically shows a cuboctahedral composite camera PG12 with six optic axes on each cuboctahedral squares F25. Six optic axes equally divide an entire view into six visual fields. A light source and a triangular pyramid of reflector 208 are mounted on each triangular face F24. Eight reflectors 208 compose an omnidirectional reflector. Its pyramid surfaces meet at right face angles.

In case of a network by distributing the cameras in an observed space, the reflector can capture light sources coming from other cameras and survey each camera's positional relation. Thus, a desired space is covered by a plurality of omnidirectional views from different standpoints while recognizing their positional relation.

The cameras can be arranged to surround a particular subject to observe it from many sides. The method can be specialized in capturing other portion of the electromagnetic spectrum than visible light, such as radio wave, infrared, ultraviolet, x ray and gamma ray. The method can be applied to MRI and also to sonar for capturing sound wave. The method can display other image than ordinary scenery, such as thermograph, magnetic field and Doppler effect. For the method, a simultaneous exposure is suitable for capturing many moving object. Meanwhile a less number of cameras can capture each assigned visual field by rotating it. In this case, it can concentrate each optical center of each exposure on its rotation axis. Same effect can be obtained by rotating video equipment while recording. The note in this paragraph is not only for the twenty-second embodiment but also for the all embodiments.

The method can customize an arrangement of optic axis, reflector, and light source. Fourteen axes on every faces generate an omnidirectional cuboctahedral image. The cuboctahedral image can iso-area-map on two sides of an inscribed square 209 or a hexagon 210 defined by cuboctahedral vertices V26. Both square and hexagonal images can be arranged on a plane with some gaps with seamless continuations or without any gaps with discontinuous seam.

Twenty-Third Embodiment

Figure 47:
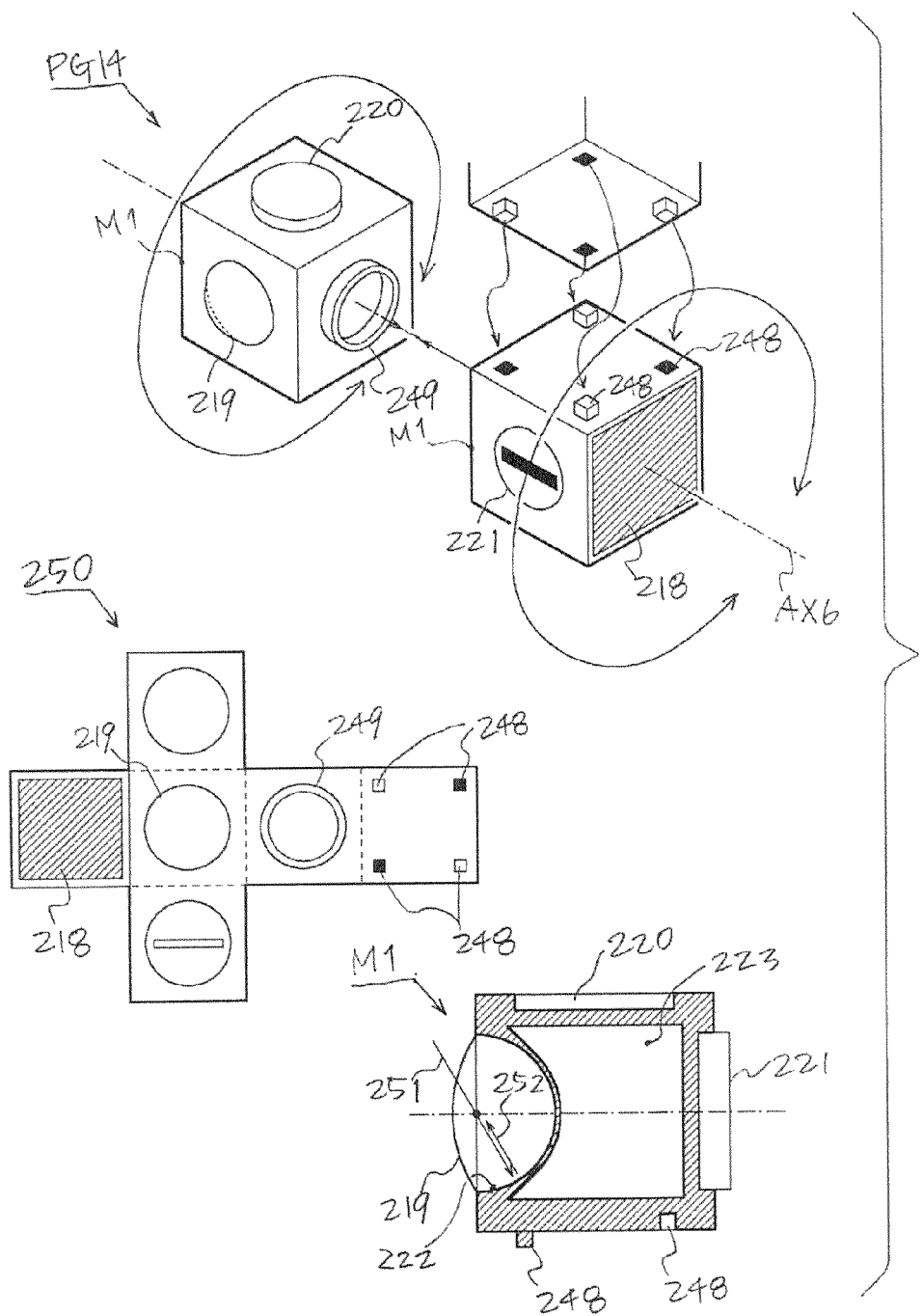
FIG. 47 is a schematic diagram of a composite camera available for requirements of changes in resolution and/or stereoscopic imaging according to the invention.

The invention includes a method to vary arrangements of optic axes and to generate various omnidirectional images for different needs such as needs for a stereo effect. FIG. 47 shows a composite camera unit PG14 composed of two cubic camera modules M1 with a lens 219 or a pinhole. The modules M1 are coupled together by a hinge 249, and can rotate about an axis AX6. The hinge is preferably configured to fix the modules M1 at every rotation of certain angles. A shutter 220, a battery unit and/or a socket for power 221, a display unit 218 and connector 248 are mounted on other cubic faces. A connector 248 connects to other coupling camera PG14. A connector 248 can preferably function as an output (input) connector and/or a thumbscrew of a tripod. In this illustration, a spherical surface of projection 222 is mounted on the camera module M1. In case with a pinhole at the center of the sphere, the surface keeps a distance to a focal point equally. An incoming light is projected on the surface at right angle. These features are suitable for a proper exposure. The 3-D surface of projection tends to cause the diffused reflection problem. The spherical surface reflects the light back to the pinhole, which keeps off a diffused reflection inside the device.

Figure 48:
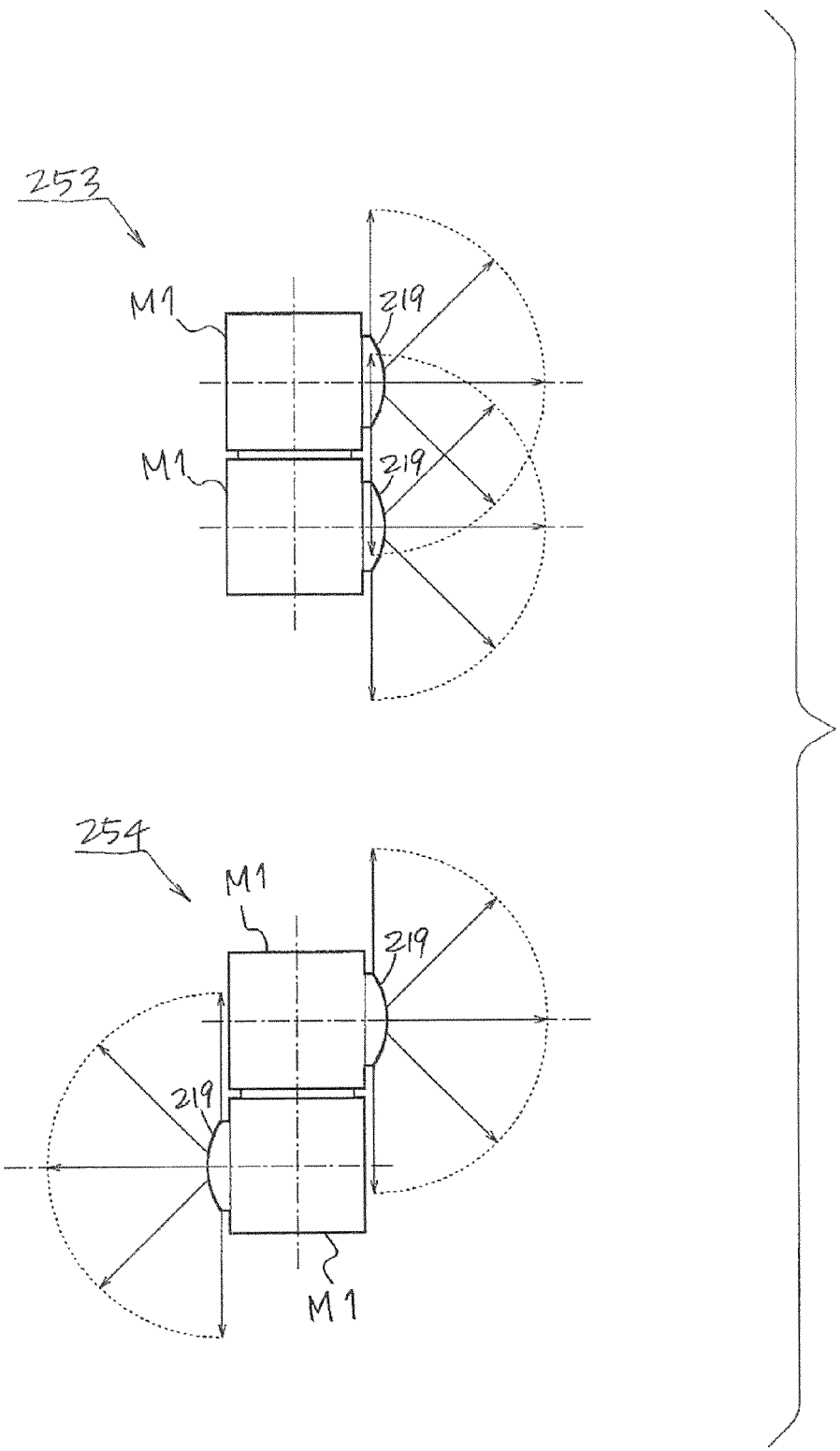
FIG. 48 is a schematic diagram showing a method of obtaining a stereoscopic image and a method of obtaining an omnidirectional photograph by the camera shown in FIG. 47 according to the invention.

FIG. 48 shows a mode of use, 253, of the composite camera unit PG14 in which the two camera modules M1 are coupled to align their optical axes in a common direction for capturing a stereoscopic photo and a mode of use, 254, of the same composite camera unit PG14 in which the two camera modules M1 are coupled to orient their optical axes in opposite directions for capturing an omnidirectional view.

Figure 50:
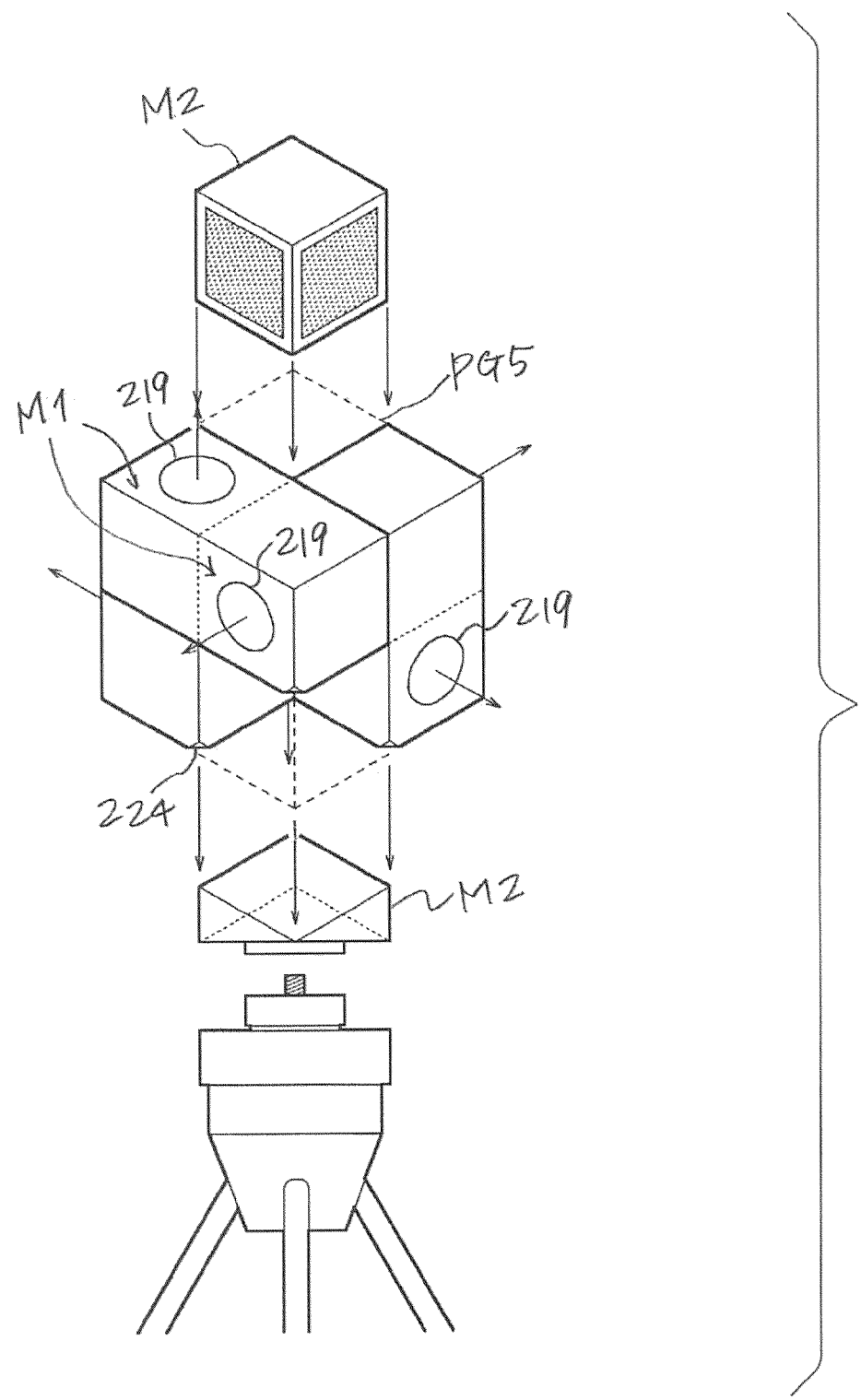
FIG. 50 is a schematic diagram showing a combination of three cameras as an example of the composite camera shown in FIG. 47 according to the invention.

FIG. 50 shows an arrangement with three cameras PG14. In each camera PG14, two axes of devices M1 cross at right angle. Three cameras PG14 are integrated to capture an entire view in six divisional regions by setting six optical axes in accordance with a cube PG15. This arrangement assigns a device M1 one of six divisional views. This arrangement captures an entire view with higher resolution than one by a camera. Cube's niches at bottom and on top can preferably mount a module M2, such as a pan head, a light source or other essential modules. Truncated vertices 224 at the bottom stabilize the camera. A parallax between optical centers generates a stereo photo if lens 219 covers a wider visual field than an assigned visual field. User can customize an arrangement of the camera modules M1 for a different resolution and for a different setup of parallax. User can customize an arrangement of components on device's faces such as mounting more connection 248 or replacing it to a hinge 249. A camera PG14 can be composed of other combination of device M1.

Twenty-Fourth Embodiment

The invention includes a method to vary arrangements of optic axes to provide choices of polyhedral images. The invention also includes a method to mount storage, circuit and other necessary components while modifying a shape of the composite camera without disturbing its geometrical attribute.

Figure 46:
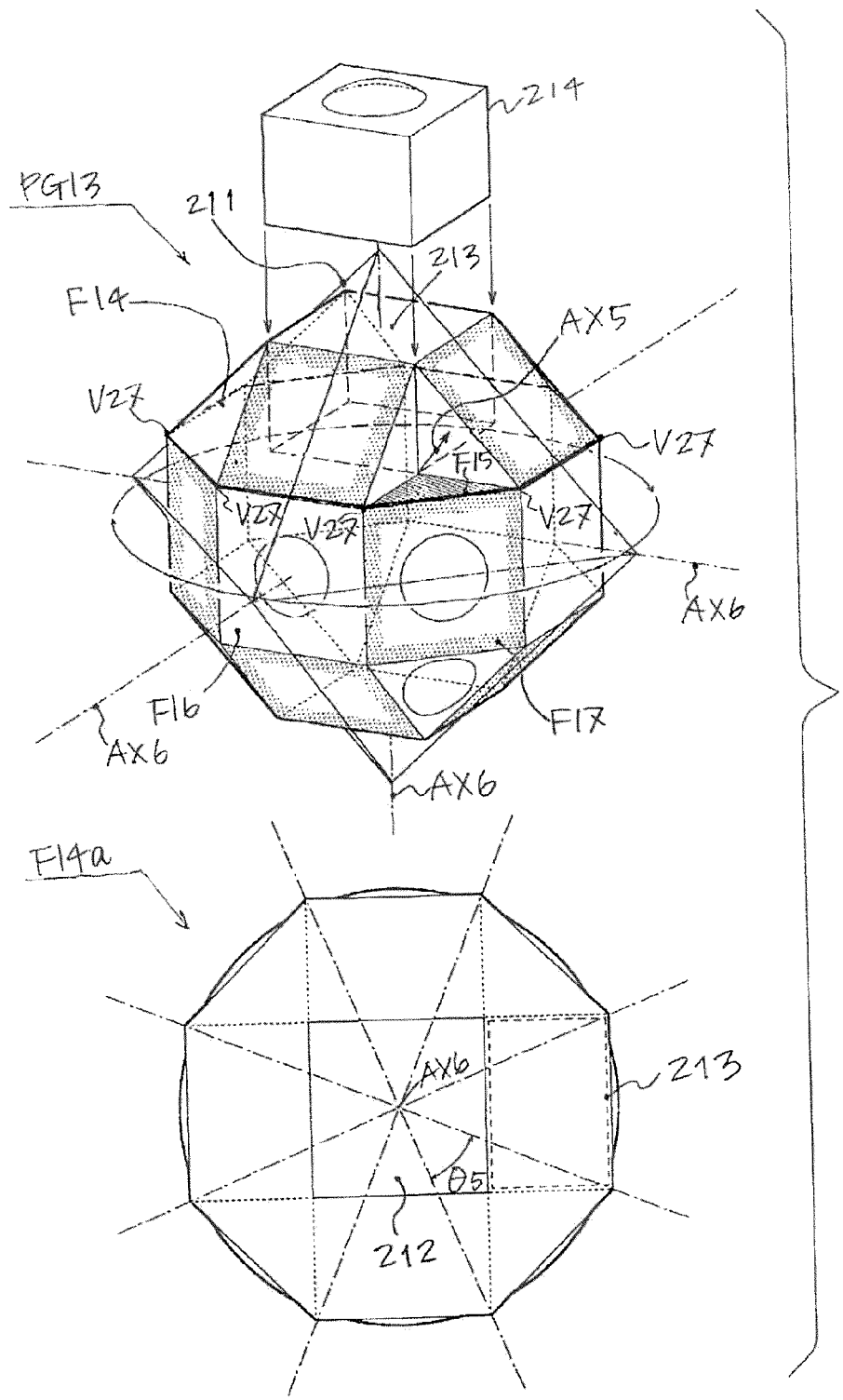
FIG. 46 is a schematic diagram of a rhombicuboctahedral composite camera having diversity in arrangement of optic axes.

FIG. 46 schematically shows a rhombicuboctahedral composite camera PG13 and its section 14a. The rhombicuboctahedron is obtained by truncating edges and vertices of an octahedron 211. In one of arrangements, the camera PG13 integrates image sensors for all optic axes on six octagons F14 defined by six vertices V27. The axes are assigned according to eight triangular faces. For example, a hatched region F15 is one of composed planes of projection. The arrangement can obtain an entire octahedral image that is derived from the arrangement of eight optic axes. A RAM, storage, power source and other necessary components are installed in a cubic space 212 created by the six octagons F14. Removable additional components such as component cameras are installed in niches 213.

The camera can arrange optic axes to obtain diverse polyhedral images. An arrangement of 26 optic axes towards its all faces generates a rhombicuboctahedral image. A lens with an ordinary angle θ5 can capture an assigned divisional visual field according to the arrangement. An arrangement of optic axes towards twelve squares F17 obtains a rhombic dodecahedral image. The rectangles F17 are sections by truncating edges of an octahedron 211. An arrangement of optic axes towards six rectangles F16 obtains a cubic image. The rectangles F16 are sections by truncating vertices of an octahedron 211. This arrangement can mount the reflectors on regions F15 to compose an omnidirectional reflector and light sources, tripod, an output (input) connector, an antenna on other faces. The rhombicuboctahedral camera contains three sets of eight sided prisms. Each prism's base crosses with an axis AX6 at right angle. An arrangement of optic axes on its eight side faces generates up to three prismatic and/or cylindrical images, which can generate up to three panorama images, an accustomed representation.

Twenty-Fifth Embodiment

The invention includes a composite mapping method that combines different types of mapping such as a mapping with a gnomonic projection along an ordinate and orthographic projection along an abscissa. The method is available for 3-D objects such as with open or curved surfaces or 3-D objects by uniting several objects. It illustrates a mapping method that combines cylinders and extracts distorted parts from the cylinders that compose a 3-D object with closed surface.

Figure 53:
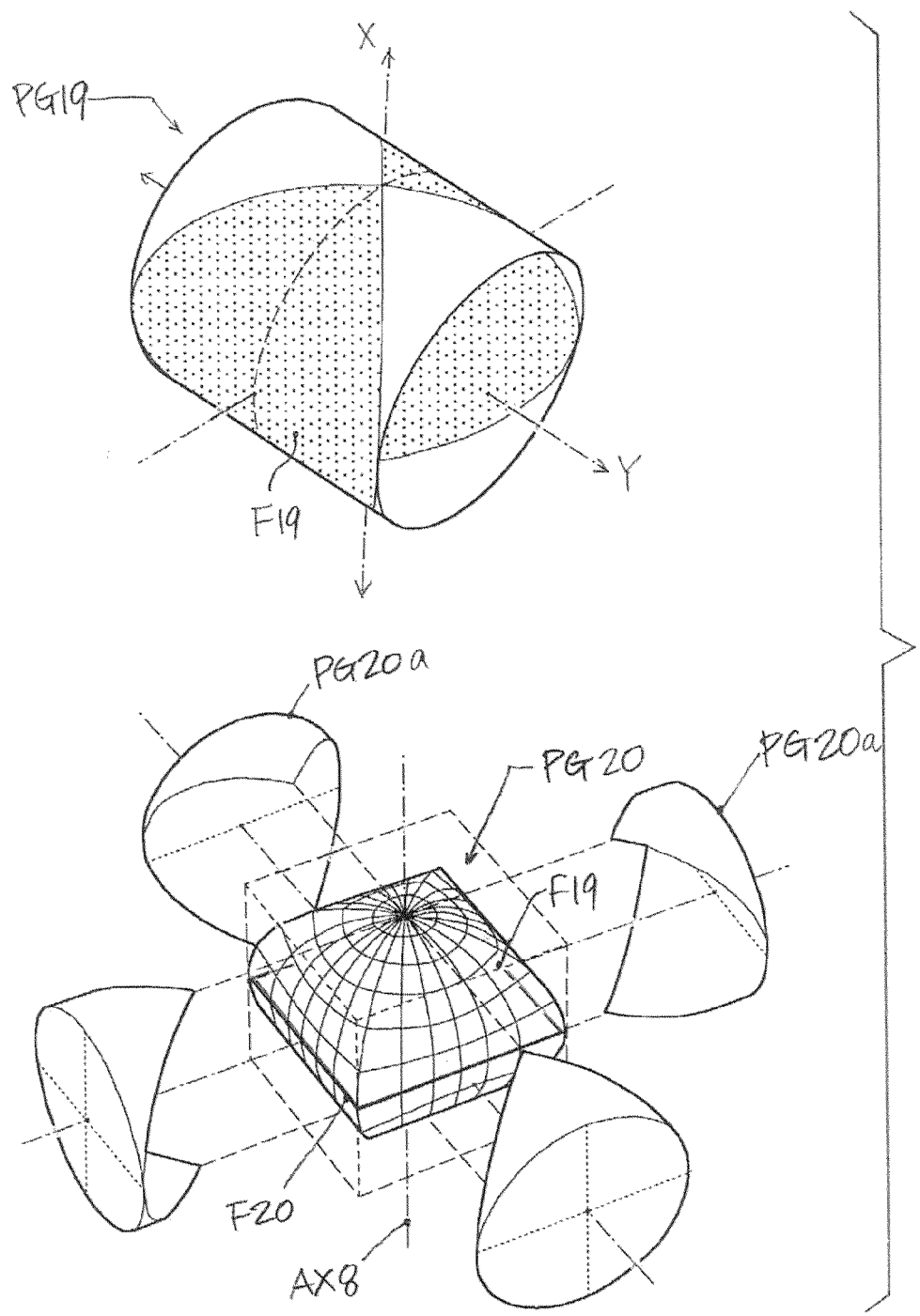
FIG. 53 is a schematic diagram illustrating a process of a hybrid mapping method for open surfaces according to the invention.

A schematic diagram shown in FIG. 53 illustrate a process for obtaining a square image from an object generated by intersecting the two cylinders PG19. An entire view is mapped on a cylinder PG19 by a gnomonic projection along longitude and an orthographic projection along latitude. A hatched region F19 is an overlapped region by intersecting two such cylinders. An entire view on a 3-D object PG20 described with a set of graticule is obtained by four such regions F19 and by removing four other regions PG20a. A square F20 receives mapping from a 3-D object on its both sides on top and bottom along axis AX8. A rectangular image is obtained by integrating the images on its two sides.

Cylindrical projection is known as a panorama photography and Mercator projection. The method is composed of such mappings with cylinders. Therefore, its appearance is familiar for user who has been familiar with a panorama and Mercator projection. Meanwhile it reduces distortions on a rectangular image by extracting less distorted part in cylindrical projection. The method can be applied to other 3-D objects defined by curved surfaces, straight lines and curves. An object composed of corns can obtain an image associated with a conic projection.

Twenty-Sixth Embodiment

Figure 54:
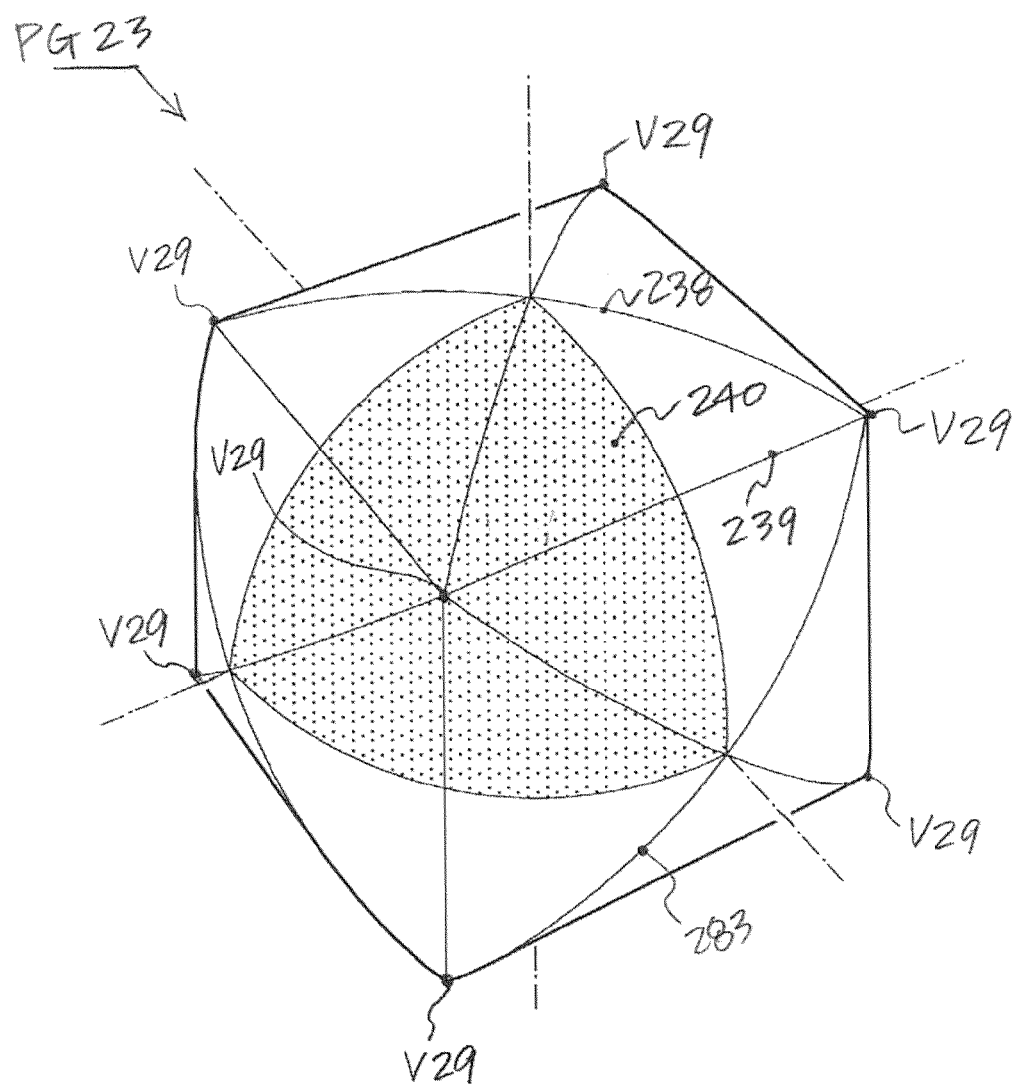
FIG. 54 is a schematic diagram showing an eclectic method combining cylindrical projection and rectangulation according to the invention by using a rhombic dodecahedron as an example.

The invention includes another mapping method compromising an existing cylindrical projection and the rectangular image according to the invention. FIG. 54 shows a rhombicuboctahedron PG23 created by an intersection of another cylinder and the object PG20 in FIG. 53. Overlapped parts of cylindrical surface compose congruent twelve rhombicuboctahedral surfaces defined by arcs 238, connecting vertices V29. Straight lines subdivide the object into 24 regions. The polyhedron with the 24 curved surfaces fits to a cube, octahedron and tetrahedron by sharing many vertices, faces and edges. Therefore, it is suitably mapped on these polyhedrons. For example, a hatched region 240 is mapped on an octahedral face.

Specifically, A simple gnomonic projection with these polyhedrons maintains area ratios. The polyhedron can generate a rectangular image according to the invention. Thus, the method intermediates between a wide used cylindrical projection and the rectangular image by the invention. Simple explanation for better understanding needs geometrical term. Therefore, for practicing, the 26th embodiment allows an error in the polyhedrons and polygons for the mapping as long as it obtains the same effect. The note in this paragraph is not only for the 26th embodiment but also for other related embodiments.

Twenty-Seventh Embodiment

Figure 58:
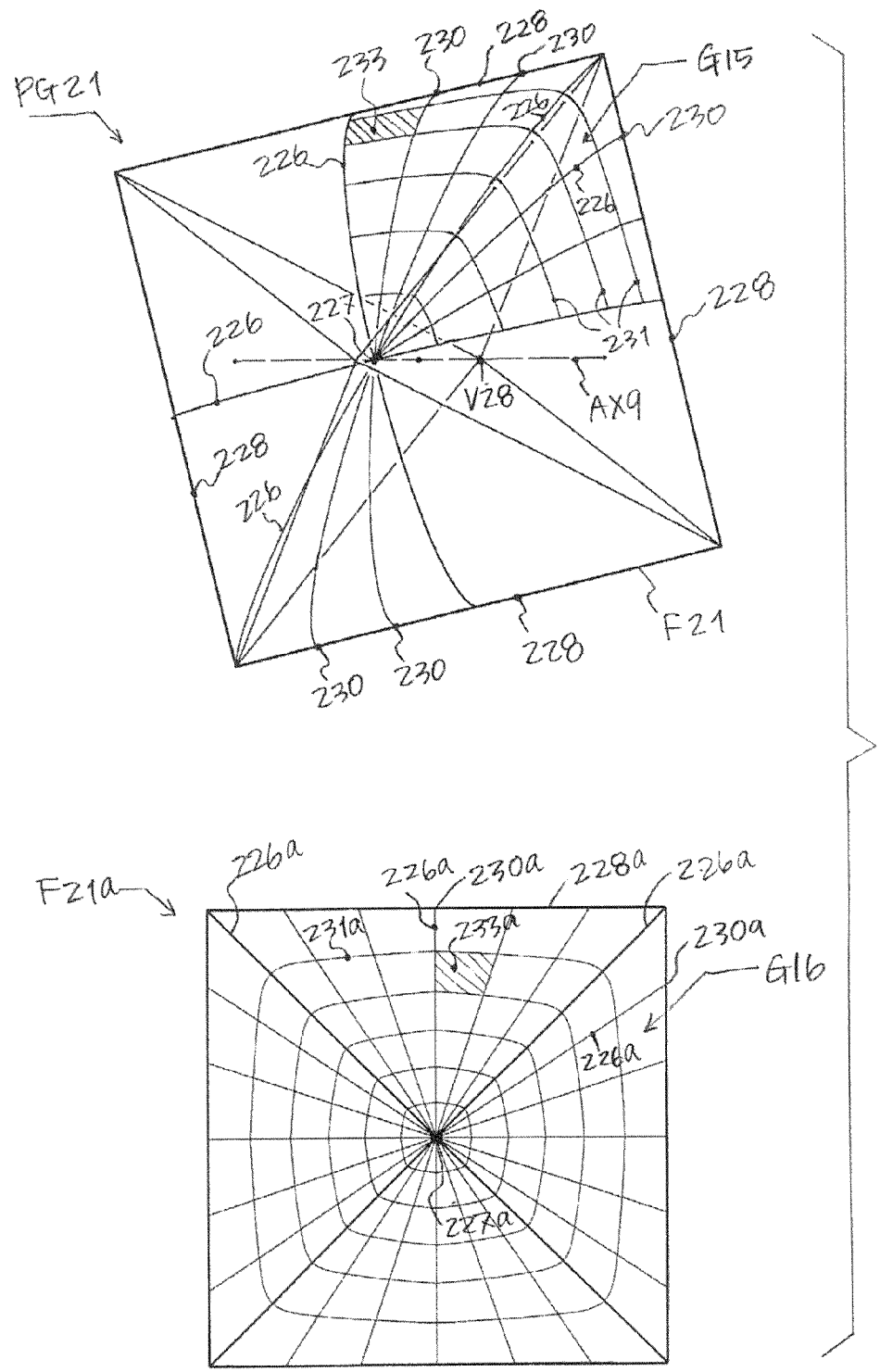
FIG. 58 is a schematic diagram showing a method of dividing an object with curved lines according to the invention by using a solid having arcuate meridians as an example.

The invention includes a method with mapping on an object composed of arcs in a longitudinal direction, which contains one or more rectangular sections. The arcs buffer a mapping from an angle distortion around polyhedral edges since any section of a sphere is circle. The image represents an omnidirectional view without disturbances. FIG. 58 schematically shows a 3-D object PG21 divided by a graticule-iso-area grid G15. Longitudes 226 and latitudes 231 compose the grid G15. A part of the grid in one eighth of an entire visual field is shown in this diagram. Arcs 226 radiates from a pole 227 to points on a square's F21 edge 228. Curved lines 231 link points that divide arcs 226.

Meanwhile an iso-area grid G16 is on a square F21a composed of a lines corresponding to its longitudes 226a, latitudes 231a and square's edges 228a representing an equator. A part of the grid in one eighth of an entire visual field is shown in this diagram. Segments 226a radiates from a point representing a pole 227a to points on the square's edge 228. Curved lines 231a link points that divide the segments 226a. Each divisional region 233 on a grid G15 is iso-area-mapped on each corresponding region 233a on the square. Thus, a square image is obtained. The arcs of 3-D object PG21 connect its surfaces without visible edges. That eliminates an angle distortion around polyhedral edges when displaying on a square.

Twenty-Eighth Embodiment

Figure 59:
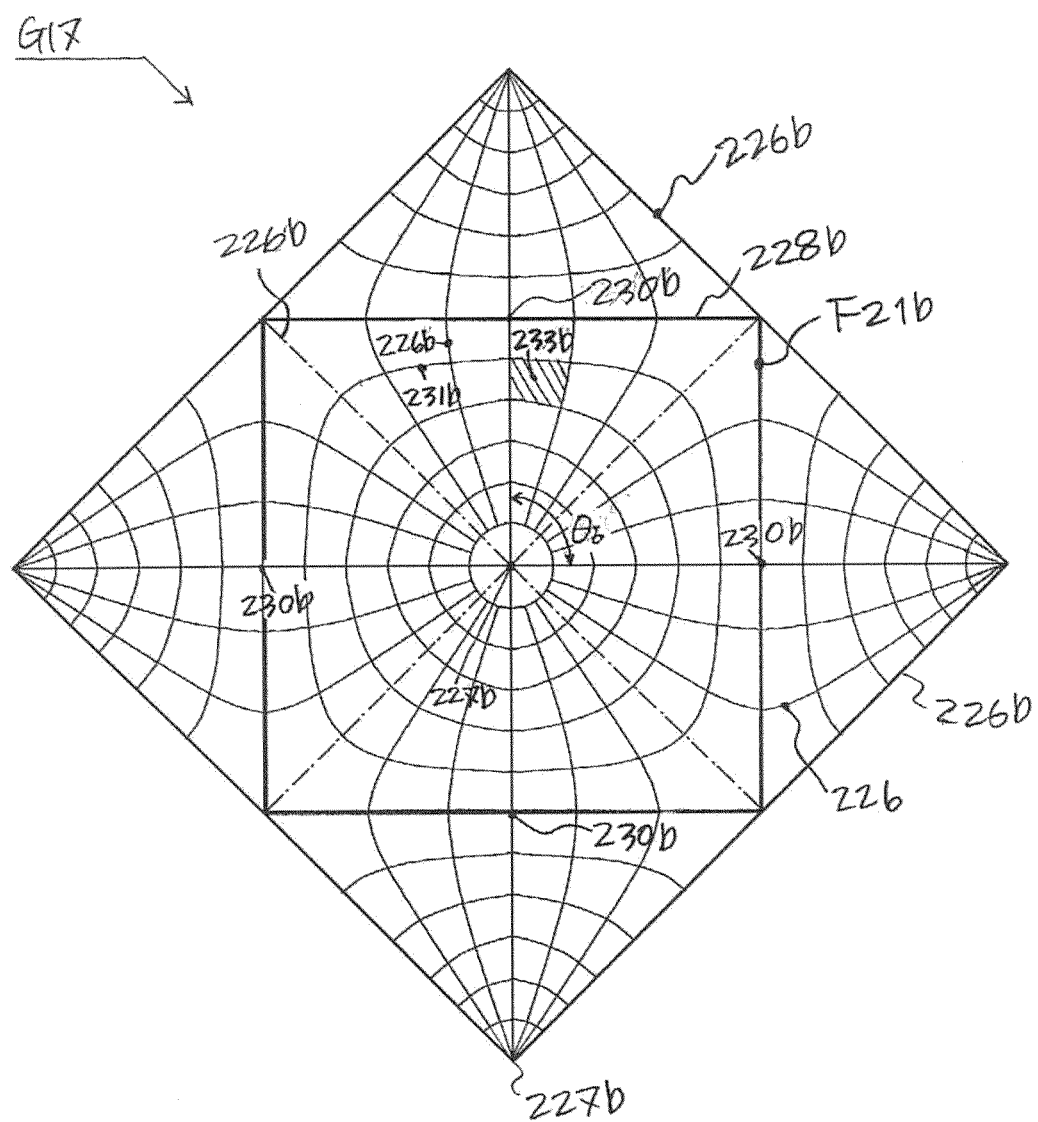
FIG. 59 is a schematic diagram illustrating the method of dividing an object with curved lines according to the invention by using quadratic curves as an example.
Figure 60:
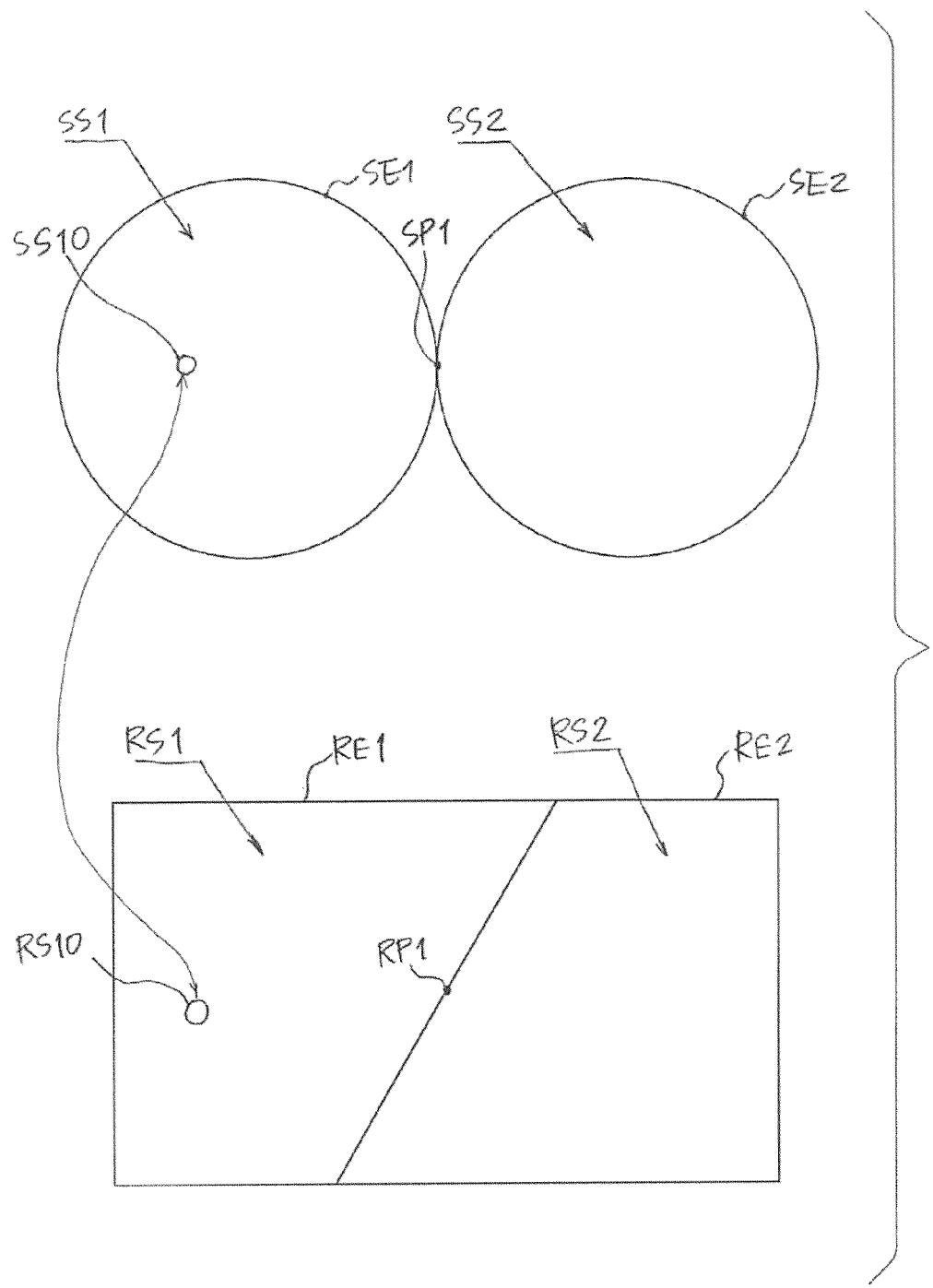
FIG. 60 is a schematic diagram illustrating a model of the mapping concept according to the invention for fisheye images.

The invention includes an iso-area dividing method by curves such as conic sections. FIG. 59 schematically shows a grid G17 in a square covering an entire visual field. It is a modification of a grid shown in FIG. 58. The grid G16 shown in FIG. 58 corresponds to a square region F21b in this diagram. Segments 226b, 231b and a square's edges 228b compose a grid G17. Curved segments 226b such as hyperbolas radiates from a point representing a pole 227b to points 230b on the square's edge 228b. Curved segments 231b such as parabolas link points that divide the segments 226b. The method can obtain a conformal mapping by arranging a segment 231b and 226b to cross at right angle. Each divisional region 233 on a grid G15 is iso-area-mapped on each corresponding region 233b on the square. Continuous curved lines replace segments bent on the edge 228b. That eliminates an angle distortion around the edges.

A number of frequencies of the iso-area division can be increased for its accuracy. Meanwhile it can be decreased down to a simple tetrahedron or octahedron for a rapid image processing though a correction of distortion is limited. It is preferable to divide segments and/or angle θ6 at their intersections as equally as possible so that obtained image is nearly an equidistant and/or conformal in case of a world map. The grid G16 and G17 can be obtained by an optical projection of the grid G15 from a point on the axis AX9. The curved lines of the grid includes geodesic lines, arcs, Bézier curves, spline curves, parabolas, other conic curves, elliptic curves, other cubic curves, Cassinian ovals, Clothoid curves and lines made by combining these curves. The note in this paragraph is not only for the 28th embodiment but also for the all embodiments.

Twenty-Ninth Embodiment

Figure 55:
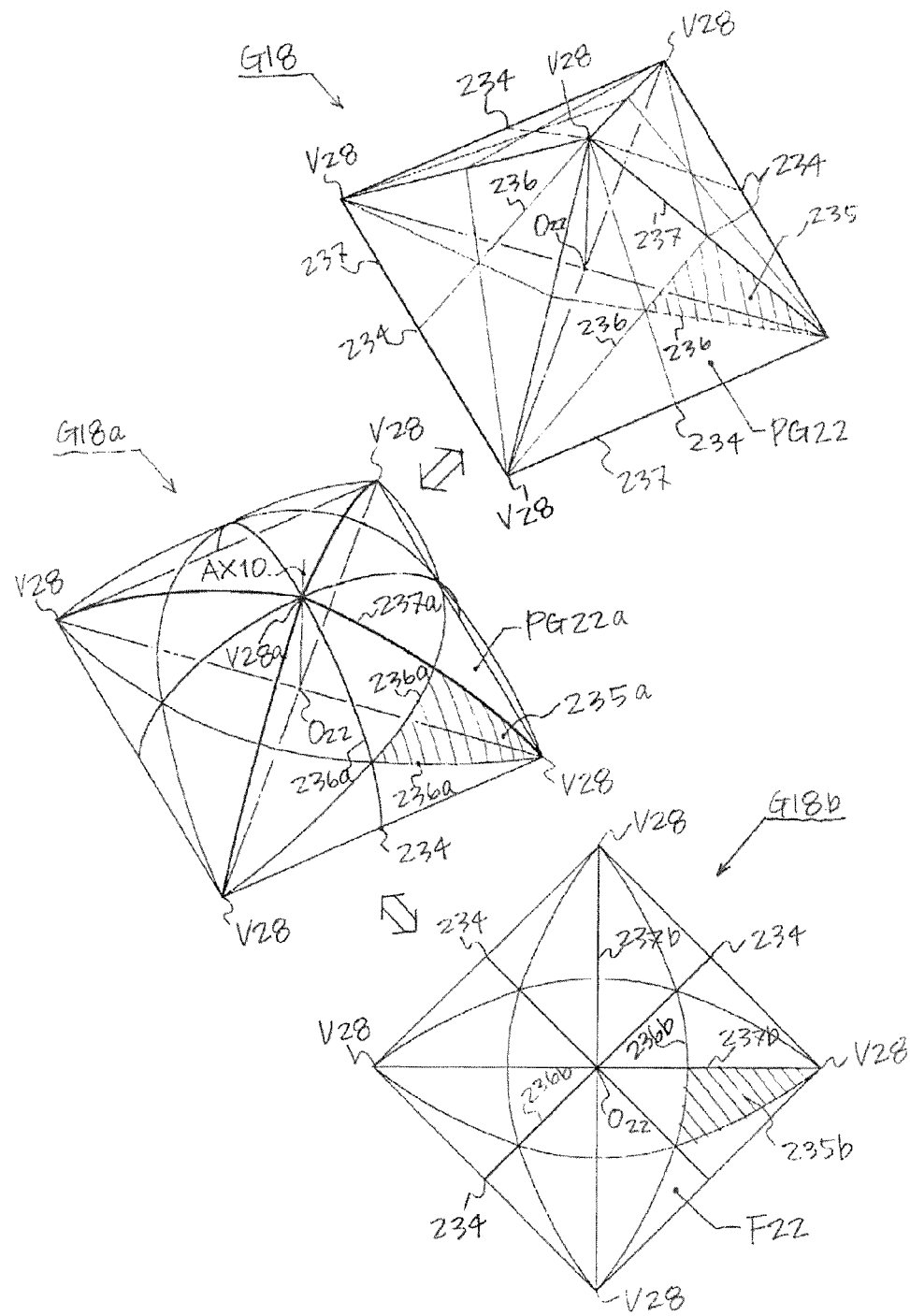
FIG. 55 is a schematic diagram showing iso-area division of a curved surface as a result of combination of a polyhedron and a plane by using an octahedron as an example.

The invention includes a method of iso-area division using an intermediate object between a sphere, a polyhedron and a rectangular plane. FIG. 55 schematically shows a process of multi-layer-mapping of an octahedral image on a square while keeping the displayed image from disturbances. The method maps the octahedral image PG22 on an object PG22a composed of curved surfaces and then on a square F22. It illustrates a half part of an entire visual field such as four of eight octahedral faces. A grid G18 divides the shown four faces into 24 regions. A region 235 is one of them. The grid G18 is composed of following two elements: (1) segments 236 connecting octahedral vertices V28 and their midpoint 234 and (2) its edges 237.

The object PG22a shares the center O22 and all vertices V28 except a vertex V28a with the octahedron PG22. The grid G18a equally divides the shown four faces into 24 regions. A region 235a is one of them. The grid G18a is composed of following three elements: (1) segments 237a radiating from the vertex V28a to other vertices V28, (2) segments radiating from the vertex V28a to midpoints 234 of straight segment connecting vertices V28 (3) segments connecting two vertices V28 passing through a point on a segment 237a. A segment 236a is a curved line such as linked arcs. Its curvature is adjusted so that any region is not mapped outside the square frame later. The square F22 shares the vertices V28 and the center O22 with the octahedron PG22. A grid G18b equally divides the square into 24 regions. A region 235b is one of them. The grid G18b is composed of following three elements: (1) segments 237b radiating from the center O22 to vertices V28, (2) segments radiating from the center O22 to midpoint 234 of the edges and (3) segments connecting two vertices V28 passing through a point on a segment 236b.

Thus, an octahedral image PG22 is iso-area-mapped on a square F22 via an object PG22a. The method can omit the mapping process on an object PG22a as long as it obtains the same effect.

Thirtieth Embodiment

Figure 56:
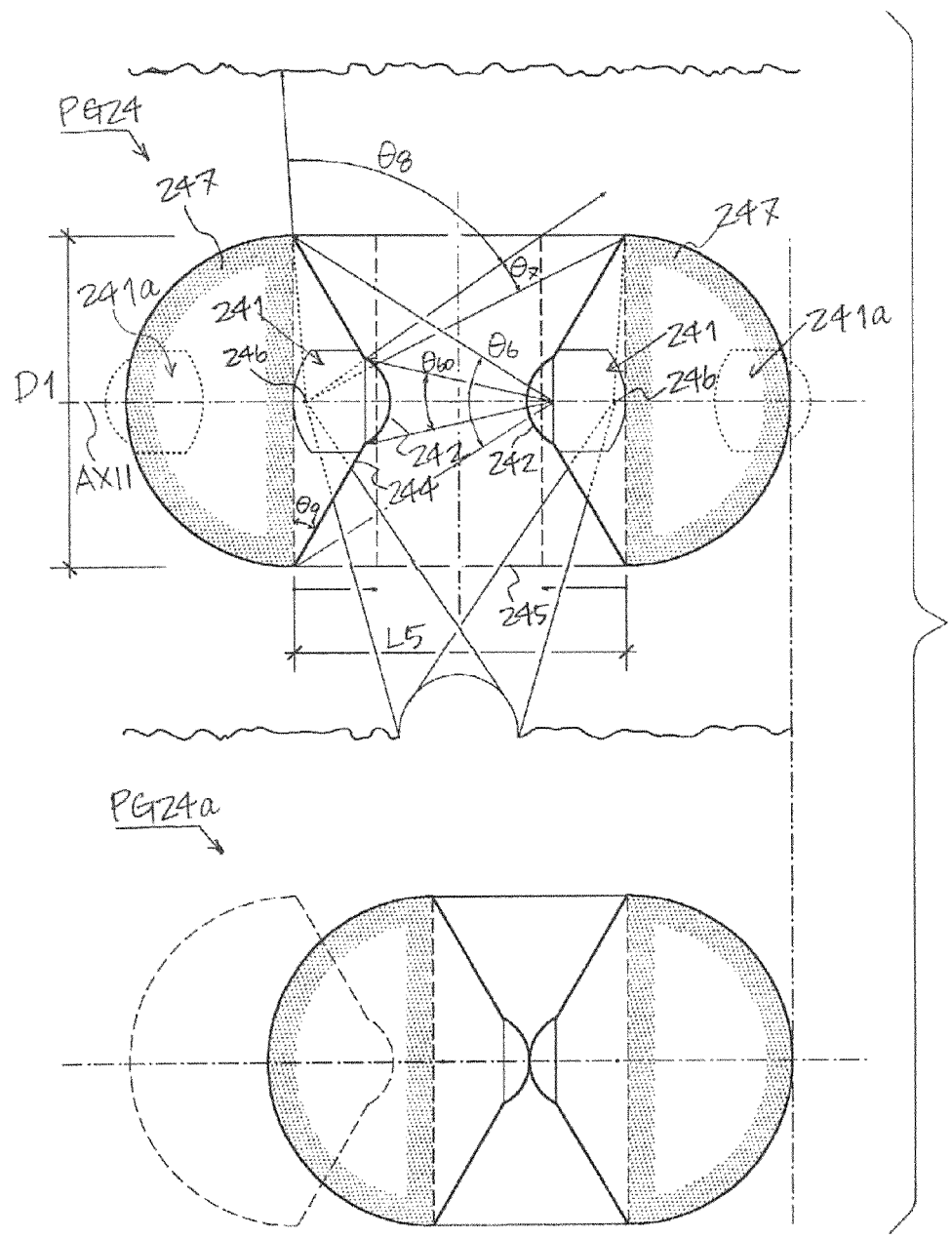
FIG. 56 is a schematic diagram of a camera suitable for a compact design.

The invention includes a method of downsizing a camera used to capture an entire view in small and/or narrow space. FIG. 56 schematically shows a cylindrical composite camera unit PG24. In this camera unit PG24, two cameras 241 are arranged in a face-to-face relation along an axis AX11 of the cylinder. Each camera 241 comprises a lens 242 and a conic reflector 244 having the lens 242 on its top. The reflector 244 reflects a nearly hemispherical view (horizontally 360° and vertically θ8) to the lens 242. Therefore, the lens's angle θ6 of view does not need to be wide. If the angle is wider as much as θ7, the surplus angle of view is added to the other lens's 242 angle of visual field. The angle θ9 of the conic reflector and a distance L5 between cameras define its angle of view. Therefore, the transparent cylinder 245 slides and adjusts the distance L5 for proper angle, for zooming and for minimizing camera's size PG24a.

Thus, an omnidirectional image taken by the two cameras can be rectangulated by the mapping method according to the invention. Meanwhile it can carefully observe a desired subject such as a tumor with a stereoscopy by utilizing a parallax between two optical centers 246. The reflector 244 of each camera 241 has a configuration capable of accommodating the counterpart camera 241 and thereby contributes to downsizing the composite camera unit PG24. Further, this configuration of each reflector 244 contributes to provide a distance necessary for focalization when the camera is used in a narrow space.

A cone-shaped reflector 244 is preferable for converting an obtained image to a panorama in case of observing inside of a tube such as intestine. A hatched space 247 can store a data storage device, output (input) connector and/or an additional camera 241a. The camera 241a covers a dead angle θ60 hided by the camera itself. In this case, four cameras 241 are incorporated in the composite camera unit PG24 with their optical axes aligned in parallel to the axis AX11 and do not require an increase of the diameter D1 of the cylinder to provide a minimum focal distance.

What is claimed is:

1. An information processing method using a computer for converting start information on a start spherical surface into end information on an end plane via a tetrahedron, comprising:
    providing a computer comprising a computer program stored in a non-transitory computer-readable recording medium and executable to provide a method comprising;
    a plane dividing step for dividing the start spherical surface to generate an intermediary spherical polyhedron having divisional spherical faces each holding a divisional piece of said start information;
    a plane integrating step for integrating said divisional spherical faces of the intermediary polyhedron onto four triangular faces of a tetrahedron such that all of the divisional pieces of the start information held on said divisional spherical faces of the intermediary polyhedron are mapped onto the four triangular faces of the tetrahedron without gaps and overlaps;
    a flattening step for developing said tetrahedron into a rectangular plane comprising a rectangular omnidirectional image mapped thereon by iso-area mapping;
    receiving a user request to view the rectangular omnidirectional image mapped on the rectangular plane;
    displaying, on a user display device, the rectangular omnidirectional image mapped on the rectangular plane; and
    providing for the user to control navigation to move a viewer frame to extract a part of the rectangular omnidirectional image mapped on the rectangular plane,
    wherein said start information on the start spherical surface is converted into the end information on the end plane while equally maintaining an equal area ratio between said start information and said end information.

2. The information processing method according to claim 1, wherein said intermediary spherical polyhedron is a regular spherical polyhedron or a semi-regular spherical polyhedron.

3. The information processing method according to claim 1, wherein said intermediary spherical polyhedron is a regular spherical hexahedron.

4. The information processing method according to claim 1, further comprising a preliminary plane integrating step for integrating the divisional spherical faces of said intermediary polyhedron to generate a further intermediary polyhedron having faces less than said divisional spherical faces and more than four before said plane integrating step.

5. The information processing method according to claim 1, wherein said intermediary spherical polyhedron generated by said plane dividing step is a regular spherical icosahedron, and said information processing method further comprises a preliminary plane integrating step for integrating divisional spherical faces of said regular spherical icosahedron into faces of a regular dodecahedron.

6. The information processing method according to claim 1, wherein the intermediary spherical polyhedron has 96 divisional spherical faces or 384 divisional spherical faces.

7. The information processing method according to claim 1, further comprising a tessellating step for arraying a plurality of said end planes in a two-dimensional arrangement to generate in one of a horizontal direction or a to generate a composite plane with a repetition of said end information.

8. The information processing method according to claim 2, further comprising a tessellating step for arraying a plurality of said end planes in a two-dimensional arrangement to generate in one of a horizontal direction or to generate a composite plane with a repetition of said end information.

9. The information processing method according to claim 3, further comprising a tessellating step for arraying a plurality of said end planes in a two-dimensional arrangement to generate in a horizontal direction or to generate a composite plane with a repetition of said end information.

10. The information processing method according to claim 4, further comprising a tessellating step for arraying a plurality of said end planes in a two-dimensional arrangement to generate in a horizontal direction or to generate a composite plane with a repetition of said end information.

11. The information processing method according to claim 10, wherein said end information is a world map and said composite plane includes a repetition of the world map in which geographic information between every two pieces of the world map is continuous.

12. An information processing method using a computer for converting start information on a start spherical surface into end information on an end plane via a tetrahedron, comprising:
providing a computer comprising a computer program stored in a non-transitory computer-readable recording medium and executable to provide a method comprising;
a plane dividing step for dividing the start spherical surface to generate an intermediary spherical polyhedron having 96 divisional spherical faces each holding a divisional piece of said start information;
a plane integrating step for integrating said 96 divisional spherical faces of the intermediary polyhedron onto four triangular faces of a tetrahedron such that all of the divisional pieces of the start information held on said divisional spherical faces of the intermediary polyhedron are mapped onto the four triangular faces of the tetrahedron without gaps and overlaps;
a flattening step for developing said tetrahedron into a rectangular plane comprising a rectangular omnidirectional image mapped thereon by iso-area mapping;
receiving a user request to view the rectangular omnidirectional image mapped on the rectangular plane;
displaying, on a user display device, the rectangular omnidirectional image mapped on the rectangular plane; and
providing for the user to control navigation to move a viewer frame to extract a part of the rectangular omnidirectional image mapped on the rectangular plane,
wherein said start information on the start spherical surface is converted into the end information on the end plane while equally maintaining an equal area ratio between said start information and said end information.

13. The information processing method according to claim 12, further comprising a tessellating step for arraying a plurality of said end planes in a two-dimensional arrangement to generate in a horizontal direction or to generate a composite plane with a repetition of said end information.

14. The information processing method according to claim 13, wherein said end information is a world map and said composite plane includes a repetition of the world map in which geographic information between every two pieces of the world map is continuous.

15. The information processing method according to claim 1, wherein the rectangular omnidirectional image comprises a rectangular world map.

16. The information processing method according to claim 1, providing for the user to control a viewer of a desired aspect ratio covering up to an entire view in maximum.

17. The information processing method according to claim 12, wherein the rectangular omnidirectional image comprises a rectangular world map.

18. The information processing method according to claim 12, providing for the user to control a viewer of a desired aspect ratio covering up to an entire view in maximum.

19. A non-transitory computer-readable storage medium having a program recorded thereon;
where the program makes a computer execute
a procedure for a plane dividing step for dividing the start spherical surface to generate an intermediary spherical polyhedron having divisional spherical faces each holding a divisional piece of said start information;
a procedure for a plane integrating step for integrating said divisional spherical faces of the intermediary polyhedron onto four triangular faces of a tetrahedron such that all of the divisional pieces of the start information held on said divisional spherical faces of the intermediary polyhedron are mapped onto the four triangular faces of the tetrahedron without gaps and overlaps; and
a procedure for a flattening step for developing said tetrahedron into a rectangular plane,
a procedure to receive a user request to view an image mapped on the rectangular plane;
a procedure for displaying, on a user display device, the image; and
a procedure for the user to control navigation to move a viewer frame to extract a part of the image,
wherein said start information on the start spherical surface is converted into the end information on the end plane while equally maintaining an equal area ratio between said start information and said end information.

20. The non-transitory computer-readable storage medium of claim 19 having a program recorded thereon;
wherein the intermediary spherical polyhedron having 96 divisional spherical faces each holding a divisional piece of said start information.

* * * * *